(12) United States Patent
Poel et al.

(10) Patent No.: US 10,353,664 B2
(45) Date of Patent: Jul. 16, 2019

(54) METHOD AND SYSTEM FOR FACILITATING COLLABORATION SESSIONS

(71) Applicant: Steelcase Inc., Grand Rapids, MI (US)

(72) Inventors: Robert Poel, Grand Rapids, MI (US); Darrin Sculley, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 168 days.

(21) Appl. No.: 15/633,966

(22) Filed: Jun. 27, 2017

(65) Prior Publication Data
US 2017/0293458 A1    Oct. 12, 2017

Related U.S. Application Data

(63) Continuation of application No. 14/640,186, filed on Mar. 6, 2015, now Pat. No. 9,716,861.
(Continued)

(51) Int. Cl.
*H04N 7/14*    (2006.01)
*G06F 3/14*    (2006.01)
(Continued)

(52) U.S. Cl.
CPC ........ *G06F 3/1454* (2013.01); *H04L 12/1822* (2013.01); *H04L 12/1827* (2013.01);
(Continued)

(58) Field of Classification Search
CPC ....................................................... H04N 7/14
See application file for complete search history.

(56) References Cited

U.S. PATENT DOCUMENTS

| 4,751,399 A | 6/1988 | Koehring |
| 5,050,077 A | 9/1991 | Vincent |

(Continued)

FOREIGN PATENT DOCUMENTS

| AU | 2011203137 A1 | 7/2011 |
| AU | 2013203919 A1 | 5/2013 |

(Continued)

OTHER PUBLICATIONS

CITRIX, GoToMeeting User Guide, Copyright 2015 Citrix Systems.
(Continued)

*Primary Examiner* — Olisa Anwah
(74) *Attorney, Agent, or Firm* — Quarles & Brady LLP

(57) ABSTRACT

A method and system for facilitating a collaboration session among a plurality of conferees, each conferee using a distinct interface device that includes a distinct display screen, the interface devices including at least a first interface device including a first display screen used by a first conferee, the method comprising the steps of presenting a first session interface on the first display screen, presenting a second session interface on the second display screen, and during a conference content sharing session while content is being shared among conferees in at least the first and second sharing windows, identifying other display screens that may be used to present shared content, presenting screen selection options for other display screens via the first session interface, receiving a selection via the first session interface of at least one of the presented screen selection options and in response to the received selection, associating the display screen that is associated with the selected screen selection option with the first and second session interfaces for accessing session content during the on-going session.

45 Claims, 56 Drawing Sheets

Related U.S. Application Data

(60) Provisional application No. 61/994,372, filed on May 16, 2014, provisional application No. 61/949,696, filed on Mar. 7, 2014.

(51) Int. Cl.
  *H04N 7/15* (2006.01)
  *H04L 29/06* (2006.01)
  *H04L 12/18* (2006.01)
  *H04M 7/00* (2006.01)
  *G06F 3/0482* (2013.01)

(52) U.S. Cl.
  CPC ........ *H04L 65/403* (2013.01); *H04M 7/0027* (2013.01); *H04N 7/15* (2013.01); *H04N 7/152* (2013.01); *G06F 3/0482* (2013.01)

(56) References Cited

U.S. PATENT DOCUMENTS

| | | |
|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,717,856 A | 2/1998 | Carleton et al. |
| 5,898,579 A | 4/1999 | Boys |
| 5,915,091 A | 6/1999 | Ludwig |
| 6,038,542 A | 3/2000 | Ruckdashel |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka-Lai |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar et al. |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson et al. |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |

(56) References Cited

U.S. PATENT DOCUMENTS

| | | |
|---|---|---|
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |
| 8,081,083 B2 | 12/2011 | Hinterlong |
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |

(56) References Cited

U.S. PATENT DOCUMENTS

| | | |
|---|---|---|
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,797,159 B2 | 8/2014 | Kirkpatrick |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,098,502 B1 | 8/2015 | Horling et al. |
| 9,176,214 B2 * | 11/2015 | Berrett .................. H04W 4/023 |
| 9,339,106 B2 | 5/2016 | Epstein et al. |
| 9,380,682 B2 | 6/2016 | Mead |
| 9,465,524 B2 | 10/2016 | Epstein |
| 9,642,219 B2 | 5/2017 | Mead |
| 9,716,861 B1 | 7/2017 | Poel |
| 9,766,079 B1 | 9/2017 | Poel et al. |
| 9,852,388 B1 | 12/2017 | Swieter et al. |
| 9,921,726 B1 | 3/2018 | Sculley et al. |
| 9,955,318 B1 | 4/2018 | Scheper et al. |
| 10,021,530 B2 | 7/2018 | Sigal et al. |
| 10,057,963 B2 | 8/2018 | Mead et al. |
| 10,161,752 B1 | 12/2018 | Poel et al. |
| 2001/0051885 A1 | 12/2001 | Nardulli |
| 2002/0015097 A1 | 2/2002 | Martens |
| 2002/0130834 A1 | 9/2002 | Madarasz |
| 2003/0097284 A1 | 5/2003 | Shinozaki |
| 2003/0103075 A1 | 6/2003 | Rosselot |
| 2003/0218537 A1 | 11/2003 | Hoch |
| 2004/0001095 A1 | 1/2004 | Marques |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0261013 A1 | 12/2004 | Wynn et al. |
| 2005/0018826 A1 | 1/2005 | Benco |
| 2005/0027581 A1 | 2/2005 | Kjesbu |
| 2005/0071213 A1 | 3/2005 | Kumhyr |
| 2005/0160368 A1 | 7/2005 | Liu et al. |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |
| 2006/0045107 A1 | 3/2006 | Kucenas |
| 2006/0080007 A1 | 4/2006 | Gerard et al. |
| 2006/0080432 A1 | 4/2006 | Spataro |
| 2006/0168618 A1 | 7/2006 | Choi |
| 2006/0218027 A1 | 9/2006 | Carrion |

(56) References Cited

U.S. PATENT DOCUMENTS

| | | |
|---|---|---|
| 2007/0094065 A1 | 4/2007 | Wu |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0122635 A1 | 5/2008 | Fujikawa et al. |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0271713 A1 | 10/2009 | Stull |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer et al. |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi et al. |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle et al. |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber et al. |
| 2012/0022909 A1 | 1/2012 | Ayatollahi |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0216129 A1 | 8/2012 | Ng et al. |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |

(56) References Cited

U.S. PATENT DOCUMENTS

| | | |
|---|---|---|
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0088154 A1 | 4/2013 | Van Hoof |
| 2013/0099587 A1 | 4/2013 | Lou |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0049118 A1 | 2/2014 | Karalis |
| 2014/0052974 A1 | 2/2014 | Masters |
| 2014/0054961 A1 | 2/2014 | Metcalf |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0150059 A1 | 5/2014 | Uchida |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens et al. |
| 2014/0229578 A1 | 8/2014 | Chu |
| 2014/0236659 A1 | 8/2014 | Hapse |
| 2014/0244043 A1 | 8/2014 | Foster |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson et al. |
| 2015/0012843 A1* | 1/2015 | Ouyang ............... H04L 65/403 715/753 |
| 2015/0035440 A1 | 2/2015 | Spero |
| 2015/0069915 A1 | 3/2015 | Ogawa |
| 2015/0179012 A1 | 6/2015 | Sharpe et al. |
| 2015/0195620 A1* | 7/2015 | Buchner ............ H04N 21/4788 725/141 |
| 2015/0201480 A1 | 7/2015 | Ogawa |
| 2015/0229644 A1 | 8/2015 | Nozawa et al. |
| 2015/0296594 A1 | 10/2015 | Blum |
| 2015/0330780 A1 | 11/2015 | Yuzawa |
| 2015/0370272 A1 | 12/2015 | Reddy |
| 2016/0044071 A1* | 2/2016 | Sandholm ............ G06Q 10/101 709/204 |
| 2016/0171566 A1 | 6/2016 | Pugh et al. |
| 2016/0304013 A1 | 10/2016 | Wolas et al. |
| 2016/0327922 A1 | 11/2016 | Sekiguchi |
| 2016/0342950 A1 | 11/2016 | Pignataro et al. |
| 2017/0046113 A1* | 2/2017 | Noyes ................... G06F 17/243 |
| 2017/0060350 A1* | 3/2017 | Zheng ..................... G06F 8/38 |
| 2017/0208664 A1 | 7/2017 | Mead et al. |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |

OTHER PUBLICATIONS

Join.me forum and FAQ, Apr. 3, 2014.
CISCO, WebEx Meeting Center User Guide for Hosts, Presenters, and Participants, Version 8.23, Copyright 1997-2011 Cisco and/or its affiliates.

(56) References Cited

OTHER PUBLICATIONS

Krumm, et al., The NearMe Wireless Proximity Server, UbiComp 2004, The Sixth International Conference on Ubiquitous Computing, pp. 283-300, Sep. 7-10, 2004.

NFS Technology Group, Rendezvous—Technology for Meeting Room, Desk Scheduling and Event Management, http://myrendezvous.net/rendezvous-event-booking-software/calendar-management/.

CITRIX, GoToWebinar User Guide, Copyright 2015 Citrix Systems.

CiviCRM Books: User and Administrator Guide for Version 4.5, Published Sep. 2014, http://book.civicrm.org/user/current/email/scheduled-reminders/.

Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.

Events and Room Reserve Scheduled Task Setup for Email Notifications, Article No. 268, Apr. 22, 2013, http://kb.evanced.info/article.php?id=268.

Oracle Communications, Oracle Data Sheet—Calendar Server, Copyright 2015 Oracle and/or its affiliates, http://www.oracle.com/us/industries/communications/communications-calendar-server-ds-071728.pdf.

Stirworks, Inc., The Height-Adjustable, Standing Stir Kinetic Desk, http://www.stirworks.com/, Copyright 2015 Stirworks, Inc., 6 pages.

\* cited by examiner

METHOD AND SYSTEM FOR FACILITATING COLLABORATION SESSIONS

CROSS-REFERENCE TO RELATED APPLICATIONS

This application is a continuation of U.S. patent application Ser. No. 14/640,186, which was filed on Mar. 6, 2015, and which is titled "Method and System for Facilitating Collaboration Sessions" and claims priority therethrough to U.S. provisional patent application No. 61/994,372, which is titled "Method and System for Facilitating Collaboration Sessions," which was filed on May 16, 2014, and is also related to and claims priority to U.S. provisional patent application No. 61/949,696, which is titled "Method and System for Initiation and Creation of Collaboration Session," which was filed on Mar. 7, 2014.

BACKGROUND OF THE DISCLOSURE

The present disclosure relates generally to network-based systems for electronic collaboration sessions with at least some conferees participating from remote locations and more specifically to a system that enables a session to be initiated or scheduled and populated with content using software tools that are already familiar to most computer and communication network users.

The disclosure also describes a system that enables conferees associated with a session to add documents and files to a session queue at any time after a session is instantiated so that the queue provides a persistent repository for content related to the session that can be accessed at any time by one, a subset or all conferees associated with the session. The content including documents or files can be obtained from any digital source. Any conferee can invite any other person to associate with a session after which the invitee has full session privileges in at least some embodiments. The disclosed system, in at least some embodiments, enables conferees to control shared content during a conference in an egalitarian fashion where any conferee can open any content from the queue to share at any time and where each conferee also has the ability to independently view any document in a private window along side a sharing window.

Conferences and meetings have evolved from gatherings or sessions in conference rooms where participants met in person in the same physical location to electronic collaboration sessions where conferees can attend and substantially fully participate in sessions electronically or "on line" from remote locations. To this end, tools have been developed that enable remote conferees to appear via audio and/or video to other conferees and to view and hear other conferees via video and audio, respectively. Tools have also been developed that enable remote conferees to share content such as documents, images, video clips, application output, web sites, etc., with other conference attendees.

One now ubiquitous content sharing tool is electronic mail commonly referred to as E-mail. As well known to almost all computer users, E-mail enables users to transmit and memorialize communications between two or more persons and also to share content (e.g., documents, images, video clips, etc.) via attachment to E-mail messages. Essentially all E-mail programs have similar features (e.g., fields, tool bars, etc.) that computer users are extremely familiar. Familiarity with E-mail has resulted in widespread use.

While on line collaboration and communication sessions have proven very useful, known collaboration tools have several shortcomings. First, known collaboration tools often require several steps in order to set up and manage a session. For instance, assume a session initiator intends to invite seven other conferees to a session at 8 AM on Tuesday and that the session initiator, while thinking about the session, decides that the initiator wants to refer to several different sets of content during the session including two word processor documents, a video clip and two spreadsheets showing sales figures for a prior quarter and a current quarter business cycle. Here, in order to set up the session, in many cases a session initiator has to use scheduling software to schedule the session and send invitations to the seven other conferees to be invited to the session. In addition, the initiator will likely have to select and send each of the five sets of content to be delivered to the other session conferees prior to the session so that the other conferees can access that information during the session. Hereinafter, unless indicated otherwise, a content set will be referred to as a file or a record. To expedite access by other conferees the initiator may attach all five files to be shared to a single E-mail to be transmitted to the other conferees. Upon receiving the scheduling notice, each of the seven conferees needs to open the notice and accept the session to be scheduled on their calendars.

Now assume that two days after initially scheduling the Tuesday 8 AM session, the initiator identifies two other files (e.g., another word processor document and a drawing generated via a drawing application) that the initiator intends to share with others during the session. Here, the initiator may attach the other two files to another E-mail, reselect the seven other conferees and send the other files to the other conferees.

Assume that one day before the session is to commence, the conference initiator determines that one of the original five files should be swapped out and replaced by another file (e.g., perhaps a new version of the file being swapped out). Here, the initiator may send yet another E-mail to the invitees including the new file and, perhaps, a note that one of the original files should be ignored.

Also, assume that upon receiving the invite to the Tuesday 8 AM session, a first and a second of the other conferees each identifies other files that they would like to share during the session. Here, each of the first and second other conferees may attach additional files to E-mails to the other conferees and send their files with a note indicating a desire to share the files.

Next assume that two of the seven conferees invited are not available for the session. Here, the initiator may invite two other substitute conferees to the session (e.g., proxies for the two originally invited conferees that cannot attend). In this case, the initiator would also have to forward files to be shared to each of the two proxies. In addition, each other conferee that intends to share files would also have to forward files to the two proxies.

Once a session starts, all conferees connect to the session for sharing. Here, connection often requires each conferee to call into a session for audio and/or video communication. In at least some cases, during a session, each conferee is required to access shared files separately by opening E-mail attachments as other conferees refer to different files. Here, where multiple conferees shared files in different E-mails, keeping all conferees "on the same page" can be a burdensome task at best as conferees have to independently access the previously sent E-mails, access specific files currently being discussed in an accessed E-mail and then switch between files and among pages or portions of specific files as other files and sections of files are referenced.

To reduce the complexities associated with scheduling a session and synchronizing shared content during a session, systems have been developed that enable conferees to simultaneously view content shared by other conferees. For instance, web-based conferencing software has been developed whereby conferees can share files, applications, etc., by sharing output presented on display screens of their personal computing devices (e.g., desktop computers, laptop computers, tablet type computers, smart phone or personal digital assistant type computers, etc.). Here, in addition to creating an audio and/or video link between conferees, an internet or other network link is created for sharing the content where all conferees link to a session run by a server.

Some web-based systems enable a conference initiator to earmark files including documents and other content to be shared in a session so that the files can easily be accessed by the initiator during a session. For instance, where an initiator intends to share seven files, each of the seven files can be linked to the session for access by the initiator. Where an invited conferee intends to share two files, the conferee can access those files during the session period and share the files with other conferees.

While web-based systems solve some of the problems associated with prior systems, they still have several shortcomings. For instance, to initiate a session, many known systems require a conferee to pre-register with a session server to create a system account. This process often requires entry of personal information as well as a process to establish some type of linkage to a user's electronically stored contact list(s), a process to establish a link to files controlled by the conferee, and requires at least some time commitment by the conferee to enter the information and for the server to set up the account.

As another instance, after an account has been set up, to initiate a session, a conferee needs to access a system software interface (e.g., a browser page) that, in many cases, is completely unfamiliar to the conferee. Here, while effort has been made to make initiation interfaces simple and intuitive, where a user does not use the interface routinely, even a simple interface can be intimidating to use and therefore operate as a deterrent to greater use.

As another instance, while known systems enable a conferee (e.g., an initiator) to queue files for sharing during a session, known systems do not provide a universal session queue to receive all conferee files prior to and/or during a session. For instance, in a conference including eight conferees where an initiator intends to share seven files and each of the other seven conferees intends to share two files each for a total of 21 files, there is no queue for receiving all of the files. No universal session queue means conferees often cannot form an understanding of the volume of content to be shared during a session or intentions of other conferees to share files. In these cases, often times session periods end prior to conferees sharing files or valuable session time is wasted with conferees verbally bantering back and forth about intention to share files during the session.

In addition, because files are not queued in a universal queue, there is no ability for conferees to access or control other conferee files unless those files are shared by the conferee that provided the files. For instance, where a session initiator has earmarked seven files to be shared during a session, other conferees can only see and interact with files currently shared by the initiator. For example, if the initiator shares a single word processor document with other conferees, a second conferee can only see and manipulate the shared document and has no ability to access or control the other six files earmarked by the initiator to be shared.

Another problem with known systems is that real time control of remote conferee display screens is often slow as updates between linked computers have to be sent in their entirety to each computer linked to a session. Often times there is at least some latency between when actions occur on a local screen and when actions are replicated on remote screens given network capabilities, noise, etc. Any latency in content delivery is bothersome and can hamper the natural flow of information between disparately located conferees.

One other problem with known conferencing systems is that known systems often are tied to specific hardware or, more specifically, to specific display screens for sharing content. For instance, many conference spaces have dedicated display screens that are mounted within or otherwise substantially permanently secured within a conference space and that are linked to hardware switching devices for receiving content from sources. In other cases screens may be mounted to carts for movement to different locations within a larger conferencing area but the screens are still dedicated to the larger conferencing system. In many cases large flat panel display screens exist that are primarily provided for some non-conferencing purpose such as to show a video or to display a television show (e.g., CNN news network). Despite many available large display screens at many locations, those screens are typically not useable for conferencing purposes. Inability to use available large displays for conferencing purposes is especially troublesome in cases where a remote conferee is required to use a device including a small display (e.g., a smart phone or tablet type device) during a conference despite an available larger screen display in the conferee's vicinity.

Yet another problem with existing conferencing systems is that known systems only allow most conferees to use a single display screen during a session despite the fact that the information to be shared among disparately located conferees often is more than can optimally be presented on a single display screen. For instance, while there are conference spaces that have been specifically set up to use two, three or more common large display screens within a single conference space to share content among conferees within the space, in most cases remote conferees patching into these systems to participate in conference activities only have a single desktop computer screen, a laptop screen, a tablet screen, etc. Viewing content from a large display screen on a smaller screen is difficult for many conferees. Where content is shared on several large display screens in a local conference space, viewing all of that content on a smaller screen is almost impossible. Here, one option is for a remote conferee to view content from only one large screen at a time and to flip through the large screen content but that solution means that the conferee cannot see all of the content at the same time.

BRIEF SUMMARY OF THE DISCLOSURE

Embodiments of the present disclosure provide a system, method and program for initiating and/or scheduling an online collaboration session among a session initiator and at least some remote invitees to a session using a conventional E-mail system. In some cases a specific virtual mailbox address may be assigned to a session server function scheduling where any E-mail addressed to the address is used to schedule a session at a future time. Thus, here, any system user that sends an E-mail addressed to the mailbox can schedule a session without having to pre-register or set up a user account of some type.

In some embodiments a session initiator may be able to identify invitees by simply adding invitees to a conventional "To" or target field in an E-mail addressed to the session server scheduling function. For instance, in addition to addressing an E-mail to the session server scheduling function, the initiator may add seven other E-mail addresses to the address or target field to indicate seven invitees to the session. Here, because the request to initiate or schedule a session is made via an initiator's conventional E-mail account, the initiator's E-mail contact information is automatically accessible to the initiator for selecting invitees for the session. Here, when an E-mail is sent, the E-mail is transmitted to the session server which gleans the invitee list from the target field and adds the invitees to a session record. In addition to adding invitees to the session record, the server generates invite E-mails to each of the invitees requesting either that the invitee confirm that the invitee will join the scheduled session. Where an invitee agrees to join a scheduled session, the server may communicate with the invitee's scheduling software to add the session to the invitee's calendar.

In at least some embodiments other session server addresses may be associated with other session management functions. For instance, in some cases the server may support an immediate session start function whereby a user can start a session immediately by sending an e-mail to a "startsession@session.com" address. Here, the process above for scheduling a session would be repeated to invite conferees identified in the target field to provide other functionality.

In some embodiments the invite E-mail sent to a session invitee may include a simple "Join" icon for joining a session that is progressing or that will commence shortly or may include an "Accept" or "Schedule" icon that is selectable to accept or schedule a future session.

In at least some embodiments the server may generate a session queue for each of the sessions that is scheduled where the session queue stores instances of files that may be shared by conferees during a session. Here, to add files to the session, in at least some cases a conferee may be able to add files to a queue via an E-mail system. For instance, where a session initiator knows that she intends to share seven files with other conferees during a session, the initiator can add those files to a session request attachment field in an E-mail. Here, advantageously, E-mail systems already include intuitive tools that most people are comfortable using for selecting and attaching files to an attachment field. Here, when the system server receives an E-mail to initiate or schedule a session, the server may obtain all attached files and automatically add those files to an associated session queue.

In at least some cases an invitee may be able to add files to a queue when the invitee accepts an invitation to join or schedule a session. In this regard, for instance, in some cases upon indicating a desire to join or schedule a session, the server may cause an E-mail system to generate and present a response E-mail to be sent by the invitee where the response E-mail is addressed to the session server and enables a conferee to add additional files to an attachment field. The response E-mail may include instructions for the invitee to add files to the session queue along with precanned text where the invitee confirms a desire to join or schedule the session. Again, here, the invitee's E-mail system already includes familiar tools for adding files as attachments so the invitee does not need to perform some unfamiliar process.

In at least some embodiments any conferee may be able to add files to a session queue at any time prior to, during or after a session conference using an E-mail system. For instance, a conferee may open a new E-mail template, attach files to share and address the E-mail to an "add file" mailbox associated with a session server add file function. Any attached files may be added to a session queue.

In some cases a conferee can use a web-based browser to link to a session at any time after the session has been instantiated (e.g., scheduled) and may be able to add files or documents to the session, delete documents, annotate documents, etc.

In at least some embodiments any conferee may be able to access and at least independently view any files in the queue of a session regardless of who added the file to the queue either before, during, or after a session. This feature encourages conferees to prepare for a session by becoming familiar with content other conferees intend to share and also helps conferees understand importance of content so that a natural ordering of content based on importance can occur.

In some embodiments, in addition to a document or session queue, a system interface will provide a conferee queue with images or, where available, real time video, of each conferee linked to a session. Where video is available, even where the queue only includes small representations of each conferee, slight movements and expressions of conferees can convey a lot of information. In some cases a real time video of a conferee may be opened in a sharing window or, in other cases, in a secondary window in addition to a sharing window for a better view of one of the conferees. In other cases a real time conferee video may be moved to a second display screen.

In some embodiments, during a session conference while content is being shared in a sharing window, any conferee may open any queue document or file in a private window for private viewing. The privately viewed document may be a second instance of the document being shared in the sharing window or may be a different document. Two conferees may open separate instances of the same document in their private windows and may view the same or different pages of the document simultaneously. Two conferees may open different documents in their private windows. The sharing window remains visible on all conferee views at all times. Thus, the sharing and private window arrangement enables all conferees to view any queue document at any time during a sharing conference while still having a view of the shared document.

In some embodiments, whenever a conferee links to a session, instances of every document or file in the session queue are automatically transmitted to the conferee's device and are cached in a memory associated with the device. Thereafter, quick access to any document in a private windows and quick manipulation of documents in the sharing windows of all linked devices can be facilitated.

In at least some embodiments conferees can annotate documents in the sharing window on their device and the annotations are shown on all linked devices. In some cases conferees can annotate documents in private windows where the annotations may be automatically added to instances of the documents cached by other conference devices, may only be added to other instances of the documents upon an affirmative sharing step by a conferee, or may only be stored for private use by the conferee that generated the annotation.

In some embodiments, in addition to a session queue that is identical for all session conferees, the system may provide a private queue for each conferee for storing documents, files, etc., that the conferee is considering sharing with other conferees but that the conferee does not want to share at the current time for some reason. During a session, when a document is moved from a private queue to the session queue, a document icon for the document is added to each instance of the session queue on devices linked to the session and the document is transmitted to each of those devices for caching to facilitate quick access.

In at least some embodiments large display screens that can be linked to a session via invitation but that cannot be used as input devices may only show the sharing window as opposed to other interface features used for session navigation. The larger version of the sharing window provides a view that is easier to see.

In at least some embodiments an image or video icon of the conferee that has opened a document in the sharing windows may be visually distinguished in some fashion to show or indicate who has current control of the sharing window. For instance, a colored shadow or other highlight about a conferee icon may indicate current control.

In some cases the system may be able to wirelessly monitor locations of conferee devices and identify proximate large display screens available to be invited to a session. The session interface may present proximate screen options to simplify the invitation process and reduce the friction associated with linking a screen to a session.

In some embodiments any conferee may be able to share her device desktop in a sharing window. By sharing a desktop, any conferee can run any application on their device and share the output of that application with other conferees. For instance, a conferee could share a word processing application, a spreadsheet application, a drawing application, etc. In some cases only the conferee sharing a desktop can control applications presented via the desktop while in other cases any conferee may be able to control any other conferee's shared desktop application.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
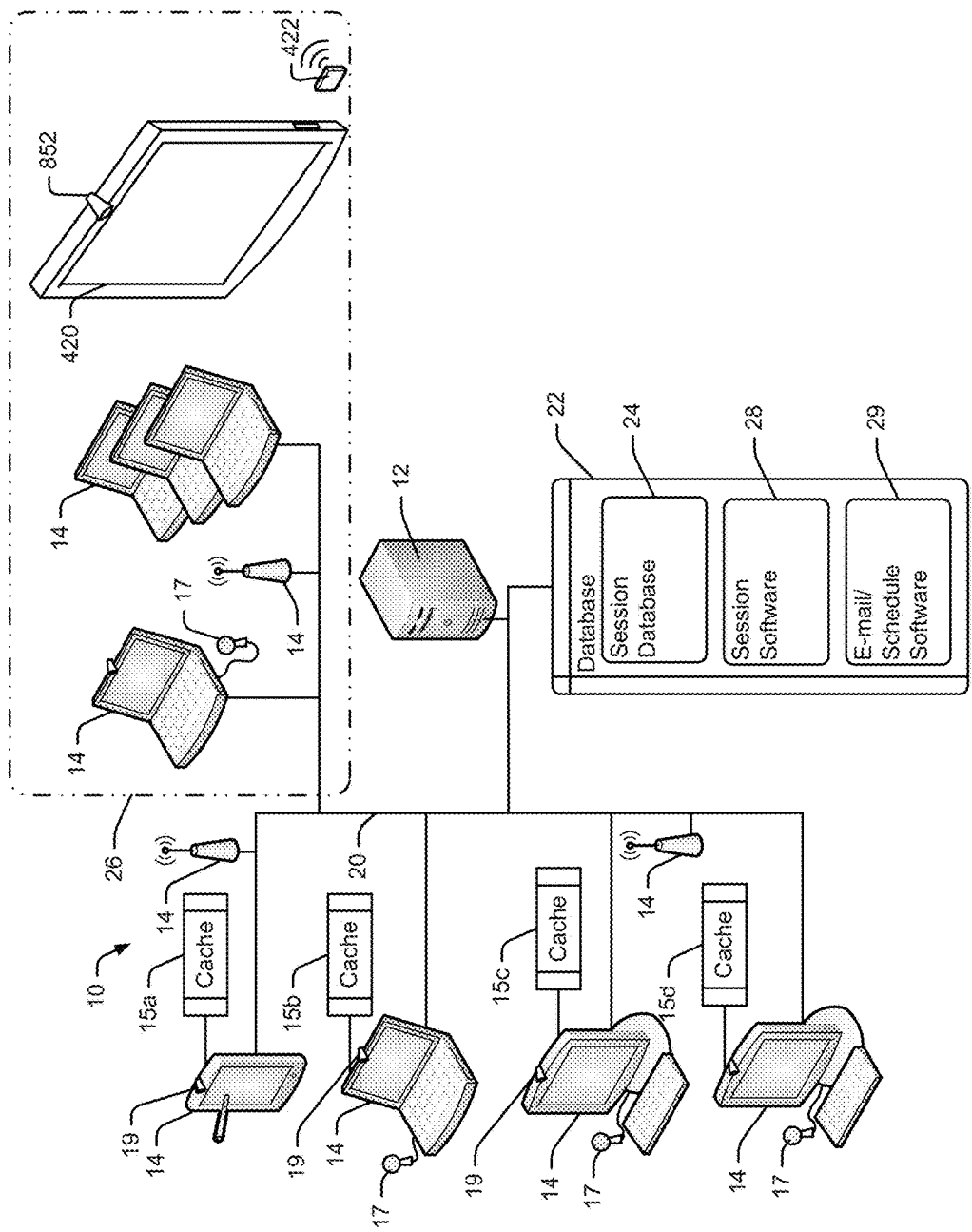
FIG. 1 is a schematic view of a communication system including components that may be used to perform various aspects of methods of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The phrase "computer readable media" can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary system 10 that includes a session server 12, a database 22 and a plurality of personal computing devices collectively identified by numeral 14 that are linked together via the internet or some other communication network 20. The server 12 can be any type of computer server and may be located at the same location as any of the personal computing devices 14 or at a location remote from all of the devices 14. The server 12 may include a single server or may include two or more servers that cooperate to perform various aspects of the present disclosure. Although not illustrated, server 12 includes, among other things, one or more processors for carrying out methods and processes that are consistent with at least some aspects of the present disclosure. Server 12 may be operated by an entity that employs the users of devices 14 or may be operated by a third party provider or, where processes performed by server 12 are performed by two or more servers, different entities may be responsible for performing different steps or subprocesses of the methods and processes described herein.

Figure 8:
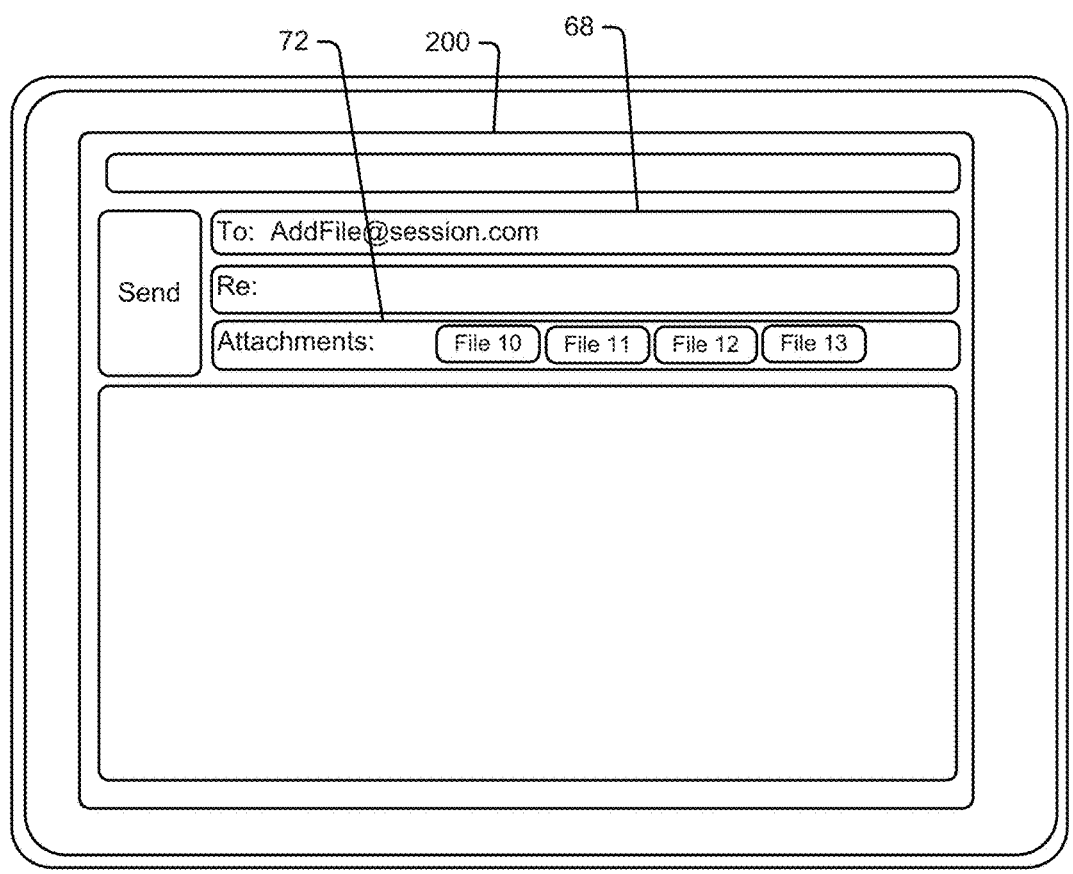
FIG. 8 is screen shot of an E-mail template to be used to add files to a session or conference queue.

While database 22 is shown as a separate component in FIG. 1, it should be appreciated that database 22 may be provided as part of one or more of the servers 12. The database 22 may either be at the location of the server 12 or at a remote location in which case the database would be accessible via the network link 20. As shown, database 22 includes a session database 24. An exemplary simplified session database 24 is shown in FIG. 8 and is described in greater detail hereafter. In addition to the session database 24, session software 28 is stored on database 22 that can be run to perform the disclosed methods and processes and E-mail/scheduling software 29 is also stored on database 22.

Unless indicated otherwise, hereafter it will be assumed that a single entity operates the E-mail and scheduling software 29 and the session software 28 and that each of the device 14 users uses the E-mail and scheduling software 29 to facilitate E-mail communications and to electronically calendar events, sessions, etc. Nevertheless, it should be appreciated that in at least some cases different device 14 users may be associated with different entities and therefore different users may use different E-mail and personal calendaring software to facilitate communication and calendaring functionality described hereafter.

Referring still to FIG. 1, the computing devices 14 may take any of several different forms including but not limited to personal or desktop computers, laptop computers, tablet type computers, smart phones, personal digital assistants, etc. In FIG. 1 several laptops 14 are shown in a phantom box 26 to indicate that those laptops are at a single location. For example, the location corresponding to box 26 may correspond to a conference room within a facility owned by an employer of persons that use devices 14. The devices 14 in FIG. 1 that are located outside box 26 are assumed to be remotely located from conference space 26 and from each other.

According to one session scheduling function that is consistent with at least some aspects of the present disclosure, when server 12 runs session software 28, server 12 can be used to schedule and manage conference sessions involving conferees at remote locations. More specifically, the session software 28 can use E-mails from system users to schedule and manage conference sessions so. To this end, at least one unique session domain name is assigned to server 12 such that all E-mails addressed to the session domain name are received by server 12. Different qualifiers (i.e., the portion of an E-mail address before the "@" sign) in received emails are used by server 12 to initiate different session management functions. For instance, where the term "session" is the domain name, the qualifier "schedule" may be added to the domain to provide the address "schedule@session.com" where the server is programmed to recognize a request to schedule a new session whenever an E-mail addressed to the address "schedule@session.com" is received. As another example, whenever an E-mail addressed to "response@session.com" is received, server 12 may be programmed to recognize a response to an invitation to participate in a session and may process the response accordingly. As still one other instance, whenever an E-mail addressed to "AddFile@session.com" is received, server 12 may be programmed to recognize that files attached to the E-mail are to be added to an existing session queue and may process the response accordingly. As another instance, an E-mail to "starsession@session.com" may cause server 12 to start an immediate session and E-mail to "join@session.com" may cause server 12 to add a conferee to an ongoing session. Many other E-mail addresses may be associated with other session functionality.

Figure 2:
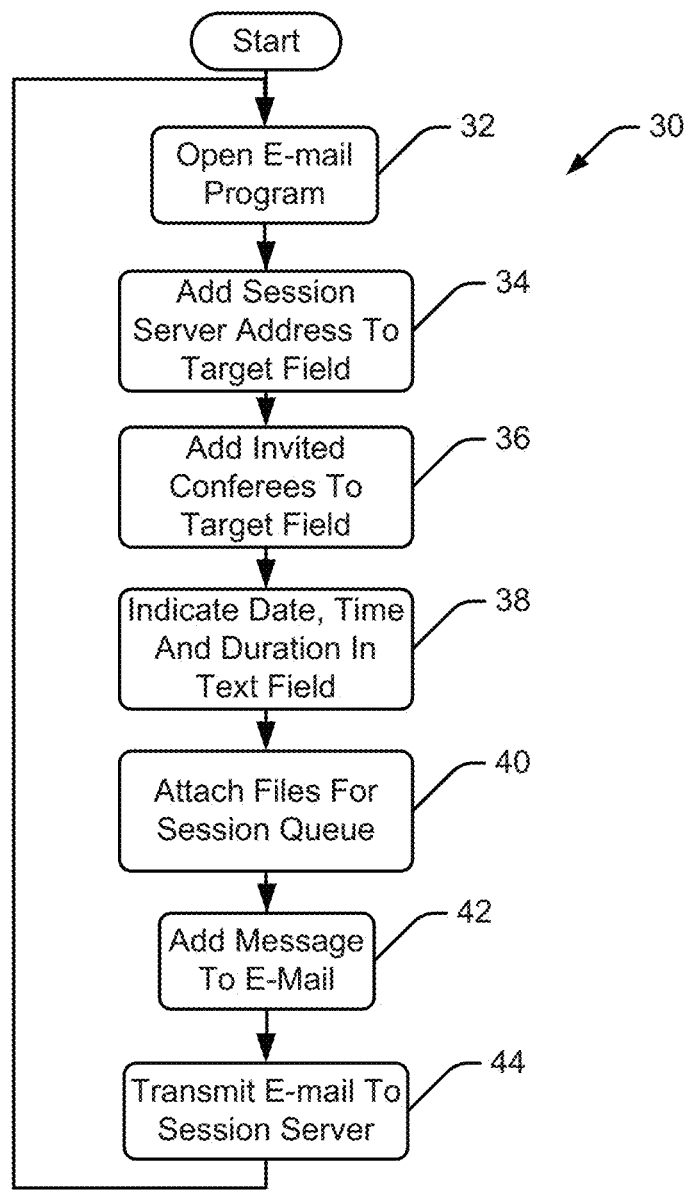
FIG. 2 is a flow chart illustrating a process that may be performed using a personal computing device to initiate a conferencing session among a plurality of conferees using an E-mail system that is consistent with at least some aspects of the present disclosure.
Figure 3:
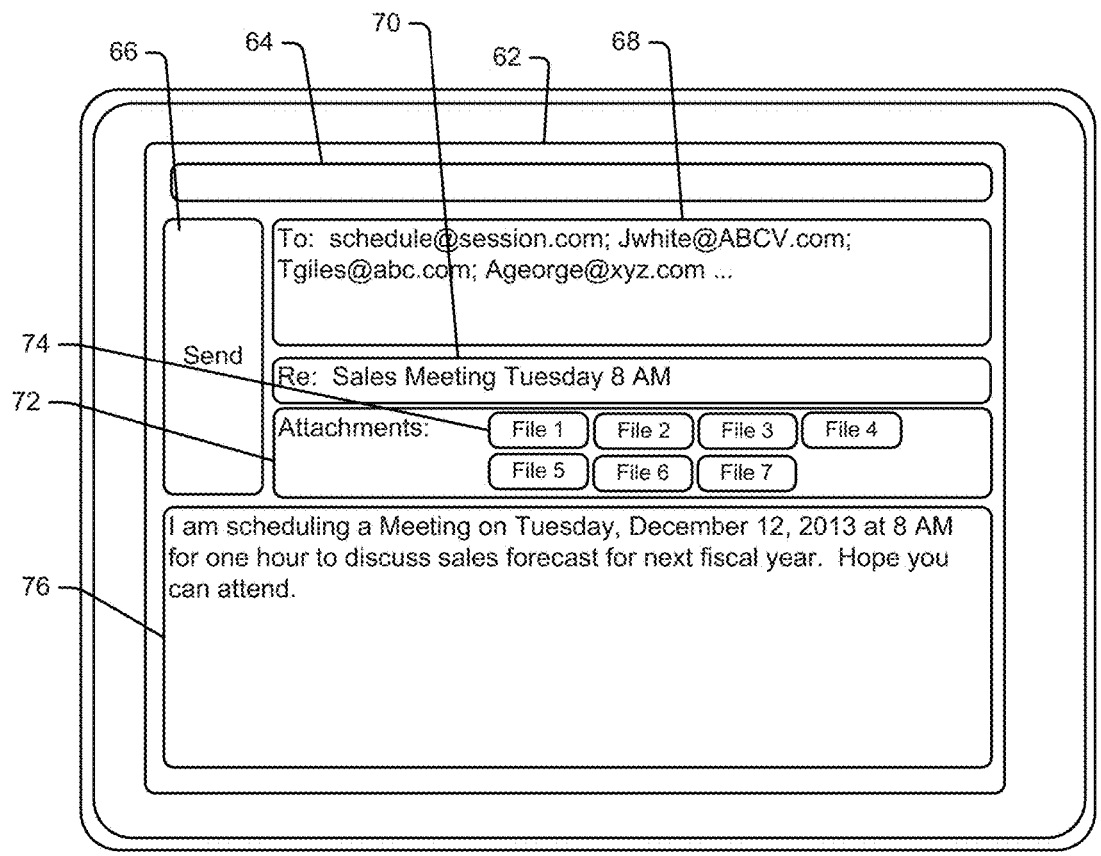
FIG. 3 is a screen shot that may be presented to a conference initiator via an E-mail system including some content that may be used to schedule a conferencing session.

Referring now to FIG. 2, a process 30 for using an E-mail system to schedule a conferencing session that may be performed via any one of the personal computing devices 14 shown in FIG. 1 is illustrated. At process block 32, a device user opens an E-mail program and selects a "New" icon (not illustrated) via an E-mail menu in order to create a new E-mail message. Referring also to FIG. 3, when the "new" E-mail icon is selected, a new E-mail window 62 is opened as in any conventional E-mail software application. As shown in FIG. 3, the new E-mail window 62 includes standard E-mail fields including a tool bar field 64, a "Send" field 66, a "To" or target field 68, a "Regarding" field 70, an "Attachments" field 72 and a message field 76. Although the tool bar field 64 is shown as blank, it should be appreciated that various selectable icons may be presented within field 64 including a font selection icon, an address book icon, standard tools for attaching files, etc. The send icon 66 can be selected to send an E-mail after other fields have been filled in.

The "To" field 68 is used to indicate recipients of the E-mail message. As shown, one of the recipients listed in field 68 is "schedule@session.com". Here, the domain portion of the address (e.g., session.com) corresponds to session server 12 in FIG. 1 and the qualifier or mailbox portion "schedule" corresponds to session server scheduling functionality. In at least some embodiments the E-mail address feature can be used to select conferees to be added to an invite list for a session in the normal way that the address feature would be used to select recipients of an E-mail. The other recipients in field 68 include other potential conferees that are being invited to the session corresponding to E-mail 62. In FIG. 2, the step of addressing the E-mail to the session server schedule mailbox is shown at process block 34. The step of addressing the E-mail to other invited conferees is shown at process block 36.

At block 38, the initiating conferee adds information to message field 76 and other fields. In at least some embodiments it is contemplated that the initiating conferee may simply add conversational text to block 76 that includes information required to schedule a conference session. Here, it is assumed that server 12 would be able to parse the conversational text to glean information needed to schedule the session. The exemplary information in field 76 in FIG. 3 indicates the date, time and duration of the session to be scheduled. Other descriptive information may be added to the "Regarding" field 70 as shown. At block 40, the initiating conferee attaches files to the E-mail using conventional E-mail file attachment tools from tool bar field 64. In FIG. 3, seven exemplary files 74 are shown attached in field 72. The files 74 maybe any type of digital content including documents, images, video clips, audio clips, spreadsheets, presentation documents, applications, etc.

Continuing, at block 42, any additional information such as a more detailed message, an agenda for a session, etc., may be added to the E-mail in field 76. After the initiating conferee is satisfied with the information entered into the E-mail fields in FIG. 3, at block 44, the conferee selects "send" icon 66 to transmit the E-mail to session server 12.

Figure 4:
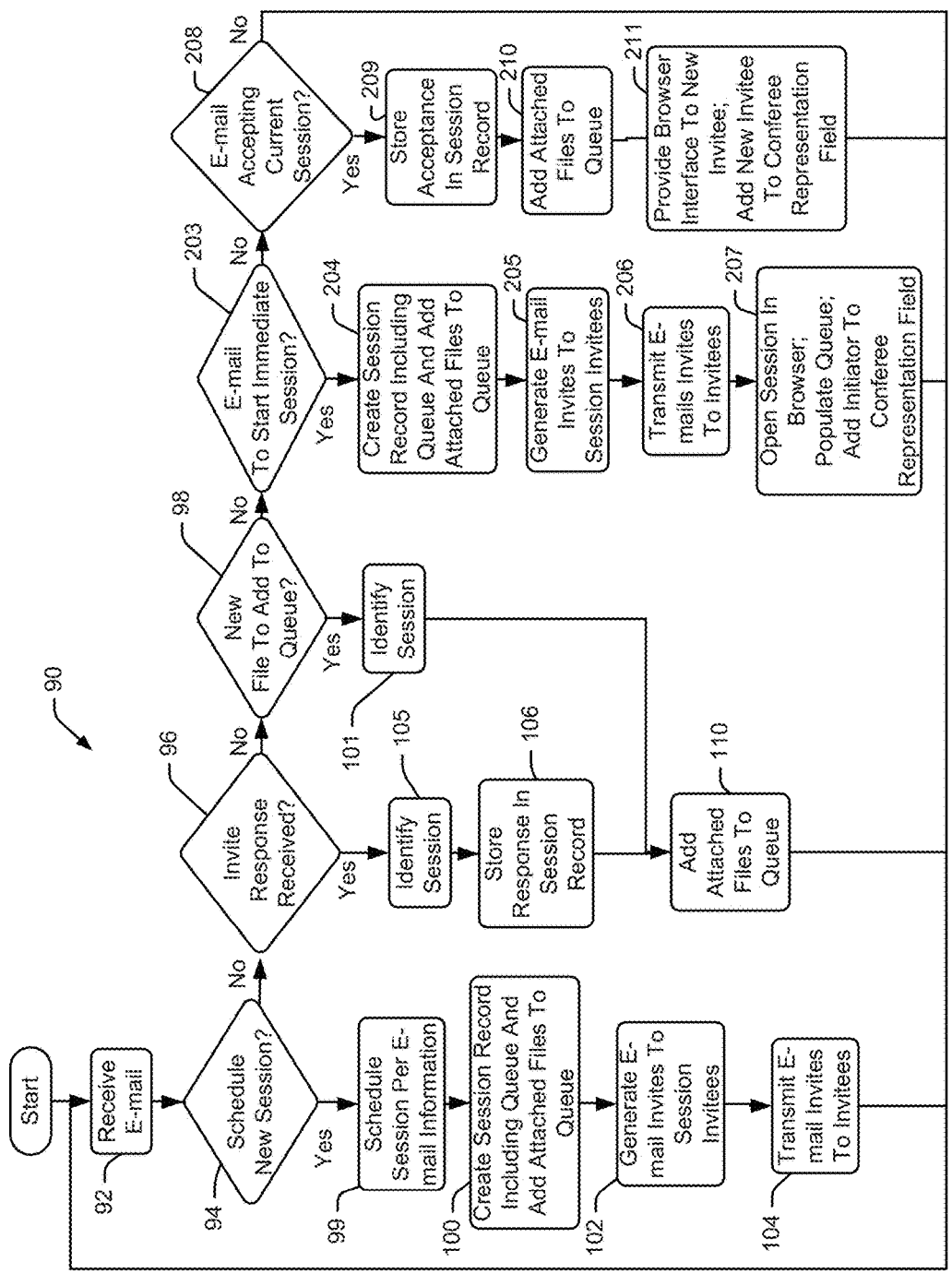
FIG. 4 is a flow chart illustrating a process that may be performed by a session server for facilitating various session management functions that is consistent with at least some aspects of the present disclosure.

Referring now to FIG. 4, a process 90 that may be performed by server 12 when any E-mail is received from one of the computing devices 14 is shown. At block 92, server 12 receives an E-mail. At blocks 94, 96, 98, 203 and 208 server 12 identifies the address of the received E-mail and delivers the E-mail to an appropriate E-mail box associated with software for implementing various session functionality. At block 94 where the mail is a request to schedule a new session (i.e., addressed to "schedule@session.com"), control passes down to block 99. At block 99, server 12 schedules a new session per the E-mail information and at block 100, server 12 creates a session record for the new session.

Figure 7:
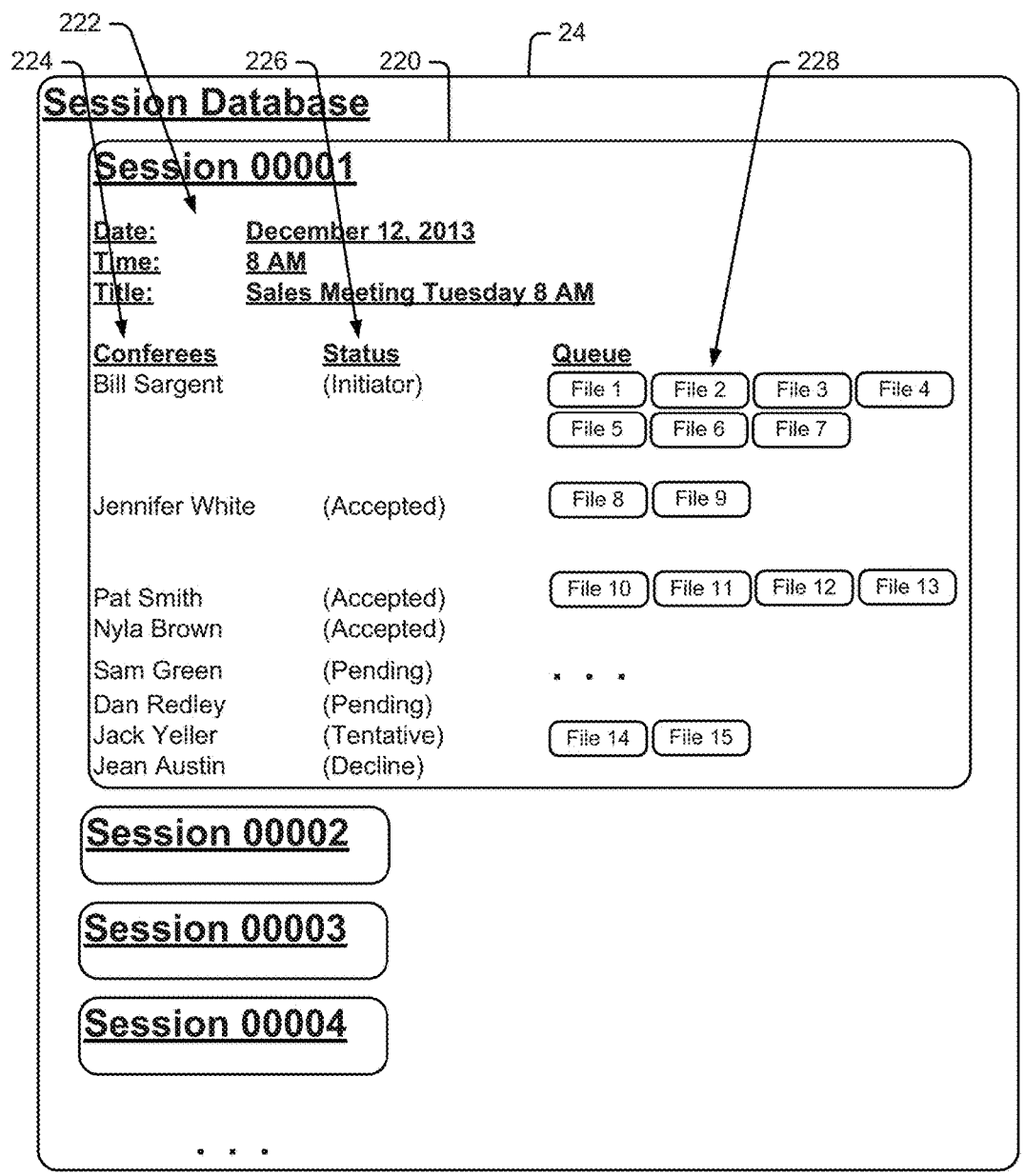
FIG. 7 is a schematic of an exemplary session database that is consistent with at least some aspects of the present disclosure.

Referring FIG. 7, an exemplary session database 24 including a plurality of session records is illustrated. An exemplary first session record is identified by numeral 220 and other session records are represented below record 220. As shown, the exemplary session record 220 includes date, time and session title fields collectively identified by numeral 222 that specify the date, time and duration of the session associated with the record 220. In addition, the exemplary record 220 includes a list including the session initiator and conferees invited to the session at 224 and status indicators (see 226) for each of the conferees 224 indicating a current "intent to attend" status. The exemplary current statuses include an "Initiator" status corresponding to the conferee that initiated the session, an "Accepted" status indicating conferees that were invited that have already accepted and scheduled the session, a "Pending" designation indicating conferees that have been invited but have yet to accept the invitation to participate in the session, a "Tentative" designation indicating invitees that have responded with a tentative response and a "Decline" designation indicating that an invitee declined an invitation to the session.

In addition to including conferee and status information, the session record 220 also includes a session file queue 228 which stores all of the files that have been added by either the initiator or one of the conferees to be shared during the session once the session commences. Consistent with the above example, the queue 228 lists seven files corresponding to the session initiator. In addition, other files 8 through 15 are shown listed in the queue and associated with other conference invitees. Two of the other files, File 14 and File 15, have been added to the queue by one of the tentative conferees. In at least some cases even declining conferees may add files to the queue to be considered by others during a session.

In at least some cases server 12 may arrange files in the queue based on the status indicators associated with conferees that added the files to the queue. For instance, files may be arranged with initiator files first, accepted conferees second, tentative conferees third and declined conferees last. Other factors may be used to arrange queue files. For instance, file types may be used to arrange files, conferee characteristics (e.g., titles) may be used to arrange files, file names may be used, combinations of factors may be used. In some cases conferees may be able to designate the order of files in the queue.

Other information may be stored in the session record 220 such as messages received from conferees in E-mails corresponding to the session, an agenda if provided by the initiator or some other conferee that was invited, etc. Although other session records are shown in simplified form in FIG. 8, it should be appreciated that each of the other session records would include information similar to that described above with respect to record 220.

Figure 6:
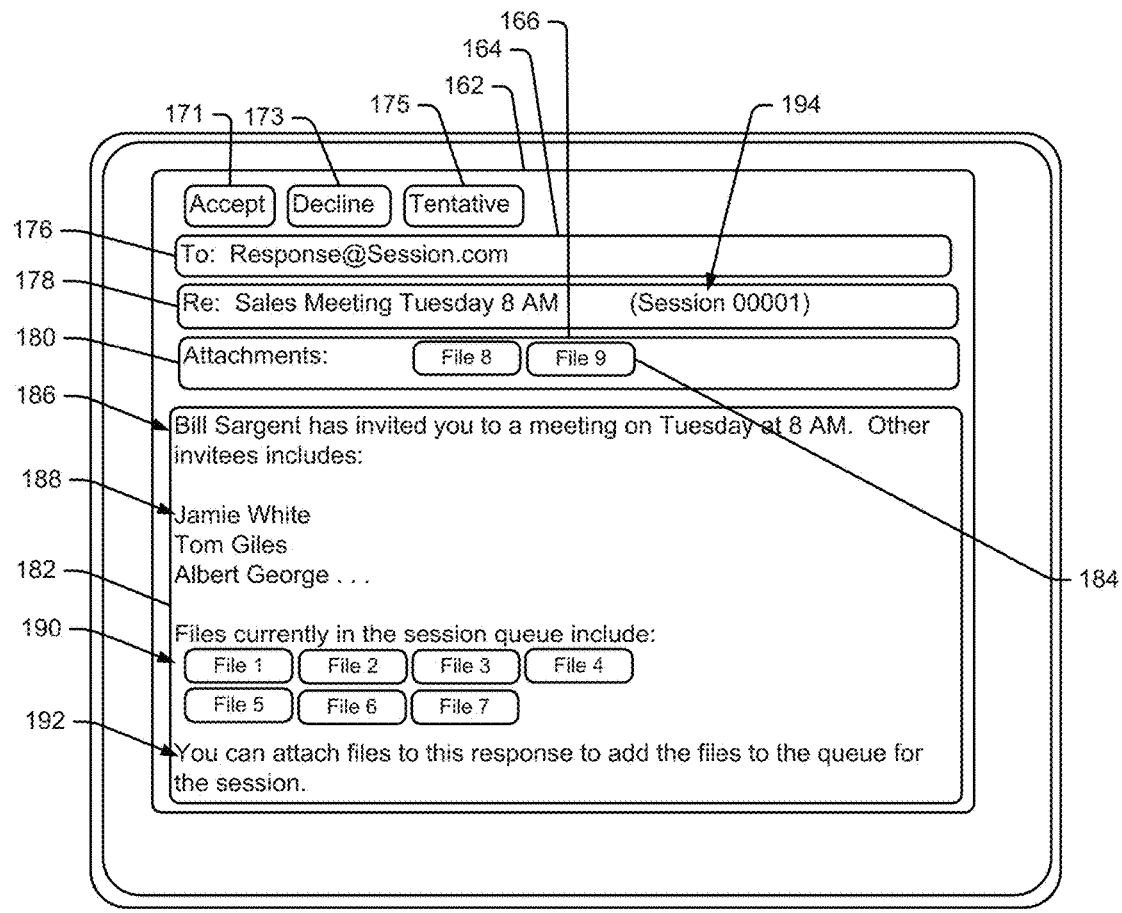
FIG. 6 is a screen shot of an invite E-mail template that may be presented to a conference invitee according to at least some aspects of the present disclosure.

Referring once again to FIGS. 1 and 4, after the session record has been created at block 100 or simultaneously therewith, server 12 generates and transmits invite E-mails to each of the session invitees listed in the session record. An exemplary invite E-mail that may be constructed by server 12 using information gleaned from the initiating E-mail is shown in FIG. 6 and is described in greater detail below. At block 104, server 12 transmits the invite E-mails to the invitees after which control passes back up to block 92 as shown.

Although not shown, when a conferee initiates scheduling a conference as described above, in addition to scheduling a session in the session database 24, the session software may also interact with scheduling or electronic calendaring software used by the initiating conferee to maintain a personal schedule. For instance, when a session is scheduled, server 12 may transmit a meeting or session notice to the server maintaining the initiating conferee's E-mail system requesting that a session be added to the conferee's personal schedule. Similarly, when an invited conferee accepts or tentatively accepts an invitation to participate in a session as described hereafter, server 12 may transmit a meeting or session notice to the server maintaining the E-mail system used by the invited conferee requesting that the session be added to the conferee's personal schedule. In the present case it is assumed that server 12 operates all E-mail and scheduling software for all potential conferees (see FIG. 1) and therefore session scheduling on personal calendars can be completed by server 12 itself.

Figure 5:
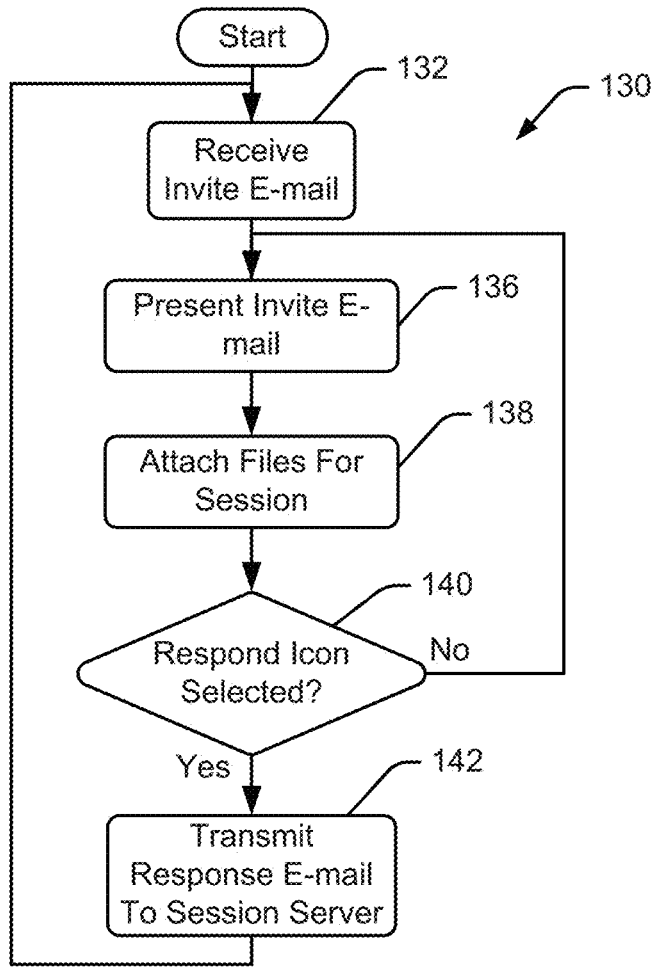
FIG. 5 is a flow chart illustrating a process that may be performed via an invitee computing device that is consistent with at least some aspects of the present disclosure.

Referring still to FIG. 1 and now also to FIG. 5, a process 130 for handling a session invite E-mail that may be performed by a session invitee's computing device 14 is illustrated. At block 132, the invitee's device 14 receives an invite E-mail from server 12 and presents the invite E-mail in an E-mail window on the invitee's device 14. Referring also to FIG. 6, the exemplary invite E-mail 162 includes "Accept", "Decline" and "Tentative" icons 171, 173 and 175, respectively, a "To" or target field 176, a "Regarding" field 178, an "Attachments" field 180 and a "Message" field 182. As in conventional scheduling and E-mail systems, the Accept, Decline and Tentative icons 171, 173 and 175 can be selected to indicate a desire to accept a scheduled session, decline a scheduled session or tentatively accept a scheduled session. The target field 176 is automatically filled in with a mailbox address corresponding to session server 12 and more specifically corresponding to functionality to be performed when an invitee responds to a session invite. To this end, the exemplary address in target field 176 includes "response@sesion.com". The "Regarding" field 178 provides a title for the session which, in most cases, will simply include the identifier provided by the conference initiator "Regarding" field 70 as shown in FIG. 3.

Referring still to FIG. 6, the "Attachments" field would initially be blank when a conference invitee opens the invite E-mail. In at least some embodiments, files can be added by the invitee to the "Attachments" field 180 to add those files to the session queue for subsequent access during a session. In FIG. 6, two exemplary files, "File 8" and "File 9", are shown attached in field 180.

Message field 182 includes a message composed by session server 12 inviting the invitee to join the conference session that has been scheduled. To this end, the composed message indicates the identity of the session initiator as well as the day and time at which the session is to take place at 186. In addition, the composed message indicates the names of conferees invited to the session at 188 which can be gleaned from the E-mail addresses of the invitees received in the initiating E-mail by the server 12. The message field 182 may also include icons corresponding to each one of the files currently in the system queue at 190. The exemplary files at 190 include files 1 through 7. Here, it is contemplated that any one or a subset of the file icons at 190 may be selected for accessing those files to gain additional information about what is to be presented or discussed at the scheduled session. The message field 182 also includes an invitation at 192 and instructions to the invitee for adding additional files to the attachment field 180 that can be added to the queue. In at least some cases a session identifier may also be included in the invite E-mail. For instance, in FIG. 6, numeral 194 indicates a session identifier "Session 00001" at the end of the "Regarding" field. Other identifiers may be provided in other fields or may simply be associated with but not presented as part of the invite E-mail.

Referring still to FIG. 6 and again to FIG. 5, if any of the response icons (e.g., accept, tentative, decline) is selected at block 140, control passes down to block 142 where the response E-mail is transmitted to server 12.

Referring again to FIG. 4, where an invitation response is received by server 12, control passes through blocks 92, 94 and 96 to block 105 where server 12 uses the session identifier (see 194 in FIG. 6) to identify the session associated with the response. At block 106, server 12 uses the response to update the session record 220 shown in FIG. 7 by changing the status indictor in column 226 for the respondent. Files from the response E-mail are added to the session record queue to block 110 after which control passes back up to block 92.

After a session is scheduled and prior to commencement, any conferee may be able to add files to the session queue at any time, even after accepting a session. To this end, see FIG. 8 that shows an exemplary E-mail template 200 that may be used to add files to a queue. E-mail template 200 is essentially identical to the conventional or standard E-mail format shown in FIG. 3 including a tool bar, a target field 68, a "Regarding" field, an "Attachment" field, a message field and a "Send" icon. Here, the "AddFile@session.com" address has been entered into target field 68 and four files have been attached to "Attachments" field 70.

Referring again to FIG. 4, when an add file E-mail as in FIG. 8 is received, server 12 control passes through block 96 to block 98 and on to block 101. At block 101 server 12 attempts to identify which session the files attached to the E-mail are related to. To this end, a conferee sending files to attach to an already scheduled session, while knowing that she is scheduled for a session, may have no way of independently distinguishing the session from other sessions. In some cases a conferee may be scheduled to participate in multiple sessions further complicating the task of identifying which session queue files should be added to.

Where a conferee adding files to a queue is only associated with one scheduled session, server 12 may be programmed to use conferee identification information from the received E-mail to identify the session at block 101. In some cases, server 12 may simply move on to block 110 once a single session is identified. In other cases, server 12 may generate and transmit a confirmation E-mail to the conferee that sent the add file E-mail to confirm the conferees intent to add the files to the identified session queue. Where server 12 identifies two or more sessions that the conferee is scheduled to participate in, server 12 may generate and transmit a query E-mail asking the conferee to select one of the plurality of sessions to which the files should be queue for. Referring still to FIG. 4, at block 110, files attached to the received E-mail are added to an appropriate queue.

While not shown, a process similar to that described above may be supported for using an E-mail system to remove files from a session queue. For instance, another E-mail address associated with server 12 may be "RemoveFile@session.com". In response to this type of E-mail, server 12 may identify a session associated with the conferee and provide an E-mail including attached files previously added to the session by the conferee where files can be removed by detaching those files from the E-mail and re-sending the E-mail to server 12 to update the queue.

In some embodiments it is contemplated that a session initiator may want to immediately start a conferencing session instead of scheduling a session for a future time period. To immediately start a conferencing session, a process similar to that described above with respect to scheduling a session may be performed. The primary differences between starting an immediate session and scheduling a session would be that, to start an immediate session, an E-mail would be transmitted to a different server mailbox, such as, for instance, "startsession@session.com" and the initiator would not have to provide information describing the session start time or date. Referring again to FIG. 4, at block 98 if the received E-mail is an immediate start session E-mail, control may pass to block 203 and then to process block 204. At block 204, server 12 creates a new session record (see again FIG. 7) and instantiates a queue by adding files attached to the E-mail to the queue. At block 205, server 12 generates invite emails to invitees listed in the target field of the session initiating E-mail which are transmitted at block 206. At block 207, server 12 opens a session in a browser screen on the initiator's computing device 14, uses queue files from the session record to populate a file queue in the browser and adds the initiator to a conferee representation field in the browser after which control passes back to block 92.

If an invitee accepts an immediate session via an invite E-mail, referring still to FIG. 4, when the response E-mail is received, control passes to block 208 and on to block 209. At block 209, server 12 updates the session record to reflect acceptance. At block 210 server 12 adds any files attached to the response E-mail to the queue. At block 211 server 12 provides a browser interface to the invitee that accepted the invite and then control passes back up to block 92 in FIG. 4.

In at least some embodiments an immediate session invite E-mail may include a simple selectable icon or the like enabling a conferee join an ongoing session with selection of a single icon. To this end, see exemplary invite E-mail template 212 in FIG. 9 that includes "Join now", "Join in 10 minutes", and "Decline" icons 213, 214 and 215, respectively, an "Attachments" field 217, a "Regarding" field 216 and a message field 218. Server 12 generates the invite message in field 218 automatically. Server 12 also automatically generates the text in field 216 indicating the nature of the session. Files can be attached in field 217 to add to the queue. The invitee can immediately join the session and open a browser interface by selecting icon 213. The invitee can decline the invite by selecting icon 215. The invitee can indicate a desire to join the session in 10 minutes by selecting icon 214. If icon 214 is selected, an automatic message would be sent to all conferees already linked to the session notifying them that the one conferee will be delayed.

In at least some embodiments it is contemplated that the information included in an E-mail to the session server to initiate (e.g., schedule or start) a new conference session may not include all of the information required to initiate the session. For example, a plain English E-mail composed by a conference initiator to initiate a session may not indicate the date on which the session is to be scheduled or may not indicate conference invitees for the session. In fact, in at least some cases it is contemplated that the process of initiating a session may be started by simply sending a start or schedule E-mail to session server 12 without adding any information to other E-mail fields.

Where insufficient information for initiating a session is received within an E-mail, in at least some cases, session server 12 will be programmed to request missing information from the initiating conferee. To this end, a sub-process 230 that may be substituted for a portion of the process shown in FIG. 4 for obtaining additional required information for initiating a session from an initiating conferee is illustrated in FIG. 10.

Figure 10:
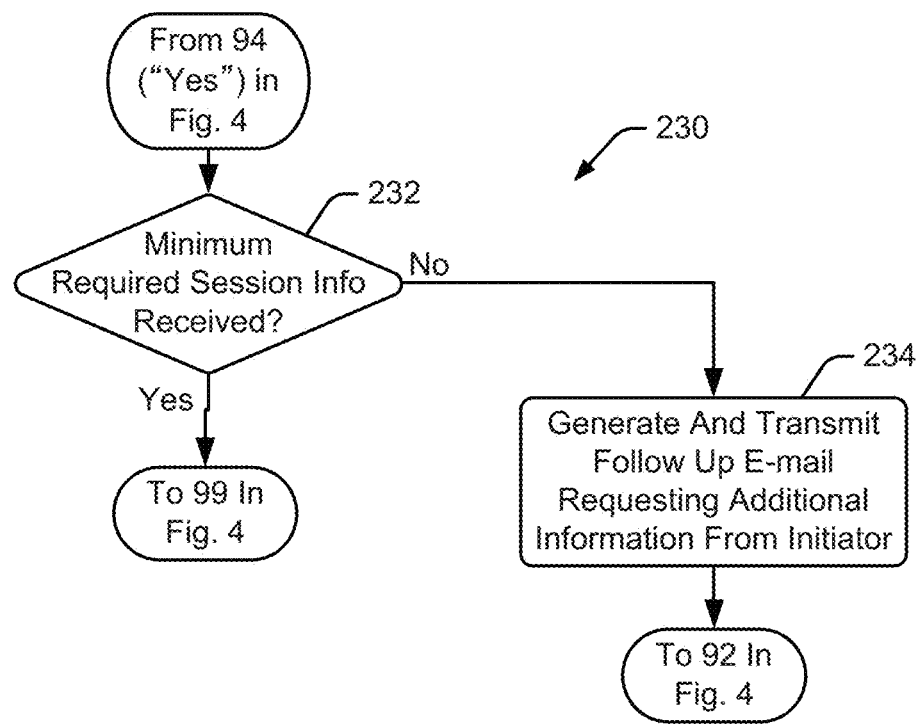
FIG. 10 is a flow chart illustrating a sub-process that may be substituted for a portion of the process of FIG. 4.

Referring to FIGS. 1, 4 and 10, after server 12 determines that a received E-mail is related to a new and unscheduled session, control passes to block 232 in FIG. 10. At decision block 232, server 12 determines whether or not the minimum required session information for scheduling a session is included in the received E-mail. Where the minimum required session information is included in the E-mail, control passes to block 99 in FIG. 4 where the process described above continues.

At block 232, if the minimum required session information has not been received, control passes to process block 234 where server 12 generates and transmits a follow-up E-mail to the initiating conferee requesting additional information. Although not shown, the follow-up E-mail may include a precanned reply E-mail with specific fields for entering required information. For instance, where an initiating conferee failed to indicate the date on which a session should be scheduled, the precanned reply E-mail may include a field labeled "date" that includes space for entering the session date. As another example, where the initiating E-mail failed to identify at least one other conference invitee, the reply E-mail may include a field labeled "invitees" and space for entering E-mail or other identifier information for invited conferees. After block 234, control passes back up to block 92 in FIG. 4 where the server waits to receive another E-mail message and the process described above is repeated. Although not shown, a subprocess similar to the subprocess shown in FIG. 10 may also be performed whenever an E-mail to start an immediate session is received where the E-mail does not include all information to start the session.

Figure 11:
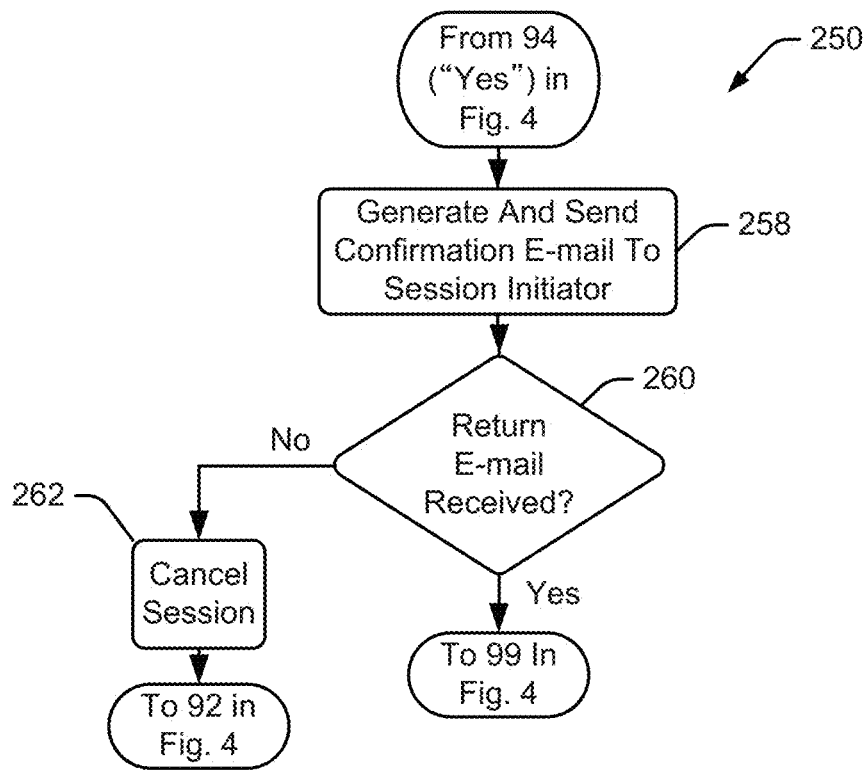
FIG. 11 is a flow chart illustrating a sub-process that may be substituted for a portion of the process of FIG. 4.

Even in cases where a conference session initiation E-mail includes all of the information required to initiate a conference, in at least some cases, server 12 may be programmed to send a confirmation E-mail to an initiating conferee to confirm that the session should be schedule. To this end, see the exemplary sub-process 250 in FIG. 11 that may be substituted for a portion of the process shown in FIG. 4 for generating a confirmation E-mail for an initiated session. Referring also to FIGS. 1 and 4, after server 12 recognizes that a received E-mail is related to a new and yet to be scheduled session at block 96, control may pass to block 258 in FIG. 11. At block 258, server 12 uses the information gleaned from the initiation E-mail received at block 94 to generate a confirmation E-mail to be sent to the initiating conferee. Here, the confirmation E-mail includes all of the details related to the session to be initiated and would include an "accept" icon or the like to be accepted by the initiating conferee. At block 260, server 12 monitors for a return E-mail in response to the confirmation E-mail. Where a return E-mail is not received, control passes to block 262 where the session is canceled after which control passes back up to block 92 in FIG. 4 where the process described above continues to cycle. At block 260, if a return E-mail is received, control passes to block 99 in FIG. 4 where the process described above continues to cycle.

Figure 9:
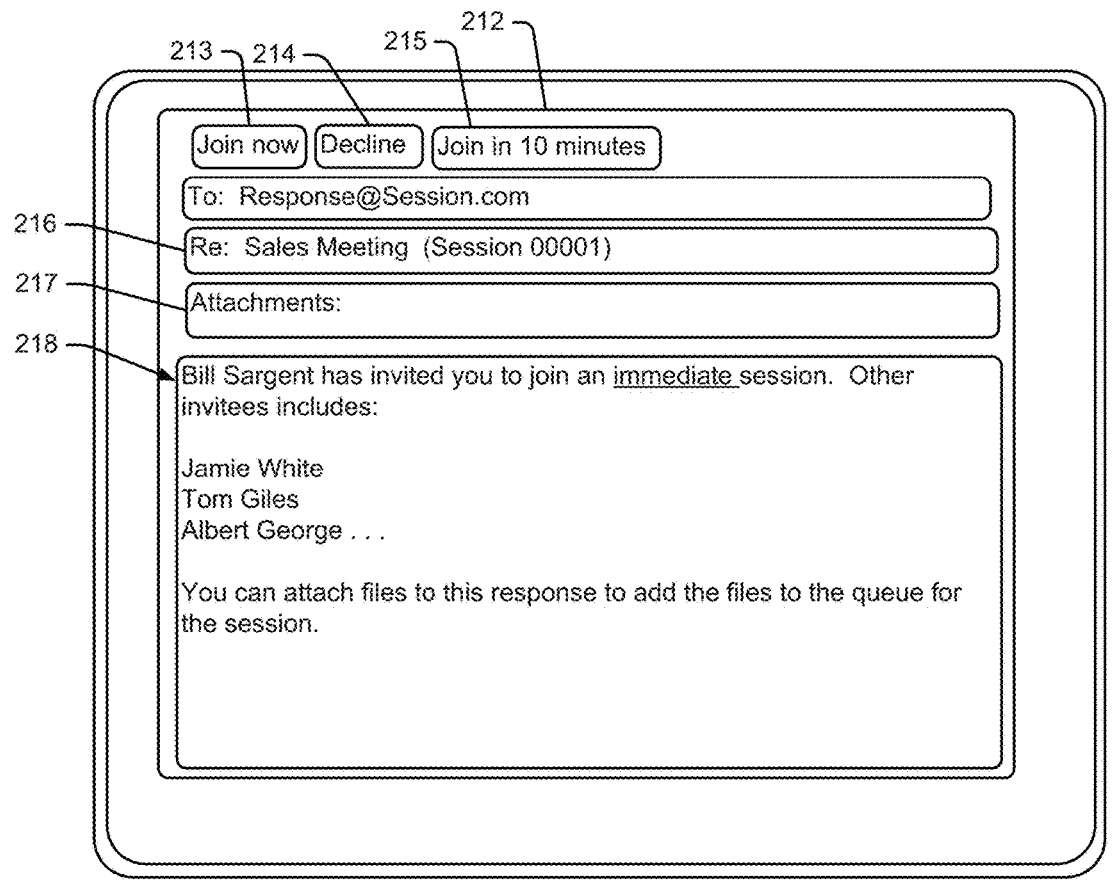
FIG. 9 is a screen shot illustrating an E-mail that can be used by a conference invitee to join a conference.

After a session has been scheduled and invitees have responded, a few minutes before (e.g., 15 minutes) a session is scheduled to commence, an E-mail may be transmitted to each of the conferees that agreed to participate with a selectable hyperlink that, when selected, opens a browser page associated with the session (see again, for instance, FIG. 9). In addition, upon selection of the selectable hyperlink, server 12 may start downloading all of the session queue files to the device used to select the hyperlink so that access thereto can be expedited during the session. Thus, for instance, in the present example, referring again to FIG. 7, all of the files in the session 00001 queue 228 may be downloaded to each of the user devices 14 as those devices link to server 12 to participate in the session. In the alternative, the queue files may be downloaded to each device 14 automatically before the session commences, at the time associated with the scheduled session or just after the session commences. In still other cases session queue files may be downloaded to user devices 14 hours before a session commences so that conferees have the chance to review session files prior to the session commencing. Downloading or caching files on all user devices should expedite the process of accessing al session content during a session.

Figure 12:
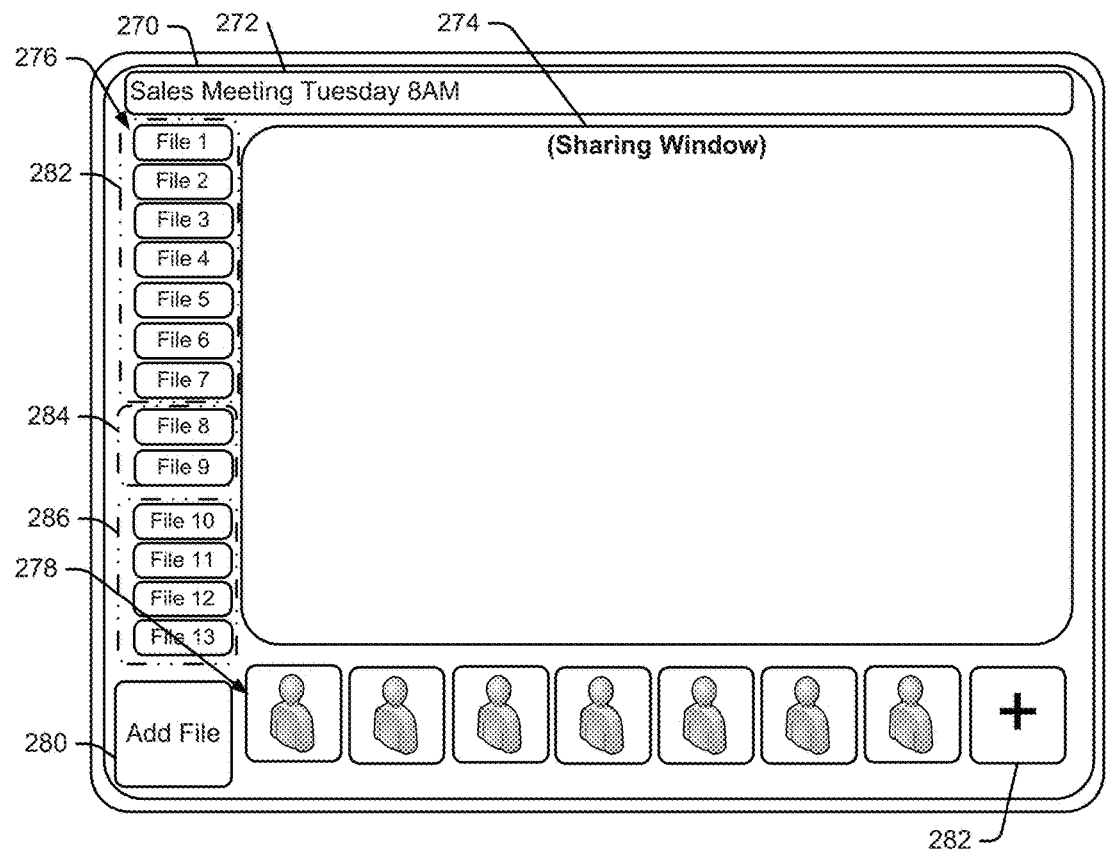
FIG. 12 is a screen shot showing a session interface that is consistent with at least some aspects of the present disclosure.

Referring now to FIG. 12, an exemplary session browser page is illustrated in a window 270. The exemplary page includes a session title or name field 272, a common or sharing field or window 274, a session file or document queue 276, conferee icons presented in a conferee queue identified by numeral 278, an "Add File" icon 280 and an add conferee or invitee icon 282. The session title field 272 includes the title of the session and is used by conferees to confirm that they have linked into an intended session. Any currently shared visual content or files including documents, videos, images, application output, etc., is presented in sharing field 274. In at least some cases it is contemplated that the content within field 274 will be the same for all conferees participating in a session. In these cases the difficulties associated with trying to make sure all conferees are viewing or at least have access to the same content during a session can be eliminated.

The conferee icons in queue 278 include a separate icon for each of the conferees that participates in a session. In at least some embodiments each conferee icon 278 will include an image of the associated conferee or some other identifier such as a name, an office association, etc. In at least some cases different colors will be associated with different conferees and the icons 278 may have some colored characteristic associated with the conferee color. For instance, the border box around a first conferee icon may be red, the border around the second icon may be blue, the border around a third icon may be green, etc. Actions performed by conferees that appear on the browser page or information associated with conferees may have subtle color related earmarks to help conferees distinguish activities by other conferees. For instance if a conferee uses a drawing tool or the like to highlight content in a file presented in field 274, the highlighting may be color coded to the conferee's related color (e.g., the conferee associated with red may highlight in red, the conferee associated with blue may highlight in blue, etc.).

Referring still to FIG. 12, thirteen files are shown in queue 276. If the queue includes more than the illustrated files, scrolling arrows could be provided enabling conferees to move up and down in the queue to access other files. The illustrated thirteen files include files 1-7 added to the queue in the above example by the session initiator, files 8 and 9 added to the queue by a first conferee Jennifer White and files 10 through 13 add to the queue by a second conferee Pat Smith (see again FIG. 8). In at least some embodiments the file icons in queue 276 may be color coded to indicate which conferee added the files to the queue. To this end, three phantom boxes 282, 284 and 286 are shown about the file subsets added to the queue by the conference initiator, Jennifer White, and Pat Smith, respectively. Here, the borders about each group 282 file may be highlighted red, the borders about each group 284 file may be highlighted blue and the borders about each group 286 file may be highlighted green to indicate conferees that added the files.

Figure 13:
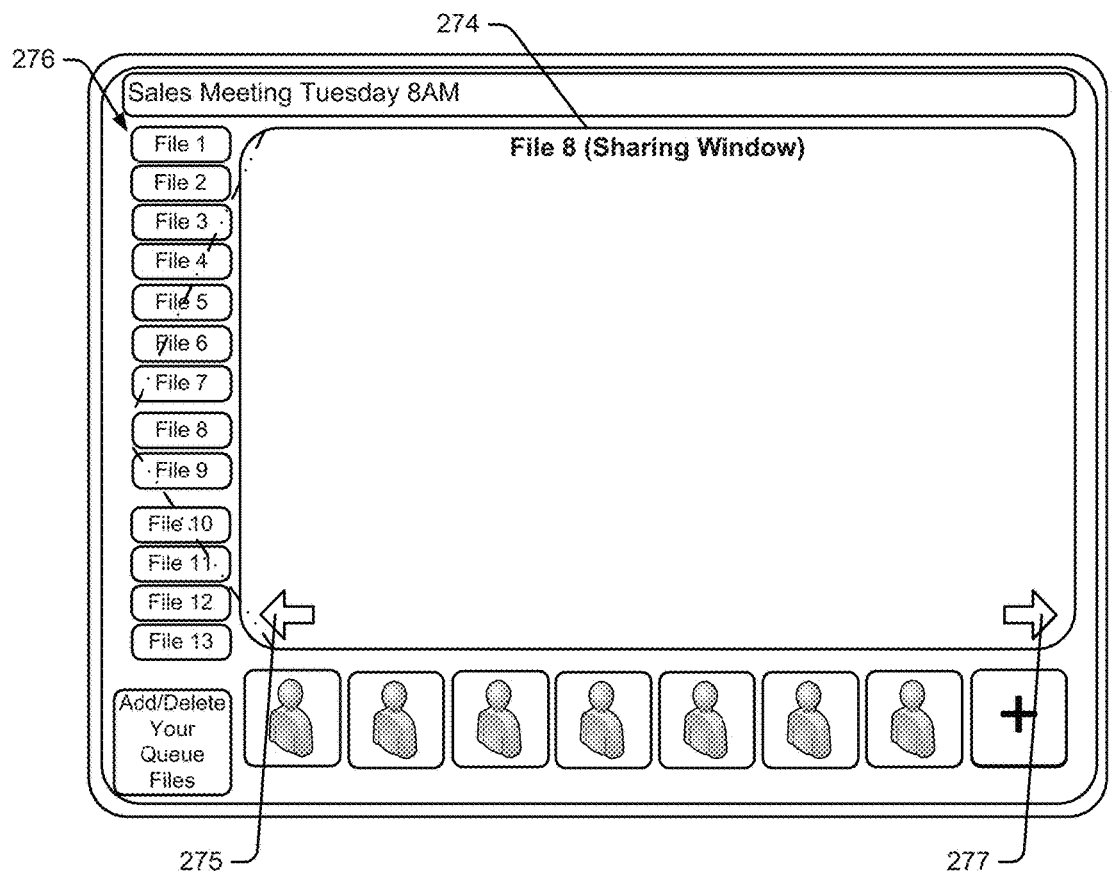
FIG. 13 is similar to FIG. 12, albeit showing another screen shot where a specific file has been opened in a common display space.

In at least some embodiments, regardless of which conferee added a file to the session queue, any conferee may be able to select any file from the queue to open the file for common viewing in common field or sharing window 274. Standard graphical interface tools may be used to select files. For instance, a mouse controllable pointer icon may be used to drag a file into sharing window 274, to double click on a file icon to open the file in window 273, etc. See FIG. 13 that shows File 8 opened in window 274. Here, the term "drag" is used to refer to selecting the iconic representation of a file from queue 276 and moving a pointing device from that selected point to the sharing window 274 where, upon release, an instance of the file or document is opened in the sharing space 274, where the iconic representation of the file in queue 276 persists within the queue. In other parts of this specification the term "drag" or the term "dragging" are used in a similar fashion where an icon dragged to another location still persists and the original location while an instance of a file, object or other data construct associated with the icon is then opened at the end location of the dragging action. In these cases, while an original object may not move during the dragging action, In some other cases in this specification the term "drag" may refer to actually moving a selected object from one location to another.

The feature that enables any conferee to take session control by opening a file in common field 274 is referred to generally as egalitarian control because no one conferee controls who has control at any time. In effect, any conferee can assume control of the common field 274 at any time and all conferees see the same content or file in the common field at all times and any conferee can open any queue file regardless of which conferee added the file to the queue.

When a file is opened in common or sharing window 274, the file icon in queue 276 is highlighted or otherwise visually distinguished from the other file icons in the queue. Where an open file has several pages as in a Power Point presentation or the like, scrolling icons 275 and 277 (see FIG. 13) may be presented for moving back and forth within the open file to show other pages. In at least some cases, while the file icon in queue 274 may be color coded to indicate the conferee that added the file to the queue, a border about common field 274 may be color coded to the conferee that opened the file currently presented in field 274. Thus, for instance, where a first conferee is associated with the color red and a second conferee is associated with the color blue, if the second conferee added file 8 to the queue and the first conferee opened file 8 in the common field 274, the file 8 icon in queue 274 would be bordered blue while the border about the open file 8 in field 274 may be red.

Figure 14:
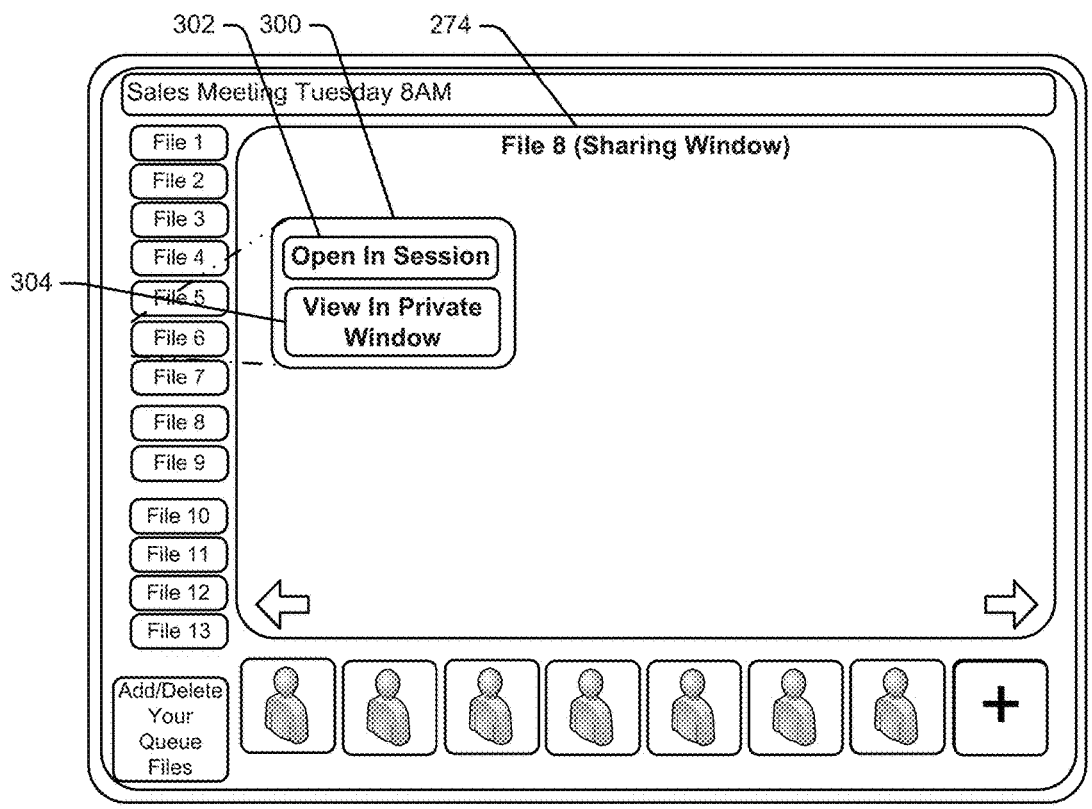
FIG. 14 is similar to FIG. 12 albeit showing another screen shot.

In at least some embodiments any conferee may be able to open any file in the queue in either the common field 274 or in a private window for independent and private viewing and consideration. To this end, see FIG. 14 where, when the file 6 icon is selected by a conferee on the conferee's display (i.e., via touch, mouse controlled cursers, etc.), an option tool or window 300 is opened giving the conferee the option to either open file 6 in the common field 274 by selecting icon 302 or to open file 6 in a private viewing window by selecting icon 304. Selection of icon 302 opens the selected file in common window 274. Selection of icon 304 opens the selected file in a private viewing window as shown in FIG. 15.

Here, private means that only the conferee that elected to open the file in the private window can see the instance of the file in the private window (i.e., no other conferee sees another conferee's private window). If two or more conferees open the same file in private windows at the same time, each can independently view a different instance of the file in their own private window. Similarly, if a file is opened in the common field and a conferee opens the same file in a private window, the conferee sees a different instance of the file than the instance viewed by all conferees in the common window. Because different conferees can view different instances of the same file at the same time, different conferees can view different parts of the same file at the same time. For instance, a first conferee may be viewing a first page of a Power Point presentation while a second conferee is viewing a tenth page of the same Power Point presentation at the same time.

Figure 15:
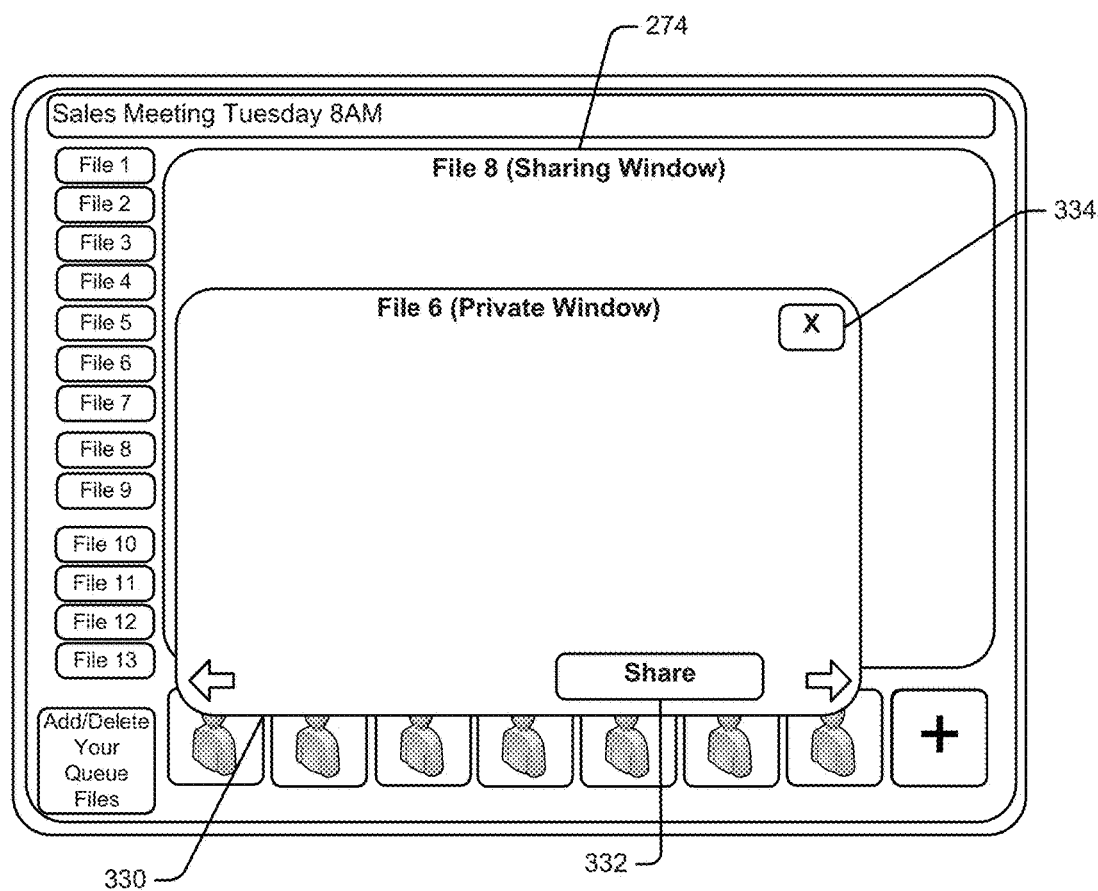
FIG. 15 is a screen shot showing a private window opened for viewing by a conferee.

Referring still to FIG. 15, while viewing a file in a private window 330, a conferee may select a share icon 332 to share the privately viewed file with other conferees in the sharing window 274. In at least some cases when a privately viewed file is shared, the view of the file when sharing is commenced will be the same as the view in the private window. Thus, for instance, where a conferee is viewing a tenth page of a document privately when sharing commences, the shared instance of the document will be presented with the tenth page open for viewing in field 274.

Figure 16:
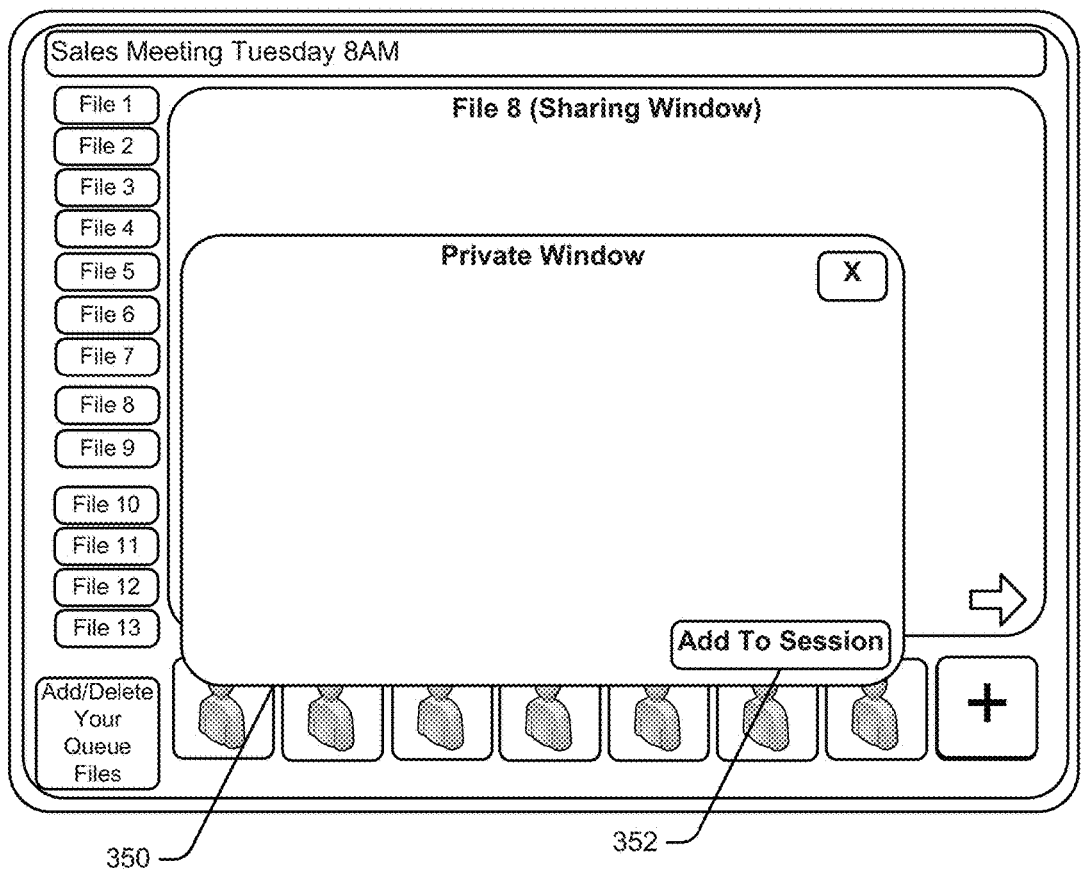
FIG. 16 is similar to FIG. 15 albeit where the screen shot enables a conferee to add a privately viewed image to a conference queue.

The browser representation in FIG. 12 is provided in a software window and therefore other windows can be opened up simultaneously if a device 14 user wants to view content that is not in a session queue and that is independent of the content viewed in common field 274. For instance, if a device 14 user wants to review a non-queued word processor document independent of the file opened in field 274, the user can simply open the document in a different private window either over the top of browser window 270 or to the side thereof if window 270 is reduced in size. To this end, see FIG. 16 where a private window 350 is shown opened over the browser interface.

In at least some embodiments server 12 enables conferees to add files to or remove their files from a conference queue during a session. For instance, referring again to FIG. 16, when a conferee opens a file that is not already in the queue in a private window 350, server 12 may automatically provide an "Add To Session" icon 352 in the private window that, when selected, causes the file opened in the private window to be added to the session queue 276. It is contemplated that files added to the queue will be added sequentially and that any file added will be color coded per the colors associated with specific conferees. When a file is added to the queue, instances of the file are immediately and automatically cached in memory associated with each of the devices 14 so that the newly added file can be rapidly accessed when required.

Figure 17:
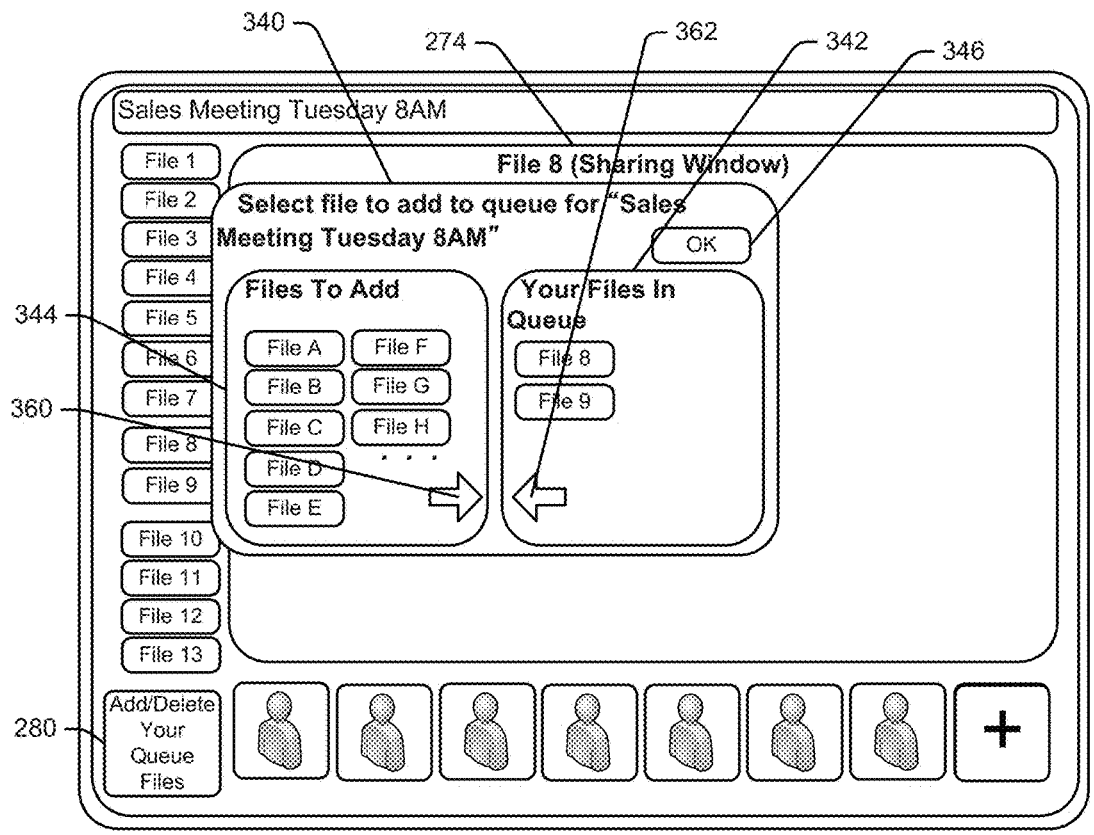
FIG. 17 is similar to FIG. 12 albeit showing another screen shot where a conferee can add or delete files from a conference queue.

Referring again to FIG. 12, the Add File icon 280 may also be used to add or delete queue files by name. Referring also to FIG. 17, when icon 280 is selected, in at least some embodiments, a queue management window or tool 340 may be opened for adding files to or deleting files from the session queue. The exemplary window 340 in FIG. 16 includes two lists of files including files 324 that have already been added by the conferee to the session queue and files 326 that have yet to be added to the queue. One or more files in either list can be selected to highlight the file icons and then arrow icons 360 or 362 can be selected to move the selected files from one list to the other. After a conferee is satisfied with the conferees files in the queue, the conferee can select an "OK" icon 346 to make the file swap into and/or out of the queue. When a new file is added to the queue 274, instances of the new file are cached on each of the linked devices 14. When a file is removed from the queue, in at least some embodiments the instances of the removed file in the device 14 caches are deleted therefrom.

In still other embodiments a session application may be downloaded onto a conferee's device and used to add files or other content to a session queue at any time. For instance, a session application may be downloaded to a smart phone or tablet type device that integrates with device content posting applications. For instance, here, after a picture is taken with a camera, if a conferee wants to post the picture to a session queue, the conferee can select a "Post" icon presented by the camera software interface to access sharing options for the obtained image like "Message", "E-Mail", "Twitter", "Facebook", etc. Once the session software is integrated with the posting application, another option called "Session" may be provided as a selectable icon for sharing by posting to a session queue. Here, if the "Session" icon is selected, the image may be transmitted to the session server 12 with conferee identifying information. Where the conferee is only associated with a single scheduled conference, the image may be added to the queue automatically. If the conferee posting the image is associated with more than one scheduled session, server 12 may respond with a query about which session queue to add the image to.

This simple application based process of adding an image to a session may be performed either prior to a session or during a session. For instance, if a conferee has a hard copy image that the conferee wishes to share with others during the session, the conferee may take an image of the hard copy with the conferee's device 14 and post the image essentially real time to the queue for sharing. Camera videos can be shared and posted to a session queue in the same fashion. As another example, the session posting option may also be used to share a news article, an internet link, a blog site, etc. To this end, the same posting icon can be presented via a smart phone, tablet device or any other type of device and may be selected to access a session posting icon to add any content to a session queue.

Figure 18:
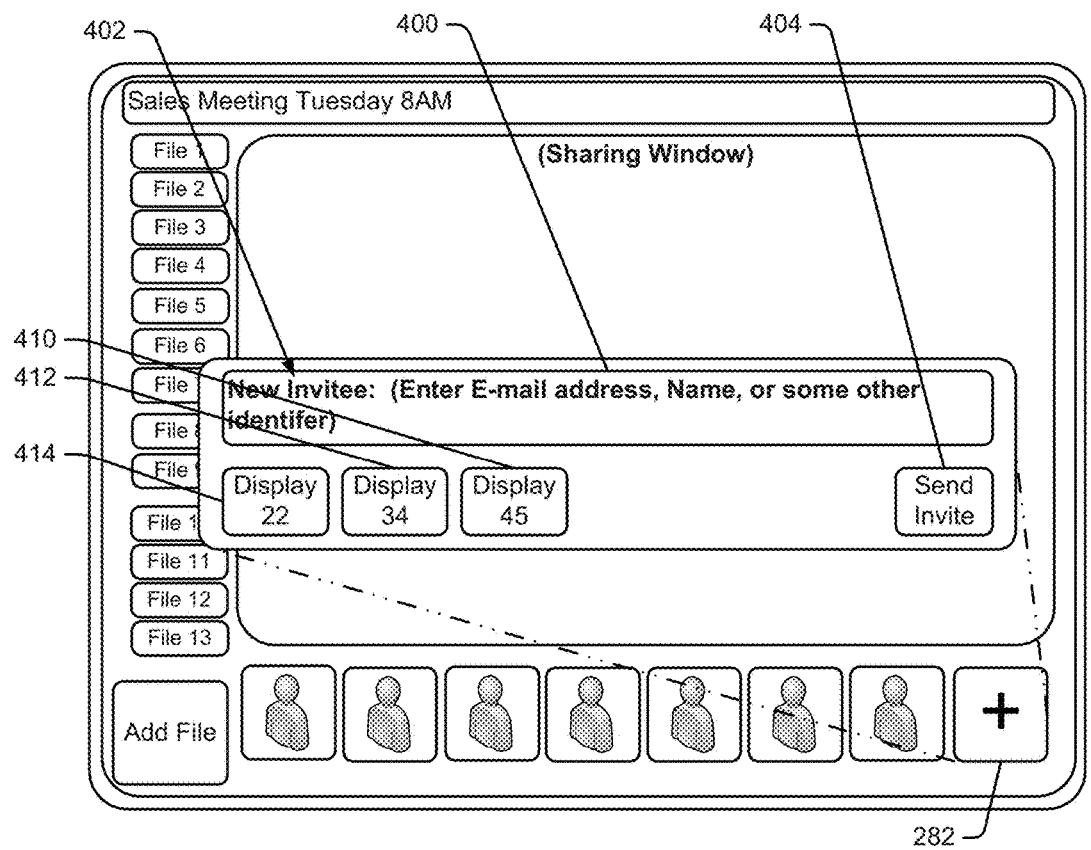
FIG. 18 is a screen shot showing an on screen tool for adding invitees and additional common display screens to a session.

Referring again to FIG. 12, other conferees can be invited to join an ongoing session by selecting icon 282. When icon 282 is selected, referring also to FIG. 18, a conferee adding tool or window 400 may be opened including a field 402 for identifying others to be invited to join the ongoing session and a "Send Invite" icon for sending invites to conferees identified in field 402. A user's contact storing software (e.g., often E-mail software) may be used to identify potential contacts to invite via a search tool associated with field 402. In at least some cases an invite to another conferee to be added will be in an E-mail form as described above and the conferee will be able to join the ongoing session by accepting the invite as described above.

Referring again to FIG. 1, it has been recognized that many personal computing devices like smart phones, tablets and even laptops have relatively small display screens that make it difficult to view large amounts of content. It has also been recognized that often times there are large unused display screens in the vicinity of personal device users that are not being utilized. In many cases large display screens are now being equipped with processors and software for running display programs and many are linked or linkable to computer and communication networks so that the large displays are independently addressable.

Even where a display is not independently addressable, most displays have input ports (e.g., HDMI) that can receive wireless processing dongles or devices (e.g., Chrome Cast by Google) that are independently addressable. To this end, see FIG. 1 that shows a large display 420 in a space (e.g., a conference room) corresponding to location 26 at which several personal computing devices are located. Here, display 420 either has a processor and a wireless transceiver built in or those components are provided in dongle 422 receivable in an HDMI or other type of port so that display 420 can be independently addressed for receiving content to store and/or display.

In at least some embodiments, a conferee simply invites display 420 to a session in some fashion and the session server adds the invited display to the session "conferees". Thereafter the display operates like any of the personal device displays to present session information to conferees in a large format. For example, if a conference initiator knows the address corresponding to display 420 or can identify display 420 in some other way useable by server 12 to identify the display address, the address or identifier may simply be added to the target field in a session initiation E-mail. For instance, display 420 may be labeled with a persistent display identifier such as "Display 22". Here, "Display 22" may be added to the target field in the initiation E-mail and may be useable by server 12 to discern the display address which is added to the list of session participants.

As another example, when dongle 422 is inserted in the display HDMI or other port, the dongle processor may boot up software to run an application that presents an address or associated identifier via display 420 that could be added to an E-mail target field. Here, a conferee may simply enter the displayed address into an E-mail target field and transmit the E-mail to server 12.

As one other example, referring again to FIG. 18, when icon 282 is selected by a conferee to add a new conferee to an ongoing session, server 12 may cause the conferee's device to wirelessly or otherwise identify large screen/display options in the near vicinity and the options may be provided as an option list to be added to the invitee field 400. To this end see the screen option icons 410, 412 and 414, any of which may be selected to add a proximate large display to an ongoing session.

Although not illustrated, it is contemplated that large screens could also be added to scheduled sessions in a similar fashion to effectively reserve the screens for future use during s scheduled session. Where a screen is reserved for use during a future session, each screen or the system as a whole may be programmed to maintain its own schedule and to report scheduled activities to conferees attempting to use the screens for other sessions. For instance, if a particular screen is scheduled to be used in 20 minutes for a first session, if another conferee attempts to use the screen for a second session, the system may not allow use for the second session or may provide notice that the screen is only available for the next 20 minutes or some sub-period thereof. Where the system does not allow a screen to be used because of a conflict with scheduled use, the system may provide notice that the screen cannot be used. In more complex systems the system may enable users to view an entire schedule for a screen on the display itself so that a user could view open times and then select a specific time slot for scheduling and the system could enable scheduling via the screen itself.

Figure 19:
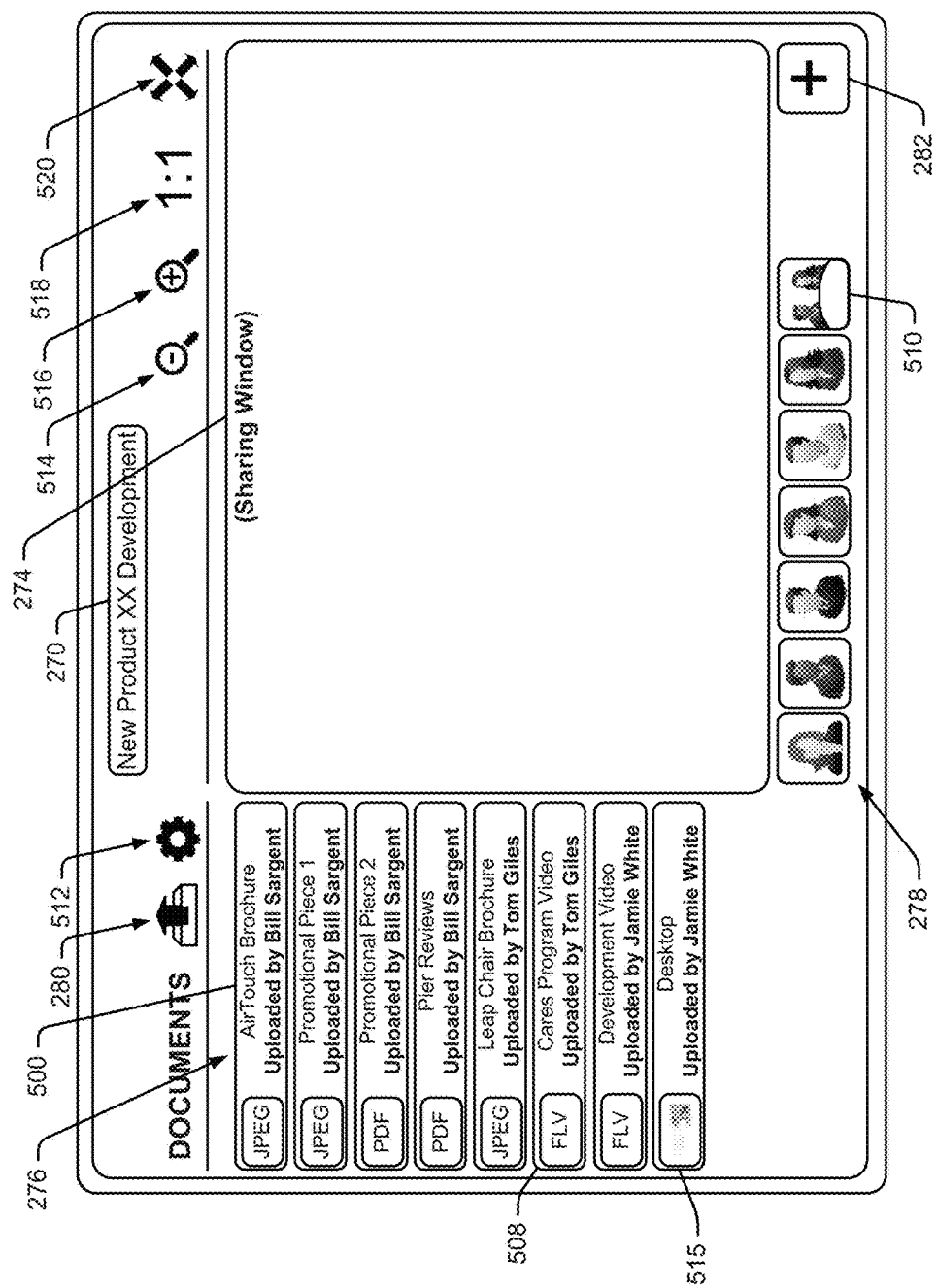
FIG. 19 is a screen shot showing another version of a conferee's interface that is consistent with at least some aspects of the present invention.

Referring now to FIG. 19, another exemplary screen shot showing a session display screen is illustrated that includes a session title field 270, a session queue 276, a conferee queue section or area 278, a sharing window or field 274 and various intuitive tool icons. The title field 270 indicates the title of a session related to the screen shot which, in the exemplary illustration, is "New Product XX Development". The session queue 276 includes icons that form a list of documents added to the queue by different conferees. The exemplary list includes JPEG documents, PDF documents, flash video files, etc. For instance, a first exemplary icon 500 indicates a JPEG document that was uploaded to the system by Bill Sargent that is titled "AirTouch Brochure", an exemplary flash video file icon is labeled 508, etc.

The conferee queue section 278, as described above, includes an image icon of each of the conferees that is currently linked into the session. In some cases where conferee devices include video cameras (see exemplary cameras 19 in FIG. 1), the images can be replaced by live streaming video of each of the conferees. Where a common display screen 420 for possible use by multiple local conferees includes a camera 852, one of the icons 510 may include an image of a general space in front of the common screen so that a scene including two or more local conferees can be presented in the conferee queue section 278. Where only some user devices include video capturing capability and others do not, a hybrid system is contemplated where video icons are provided when available and images are provided for other conferees. Referring still to FIG. 19, sharing window 274 operates in a fashion similar to that described above.

When a page of a document or the like is opened in space 274, icons 514 and 516 can be used to zoom out and zoom in on the image within the window. Icon 518 can be used to return to a full page image where the currently viewed page of the document is fully exposed in sharing space 274 for viewing. Icon 520 can be selected to expand the sharing window 274 to cover substantially the entire screen (e.g., so that the document and conferee queues and the on screen tools are removed from the screen). Icon 282 can be used to invite another conferee or another screen to the session.

Figure 20:
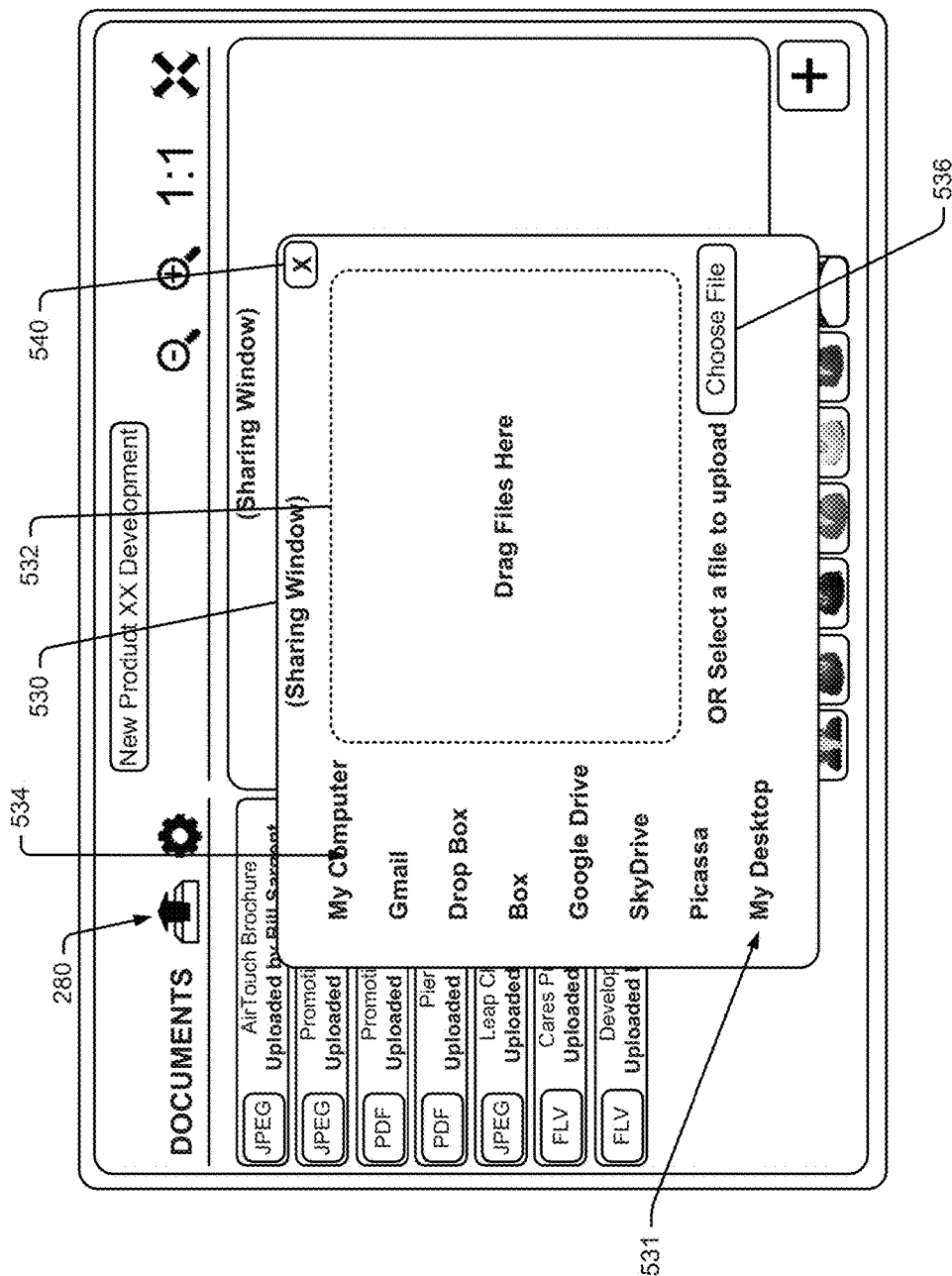
FIG. 20 is a screen shot showing a window for adding content to a session queue.

Referring still to FIG. 19, icon 280 is an upload icon which can be used to add another document to the queue 276 at any time. For instance, referring also to FIG. 20, when icon 280 is selected, the system may open an upload window 530 that includes a list 534 of document sources from which a document may be retrieved, a receiving field 532 for receiving a selected document and a "Choose File" icon 536. Exemplary sources in the list 534 include "My Computer", "Gmail", "Drop Box" "Box", "Google Drive", Sky Drive" and "Picassa". Many other sources are contemplated. To select a document to be added to the queue, a conferee may select one of the sources in list 534 followed by selection of icon 536 to access all of the files within the selected source. Once a source is opened to view documents within the source, one of the documents may be selected by either dragging the document icon into space 532 or by double clicking the document to indicate selection. Close icon 540 can be selected to close upload window 530.

Figure 21:
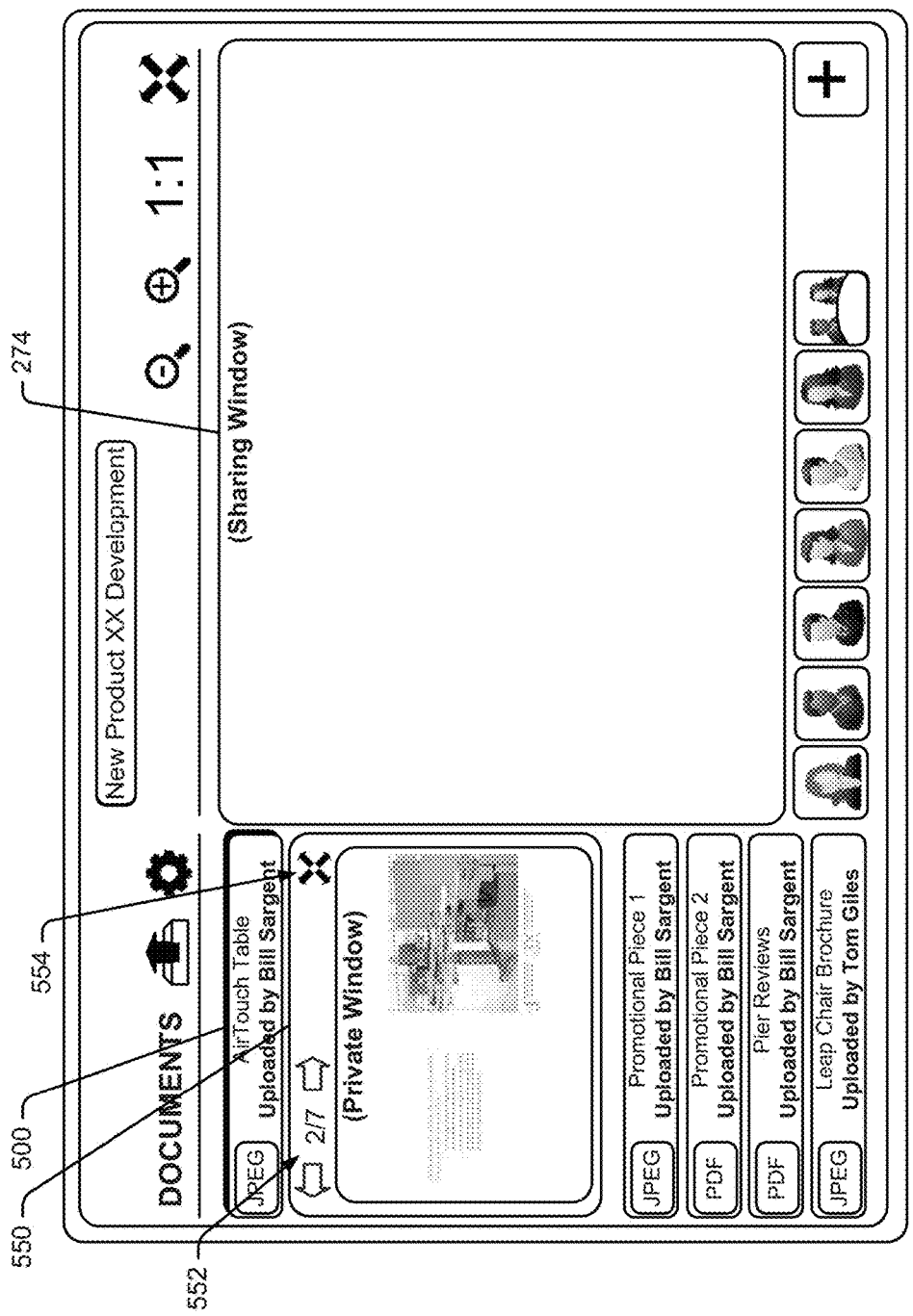
FIG. 21 is a screen shot showing a sharing window, a private window and a document queue that is consistent with at least some aspects of the present invention.

In the FIG. 19 embodiment, when one of the document icons in queue 276 is selected via a double clicking action or the like, the document associated with the icon is opened in a private window or field as described above and the selected document icon is highlighted or otherwise visually distinguished in some fashion. To this end, see FIG. 21 where private window 550 has been opened and selected document icon 500 is shown with a highlighting shadow to change the visual appearance of the icon on the display. As can be seen, window 550 is relatively smaller than sharing window 278 and in fact is opened, at least initially, within the queue field 276 so that the private window does not overlap or interfere with observation of the sharing window 274. To make room for the private window in the document queue, document icons below the selected document icon are slid downward so that the private window 550 can be opened within the queue without obstructing a view of the other document icons. While smaller than the sharing window 274, the private window is still large enough on most display screens for a conferee to comprehend the content in the window 550.

When the private window 550 is opened, additional tools for manipulating the document in the private window are provided at the top of the window. For example, in FIG. 21, the exemplary tools include a page counting and progression tool 552 and an expanding window icon 554. Tool 552 includes arrow icons that can be selected to move backward and forward within the document opened in the private window. For instance, in the case of a PDF, the PDF may include seven pages and the currently presented page can be changed via the arrows. Tool 552 also reports which page of the total number of pages is currently being presented. The expanding window tool 554 can be selected to increase the size of the private window. To this end, see also FIG. 22 where the private window 550' has been expanded to a larger size for easier viewing. Here, the private window overlaps the sharing window 278 at least somewhat to accommodate the larger size for more detailed viewing.

Figure 22:
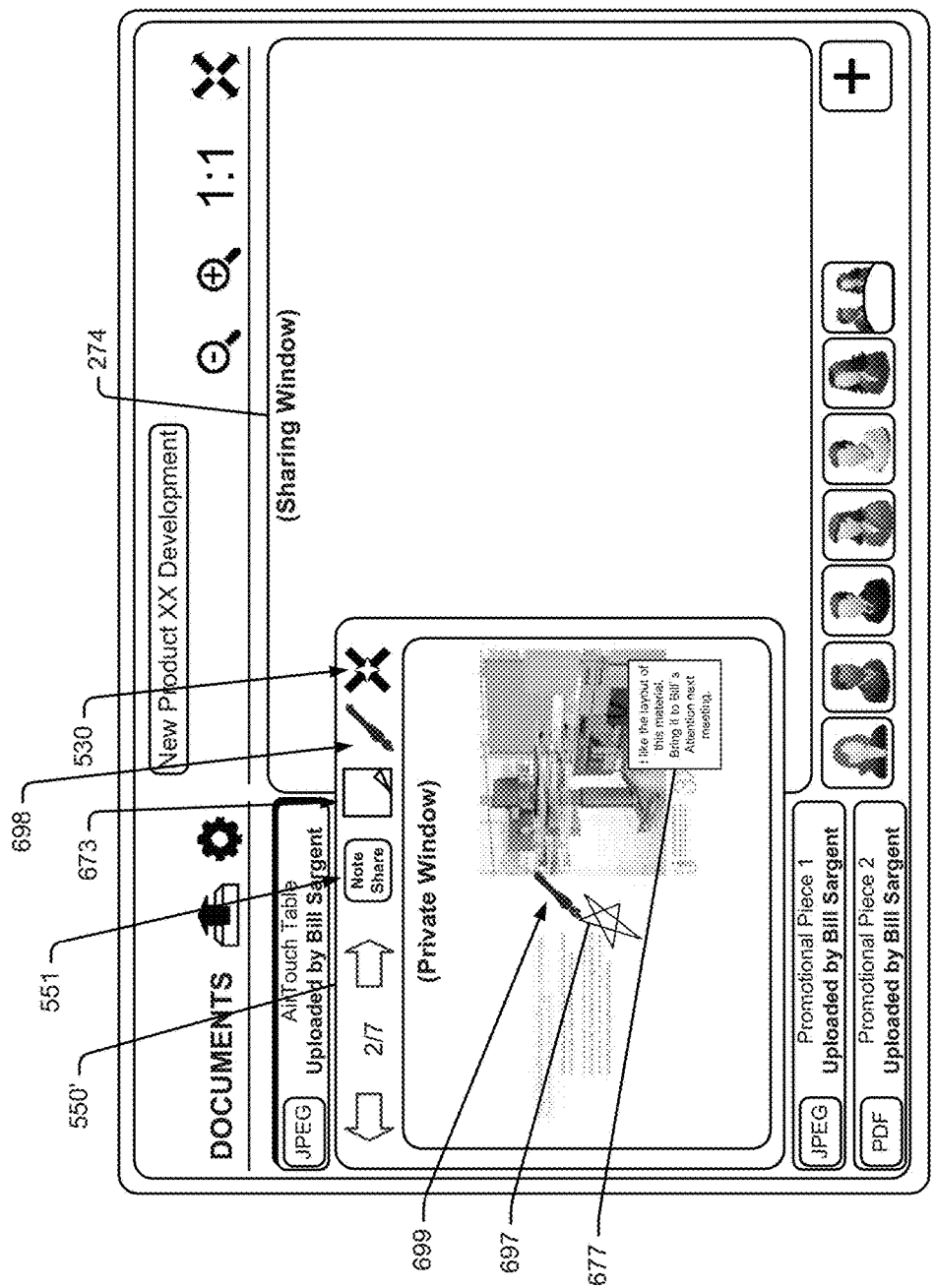
FIG. 22 is a screen shot showing the private window of FIG. 21 enlarged.

Other tools that may be presented for use in the private window are represented as icons in FIG. 22 and include a post note icon 673 and an annotation icon 698. The post note icon 673 can be selected to add a note to any one of the document pages as shown at 677. Each post note 677 may be dragged about on the page presented in the private window via touch, an on screen cursor, etc., and dropped at a location at which the note should be posted. Annotation icon 698 can be selected to enable annotation or drawing tools such as the pen shown at 699 in FIG. 22 that can be moved via a mouse, touch of a user's finger or a stylus or in some other fashion to annotate a page in the private window. Annotations and post notes are stored along with the pages on which they are applied and can be removed and modified if desired. While tools 673 and 698 are shown presented as part of the larger private window 550', those tools may also be provided as part of the smaller private window 550 shown in FIG. 21. A shrink window icon 530 is also provided along with the private window 550' for shrinking larger window 550' back down to the size of smaller window 550.

Referring still to FIG. 22, when annotations (e.g., notes and markings) are added to a document page within private window 550', in at least some embodiments those annotations may be added to all other instanced of the document maintained by the system regardless of whether or not those instances are currently being viewed by any of the conferees. For instance, where five conferees are patched into a session and one of the conferees opens a private window and annotates the fifth page of a seven page document, the system may automatically add the same annotation to the fifth page of each instance of the document maintained by the personal devices used by the other four conferees to participate in the session even if none of the conferees is currently viewing the fifth page of the document. In this manner any annotations or other comments added to documents within the queue can be annotated by anyone and any time any of the documents is opened by any conferee, the annotations can be viewed.

In other cases conferee annotations made on documents in the private window will remain private and will never be shared with other conferees. This private notation feature is useful as it would enable any conferee to think freely while taking notes on a document without concern for how annotations may be perceived by others.

In still other cases conferee notes and annotations made on documents in the private window may remain private until the conferee that authored the annotations moves a document or a page including the annotations into the sharing window 276. By enabling a conferee to control when privately authored notes are presented to others, the system may enable a conferee to reveal private thoughts at a staged time as opposed to whenever any other conferee independently views private thought.

In still other cases, notes and annotations made in a private window may remain private and only be made public when a conferee takes some affirmative step to publish those notes to the larger group. For instance, referring again to FIG. 22, if a conferee annotates or adds a note to a document page in private window 550' and then moves the document to sharing window 274, the document may be moved to the sharing window and sent to other session linked devices without the annotations or notes. In this case, if the document is still open in the private window 550', the conferee can use the notes in the private window to talk about the instance in the public sharing window 274. If, at some point, the conferee wants to share the notes or annotations on a document page, a mechanism may be provided for doing so. For instance, in FIG. 22, a "Note Share" icon 551 in the private window 550' may be selected to publish notes and annotations from an instance of a document page in the private window 550' to an instance of the document page in the sharing window 274. Similarly, icon 551 may be selected in some embodiments to publish notes and annotations to all instances of a document page regardless of whether or not a page is currently viewed in the sharing windows. Thus, for example, where annotations and notes are added to a document page in a private window 550', at least initially the annotations and notes may not be added to other instances of the page cached by other session linked devices. Then, upon sharing notes via icon 551, the annotations and notes may be transmitted to the other session linked devices to be added to the other instances of the page.

Other ways to empower a conferee to control when private annotations and notes are revealed to other conferees are contemplated. For instance, when a document including notes or annotations is moved to a shared window, the system may be programmed to provide a pop up window that presents the option to either show the document with or without annotations and notes. Here, the pop up window may pop up only when an annotation authoring conferee moves a document to the sharing window in some cases.

In other cases the system may be programmed so that, whenever any conferee moves a document to the sharing window, any conferee that has privately annotated an instance of the document being moved is presented with a pop up window to control if the private annotations should be shared. For instance, where five different conferees have privately annotated a ten page document in various ways, when any conferee moves an instance of the document to the sharing window, each of the five conferees that annotated the document may be presented with the pop up window for indicating if the private annotations should be shared. Here and in other cases, one or any subset of the conferees may share their private notes and if two or more share, the private notes of each sharing conferee would be added to the document in the sharing window and to each instance of the document stored by the system. In some cases the annotations may be color coded to the conferees that added the annotations. For instance, where conferee images or videos in conferee queue 278 are highlighted with different colors, the annotations or notes may be color coded to the conferees that added the annotated or notes.

In still other cases separate notes and annotations on a document page in a private window may be published individually or as a subset of a larger group of annotations on the page. To this ens, see again FIG. 22 where one annotation 679 and one note 677 have been applied to a page in the private window 550'. If the document is moved to the sharing window 274, at least initially, the document may be presented in space 274 without the note and without the annotation and the instance of the document in the private window 550' will persist along with the note and annotation. Then, the conferee may discuss the instance of the document in window 274 with linked conferees. After a few minutes, if the conferee decides she would like to share note 677 with the larger group but does not want to share annotation 679, the conferee may drag note 677 to the sharing window 274 and drop the note in space 274. Upon dropping the note, the note may be placed in the same relative location in window 274 from which the note was moved in window 550. In other cases the note may be dragged to the "Note Share" icon 551 to place the note on the page in the sharing window 274. Other tools for replicating a note or an annotation on a document page in the sharing space 274 are contemplated.

In some cases a tool for selecting more than one annotation or note but not all on a page for publishing is contemplated. For instance, a lasso type selection tool may be provided so that, if there are five annotations on a page, a conferee can select two of the five by drawing a circle around the two. Thereafter the combined two annotations may be published together without the other three annotations.

Figure 23:
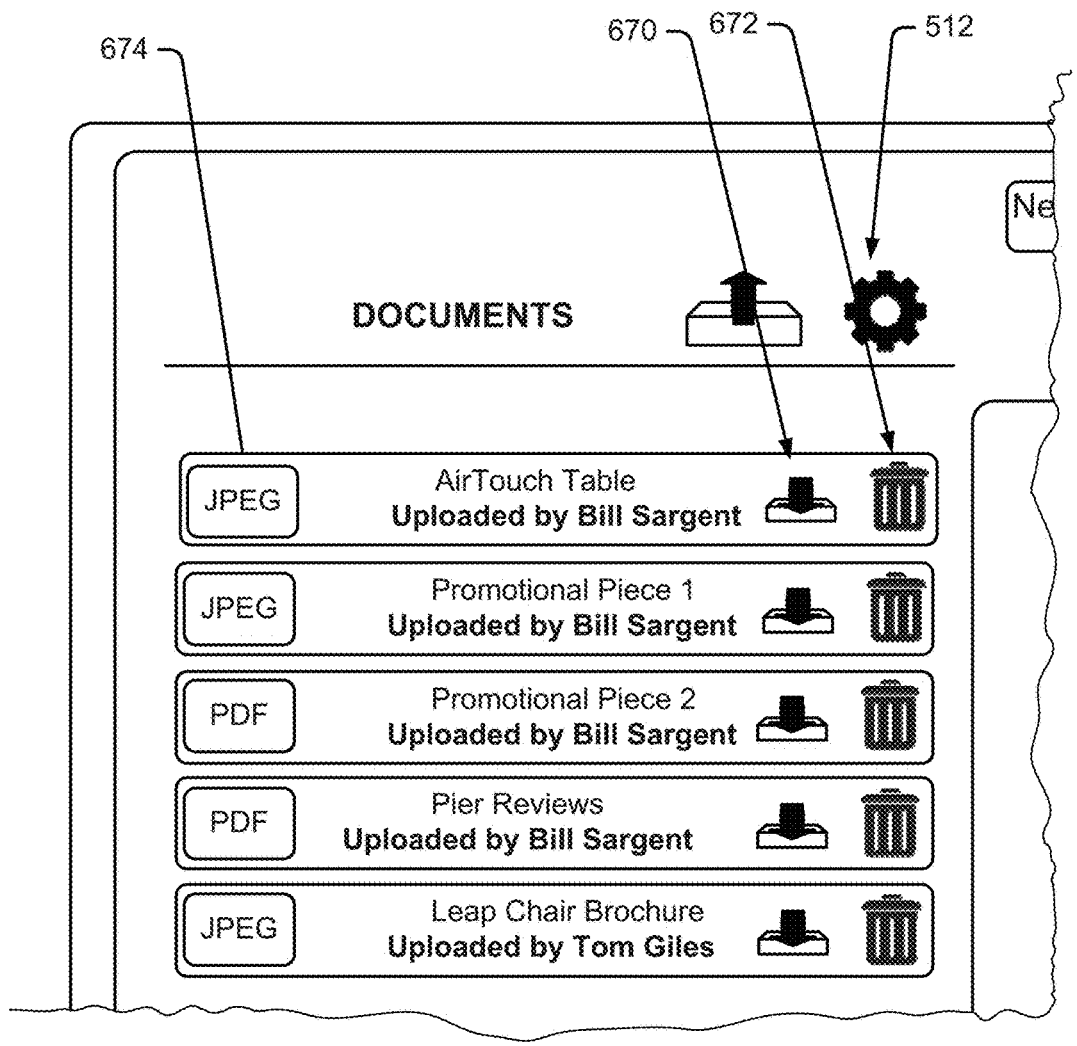
FIG. 23 is a partial screen shot showing download and trach tools for each queue document.

Referring again to FIG. 19, a utilities icon 512 is also provided above the document queue that can be selected to further manage queue documents. In this regard, see FIG. 23 where icon 512 has been selected and a download icon 670 and a trash icon 671 have been added to each of the document icons (e.g., 674) in the document queue. Download icon 670 can be selected to download an associated document to a conferee's own computer outside the session browser. For instance, in the case of a PDF, selection of icon 670 causes a PDF viewer to open outside the session browser and an instance of the selected PDF document to be opened in the viewer via a single action (e.g., selection of icon 670). The conferee can then privately store the open instance on the conferee's computer or perform any other function on the instance of the document (e.g., e-mail the document to someone else, annotate the document in a drawing program, run a tool like an optical character recognition program on the document, etc.). Any queue document can be trashed by selecting trash icon 671 associated with the document icon.

To open a document in sharing window 274, a conferee can select a document icon from queue 276 and drag into window 274. Here, the dragging action will cause a ghost version of the document icon to move along to window 274 while the original document icon remains in queue 276.

Figure 24:
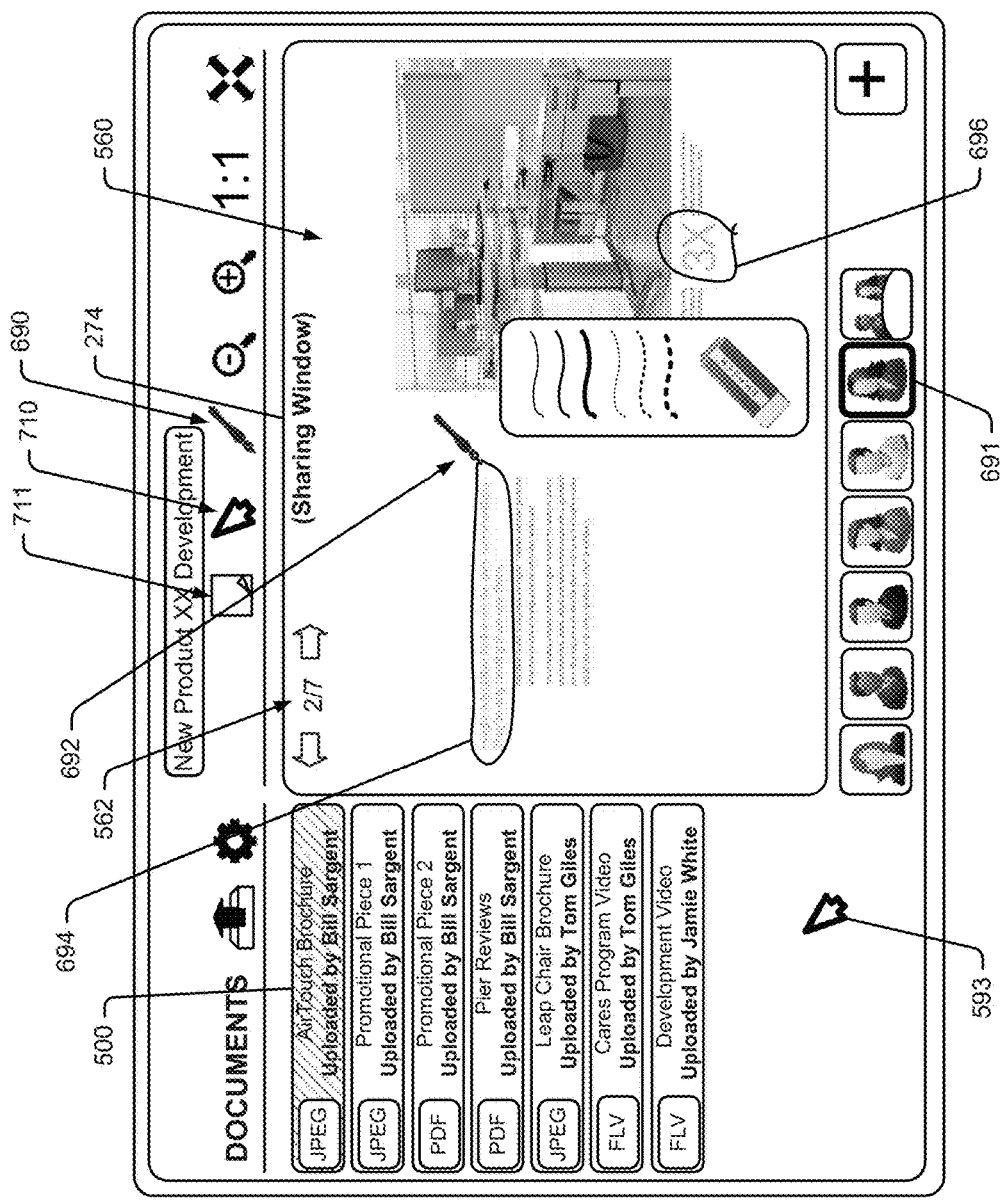
FIG. 24 is a screen shot showing a document opened in a sharing window with some annotations on the document.

As shown in FIG. 24, in at least some cases, when a conferee opens a document in sharing window 274, the image or video icon showing the conferee that opened the document in the window may be highlighted or otherwise visually distinguished in some fashion (see cross-hatched icon at 691). The icon may only remain highlighted for a set period of time (e.g. 7 seconds) or may remain highlighted until another conferee moves a different document into the window 274, changes the page of the document within window 274 or performs some other function like annotating or applying a note to a page in window 274. Thus, the highlighted conferee icon may persistently indicate the last conferee to move a document to space 274, the last conferee to annotate a document in space 274 or the last conferee that performed any action in space 274.

When a document is moved to space 274, the document icon in the queue may be visually distinguished in some fashion. For instance, in FIG. 24, icon 500 corresponding to the document in space 274 is shown as cross hatched to indicate a change in color or some other visually distinguishing change. Compare the shadow box highlighting of icon 500 in FIG. 21 which indicates a document opened in a private space with the cross hatched icon in FIG. 24 which indicates a document opened in the sharing window 274 where the different highlighting is to convey the fact that a document is opened in different windows. As described below, a single document may be opened in a private space and in the sharing space 274 and both highlights (e.g. cross hatching and the shadow box) may be applied to a single icon. Thus, in FIG. 24, the highlighted document icon indicates which document is opened in the sharing window 274 as well as the conferee that initially uploaded the document to the session queue while the highlighted conferee icon 691 in the conferee queue may indicate the last conferee to perform any function within sharing window 274.

Annotation, note and pointing tools may also be provided for use by conferees within the sharing window 274. To this end, see FIG. 24 where a screen shot includes annotation tool icon 690, a pointing icon 710 and a post note icon 711. These icons 690, 710 and 711 would be provided to all conferees in at least some embodiments. To use annotation tool icon 690, a conferee selects the icon 690 and is presented with an on screen pop up drawing window 695 that enables the conferee to select a drawing effect. For instance, exemplary effects may include different thickness lines, solid or spaced lines, different color lines, an eraser, etc. The conferee can select a drawing effect and can then move a drawing icon 692 about on the conferee's device display to annotate as shown at 694 and 696.

In at least some cases, when any conferee annotates a document page in sharing space 274, the annotations are added to each instance of the document page shown by each of the other session linked devices essentially in real time and the annotations persist until they are erased. In other cases the annotations may be removed from a page when the document presented in space 274 is replaced with another document. In still other cases annotations may be removed when a page in space 274 is replaced by another page in the same document or by another document. In still other cases at least one of the drawing tools may only result in a temporary timed annotation. For instance, if the temporary drawing tool is used to apply annotation 696 in FIG. 24, the annotation may only last 7 seconds and then fade away. This temporary annotation feature enables conferees to point out some aspect of a display in common space 274 on all screens for a short time and then removes the annotation so that the page remains uncluttered. As in the case of the private window annotation tools, annotations in sharing window 274 may be color coded to specific conferees (e.g., where the borders around conferee icons associated with Bill Sargent and Jamie White are red and blue, respectively, annotations by Bill and Jamie may be red and blue, respectively).

To use the post note tool 711, a conferee can select icon 711 causing a post note instance (not illustrated in FIG. 24 but see 677 in FIG. 22) to be presented in sharing window 274. The note can be dragged via a pointing icon 593, the touch of a finger, etc., to a target location and dropped. When a note is dropped, in some cases a virtual keyboard may be presented to enable the conferee to type in text for the note. In other cases the note instance may be enlarged and enable a conferee to scribble via a stylus, a finger tip, etc., on the face of the note to add content. In this case, once the content has been added, the conferee can indicate completion and the note will be shrunk down to its original size (e.g., the conferee may signal completion by double tapping the note). Notes may persist and may be mirrored on other session device displays in any of the manners described above with respect to annotations.

Referring still to FIG. 24, at least some conferee devices 14 (see again FIG. 1) include a mouse or other device controlled pointing icon 593 for selecting or moving (e.g., dragging) other icons about on a conferee's device display. When the pointing icon 593 is outside sharing window 274, the pointing icon is private and its location is not presented on the displays used by other session conferees. Here, however, in at least some cases, when a conferee moves a pointing icon 593 into sharing window 274 on the conferee's device display, the icon will appear in the sharing windows on other conferee display screens so that the conferee can point to distinct content or sections on a page. Each pointer icon in a shared window 274 is duplicated in all other shared windows. Thus, for instance, where four conferees have located their pointer icons in space 274, each of the four would be shown in each of the sharing windows on each display linked to the session. The pointing icons in at least some embodiments will be color coded so that conferees can comprehend which conferee is pointing at which sections of a shared page. Pointer tool icon 710 can be selected to switch from the annotation tool to the pointing tool.

Referring yet again to FIG. 24, a progression tool 562 akin to the progression tool 552 described above is presented in sharing window 274 for moving forward and backward within the document presented in space 274. Any conferee can use tool 562 to advance or move backward within a document.

Figure 25:
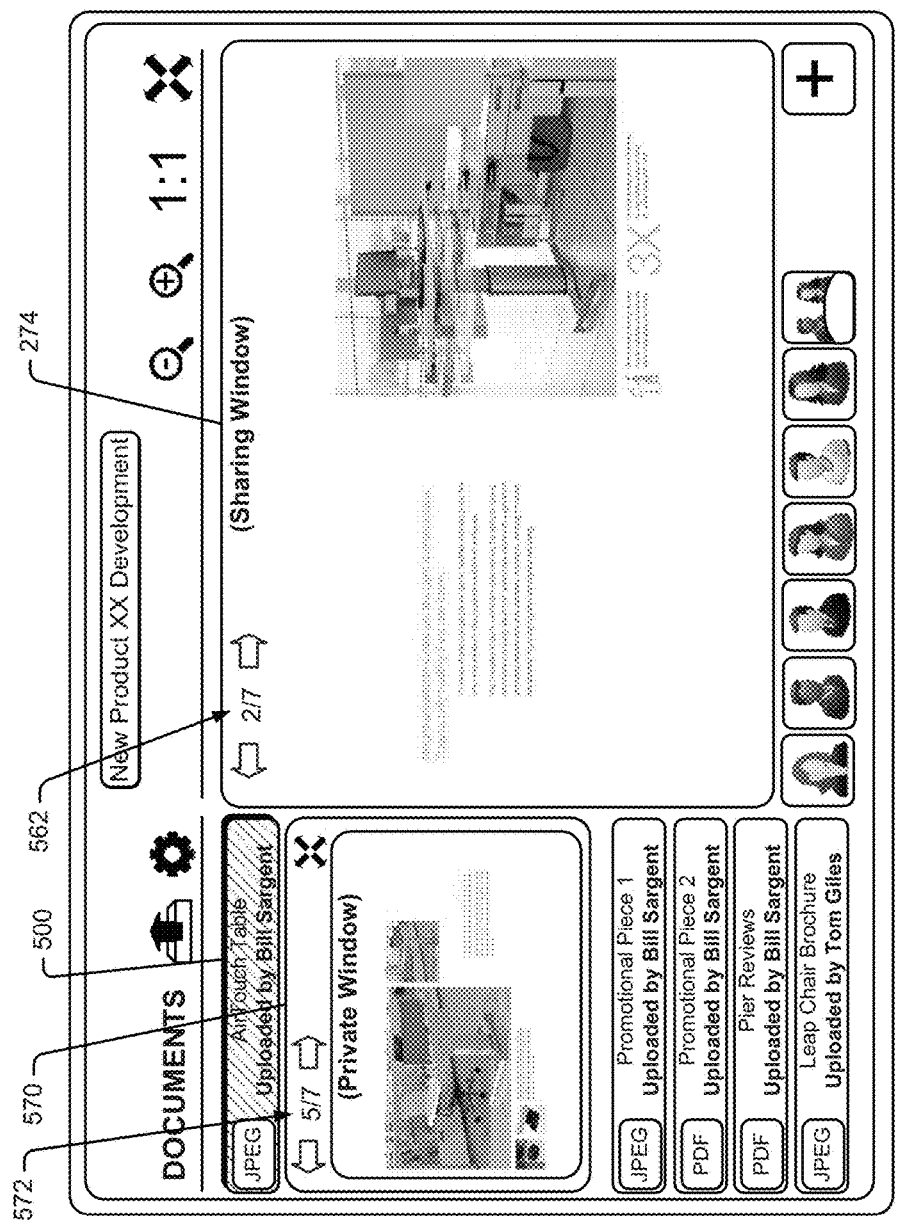
FIG. 25 is a screen shot showing different pages of the same document opened in a private window and a sharing window.

Referring now to FIG. 25, an exemplary screen shot from a device linked to a session is illustrated where a single document is opened in both a private window 570 and in the sharing window 274. The document icon corresponding to the opened document is highlighted in cross hatch to indicate that the document is open in the sharing window and is also highlighted with a shadow box to indicate that the same document is opened in the private window 570. The progression tool 552 associated with the private window indicates that the instance of the document in the private window is on page 5 of 7 while the progression tool 562 associated with the sharing window 274 indicates that the instance of the document in the sharing window is on page 2 of 7. Again, private window 570 is only presented to the specific conferee that opens that window while any documents in sharing window 274 are mirrors in the sharing windows on other devices linked to the session.

Figure 26:
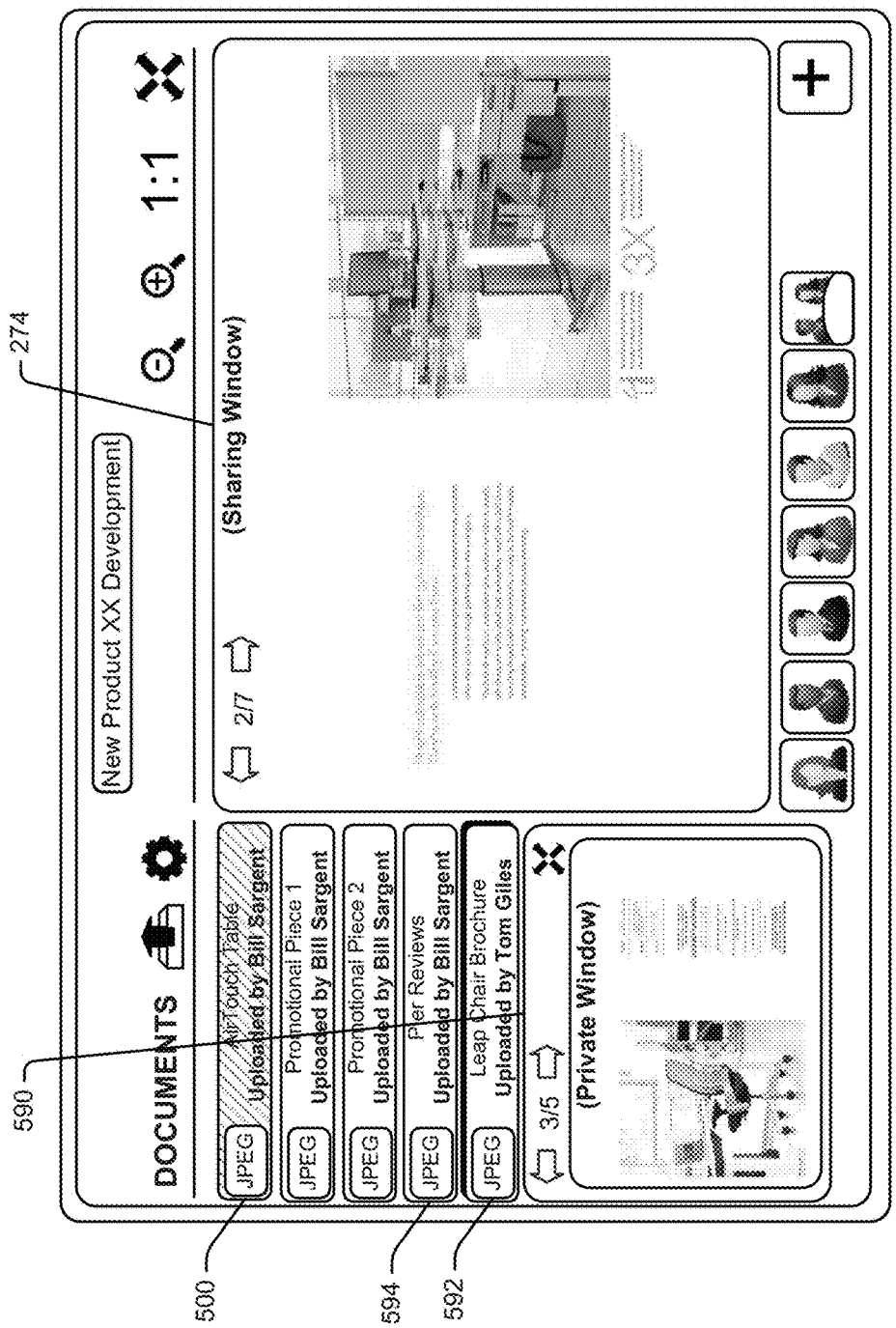
FIG. 26 is a screen shot showing different documents opened in a private window and in a sharing window.

Referring to FIG. 26, another screen shot of a session device display is shown where a first document is opened in the sharing window 274 and a second document different from the first is opened in a private window 590. Again, icon 500 is shown cross hatched to indicate that the document associated therewith is shown in the sharing window 274 while icon 592 is shown with a shadow box to indicate that the document associated therewith is shown in the private window. As can be seen, the private window is always opened below the associated document icon to help a conferee understand which document is currently presented within the private window. Thus, in FIG. 26, if a conferee where to select a different document icon 594, the private window 590 under icon 592 would close and a different private window (not illustrated) would be opened under icon 594 for private viewing of the document associated with icon 594 by the conferee.

Figure 27:
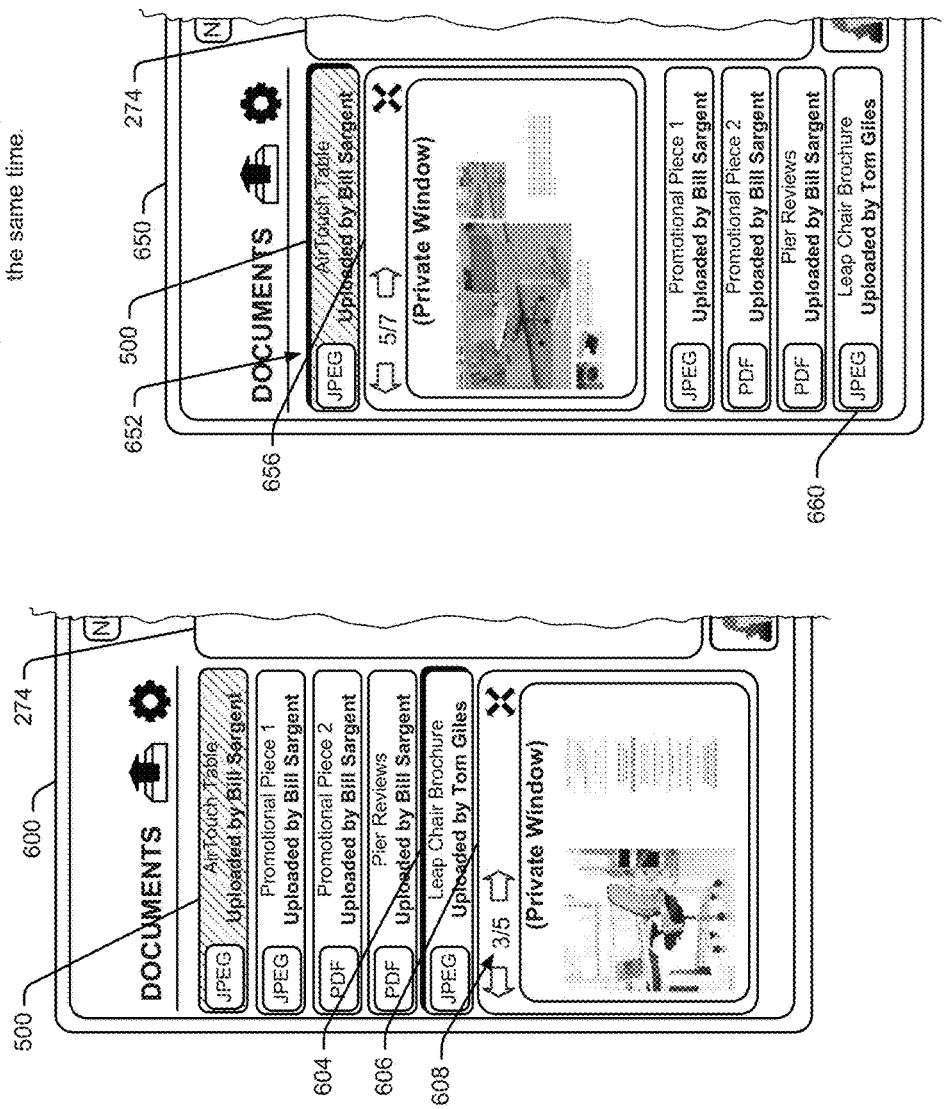
FIG. 27 shows two partial screen shots for two different conferee devices where one of the conferees is viewing a first document in a private window and a second conferee is viewing a second document in a private window at the same time.

Referring to FIG. 27, two partial screen shots 600 and 650 from two different device displays used by first and second different conferees linked to a single session are illustrated. In FIG. 27, a first document associated with icon 500 is open in the sharing windows 274 and therefore icon 500 is shown in cross hatch in a manner consistent with that described above in each of the two partial screen shots. In addition, the second conferee using screen 650 has opened the first document associated with icon 500 in a private window 656 and therefore icon 500 in screen shot 650 is also shown with a shadow box to indicate private viewing on the second conferee's display screen. Moreover, the first conferee using screen 600 has opened a second document associated with icon 604 in a private window 606 and therefore icon 606 in screen shot 600 is shown with a shadow box to indicate private viewing on the first conferee's display screen. In the illustrated embodiment the private viewing highlights (e.g., shadow boxes) are only presented on screens used by conferees that opened a private screen and are not replicated for others to see.

In some other embodiments it is contemplated that at least some subtle indication of what other conferees are doing during a session may be replicated. For instance, referring again to FIG. 27, a shadow box (not illustrated) that is color coded to the first user using screen 600 may be presented about document icon 660 on screen 650 to subtly indicate to the second conferee using screen 650 that the first conferee currently has the document associated with icon 660 open in a private window. A similar shadow box color coded to the second conferee may be presented about icon 500 on screen 600 to indicate to the first conferee using screen 600 that the second conferee has the document associated with icon 500 open in a private window. Here, while a subtle indication is presented, conferees are not distracted by more invasive indication (e.g., by making private windows more public).

Thus, in at least some embodiments, while all conferees linked to a session see the same document and page in sharing windows 274 on their devices, each conferee has the option to view any queued document in a private window regardless of which document is in the sharing window and regardless of which documents are being viewed by other conferees in private windows.

In at least some cases it is contemplated that a conferee may not want to share a document with others in a session prior to presenting the document at a specific time during the session for some reason. For instance, a conferee may want to reveal a document for the first time during a session to make a specific impression. As another instance, a conferee may be unclear if a document will be of interest during a session and may want the option to not reveal the document until its importance becomes apparent. For example, a conferee may want to have relatively quick access to any of 40 documents during a session but may believe 5 of the 40 are important enough to be added to the common public session queue. As yet another instance, a conferee may want to privately gather many documents in a queue and then, prior to a session, may want to trim back the document set to a smaller subset for posting to the common public queue. To accommodate document gathering in a private way but nevertheless in a way that associates documents with a session, at least some embodiments of the disclosure contemplate providing a private queue for each conferee in addition to the common public queue where a conferee could select one or the other of the private and public queue for posting documents.

Figure 28:
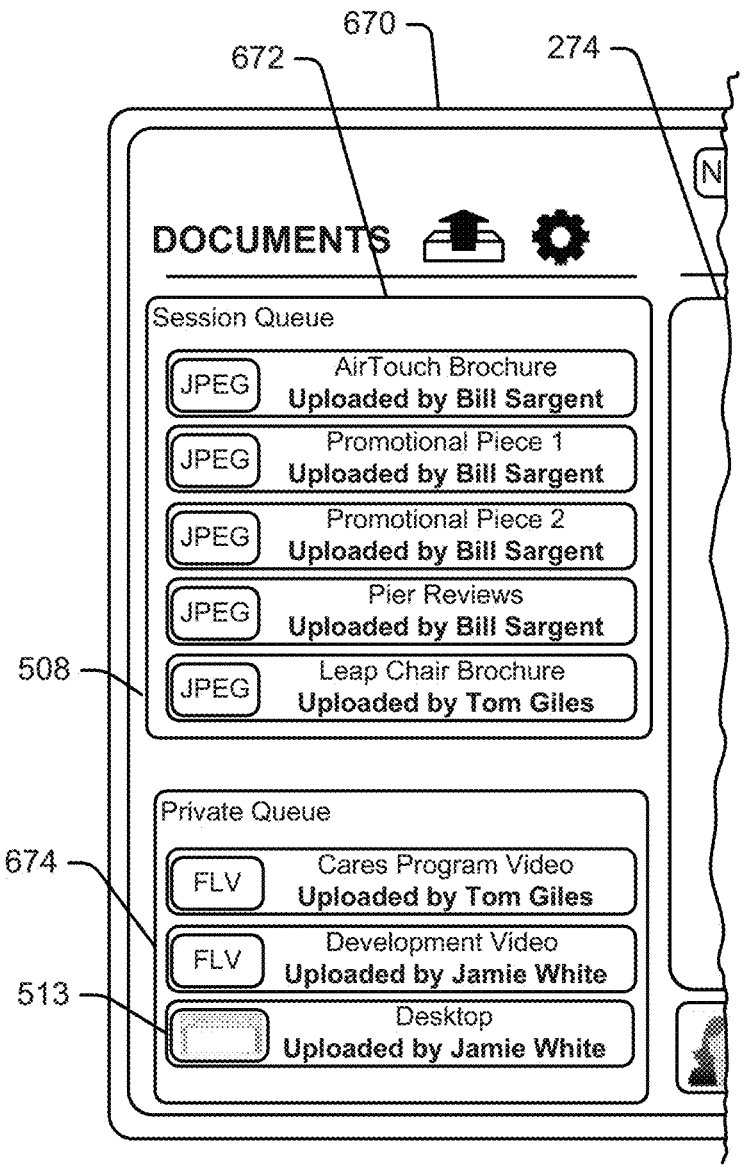
FIG. 28 is a partial screen shot showing a session queue and a separate private queue that is consistent with at least some aspects of the present disclosure.

Referring to FIG. 28, a screen shot 670 including both a public queue 672 and a private queue 674 are illustrated. Here, it is contemplated that when a conferee adds a document to a session queue, there may be one additional step requesting the conferee to identify if the document is to be added to the conferee's private queue for the session or to the session public queue. Where a conferee selects private, the document is added sequentially to queue 674 and an associated document icon is only presented to the conferee associated with private queue 674. Where the conferee selects public, the document is added to queue 672 and an associated document icon is added to the public queue for all conferees linked to the session to see. Here, it is contemplated that a conferee may move a document from the private queue 674 to the public via dragging the document icon from queue 674 to queue 672. Here, icon dragging results in actual movement of a document icon from queue 674 to public queue 672. In addition, movement of an icon from queue 674 to queue 672 causes the system to transmit a copy of the document associated with the icon to each device linked to the session to be cached for quick access thereafter. Similarly, in some cases conferees that posted documents to public queue 672 may be able to drag those documents out of queue 672 to private queue 674 to remove those documents from the public queue. In at least some embodiments a conferee would be prohibited from moving a document from the public queue that was posted there by a different conferee.

Figure 29:
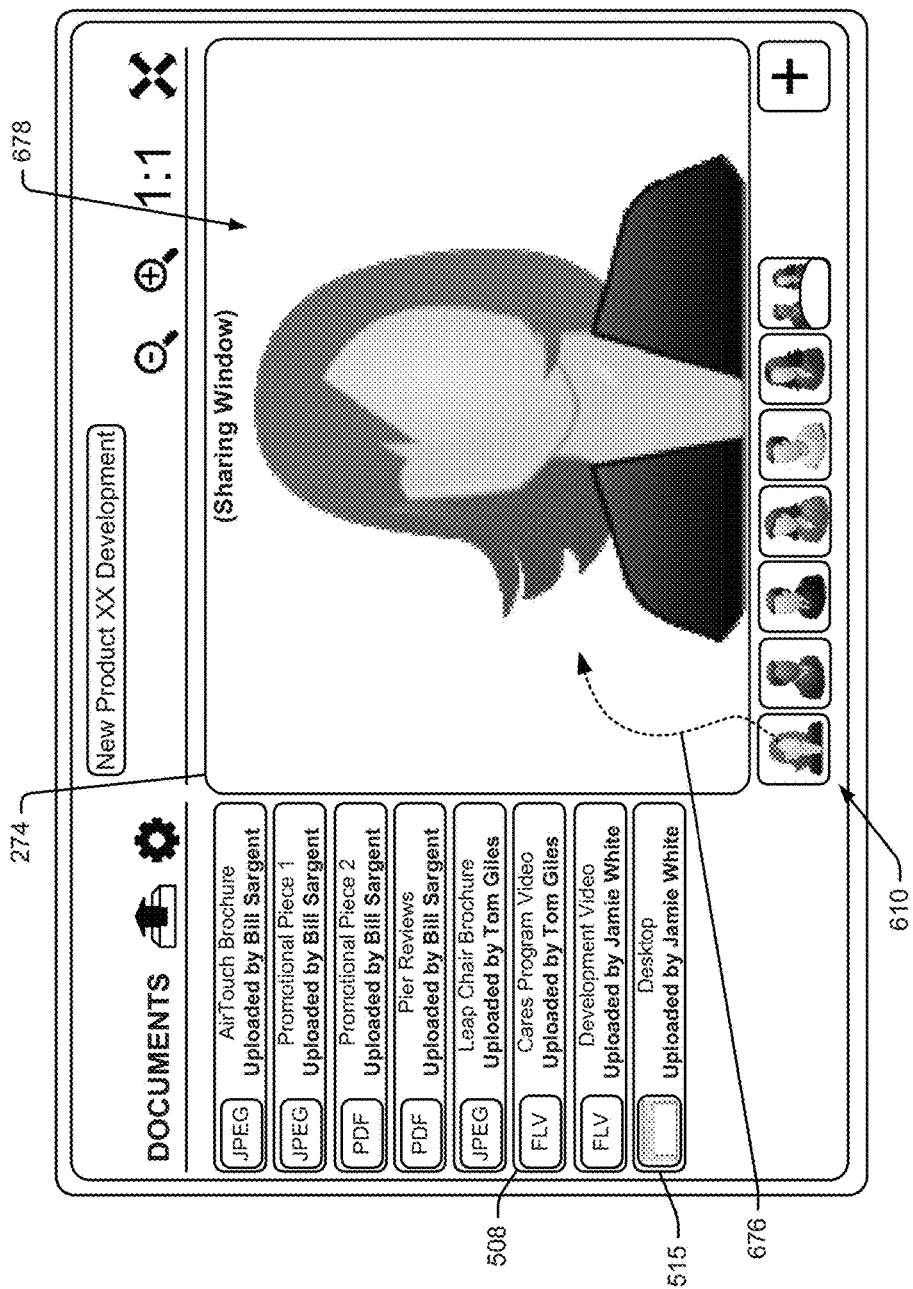
FIG. 29 is a screen shot showing a conferee's real time video image in a sharing window.

In addition to being able to present documents in sharing window 274, in at least some embodiments where conferee devices are equipped with cameras, video of conferees may be presented in space 274. To this end see FIG. 29 where a dragging action is indicated by arrow 676 from a conferee icon 610 to space 274 to present video of the conferee associated with icon 610 in space 274.

In particularly advantageous embodiments of the present disclosure, prior to commencement of a conferencing session or just thereafter, all documents in the public session queue are transmitted to conferee devices for caching. Where the system server is "aware" of devices that will be used during a session, the server may transmit documents prior to commencement of the session. For instance, if certain conferees always use the same device or link to the same intermediate server when joining a session, document may be pre-transmitted and cached. In other cases, immediately upon a conferee linking to a session, queue documents may be cached. In most cases the caching process will only take tens of seconds and therefore can be accomplished at the beginning of a session while conferees are linking up and waiting for other conferees to join.

Figure 30:
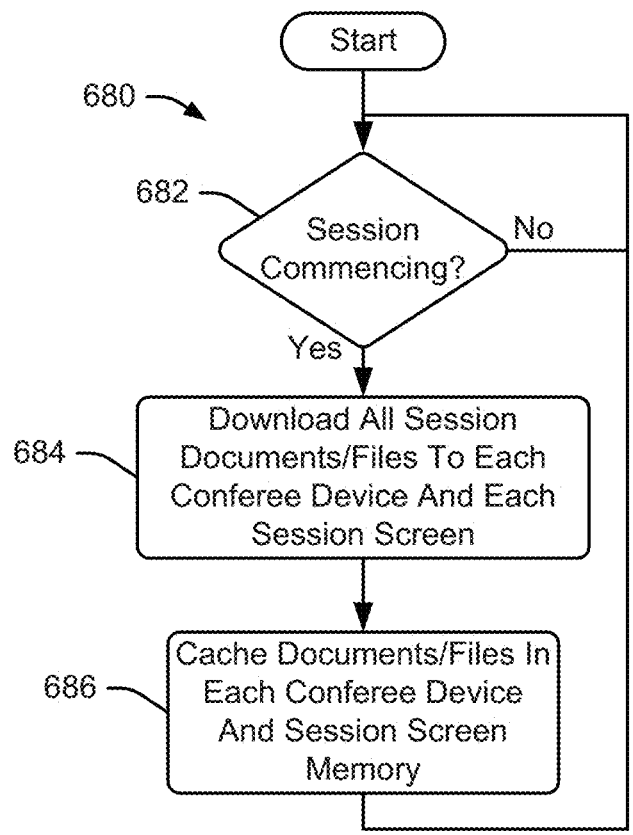
FIG. 30 is a flow chart illustrating a document caching process that is consistent with the present disclosure.

A simple caching process 680 is illustrated in flow chart form in FIG. 30. At block 682, the session server determines if a session is commencing and, if so, at block 684, the server downloads all session documents or files to each conferee device and to each memory associated with each screen that has been invited to the session. At block 686 the documents received by devices and invited screens are stored in caches associated with each device for subsequent use during the session.

Figure 31:
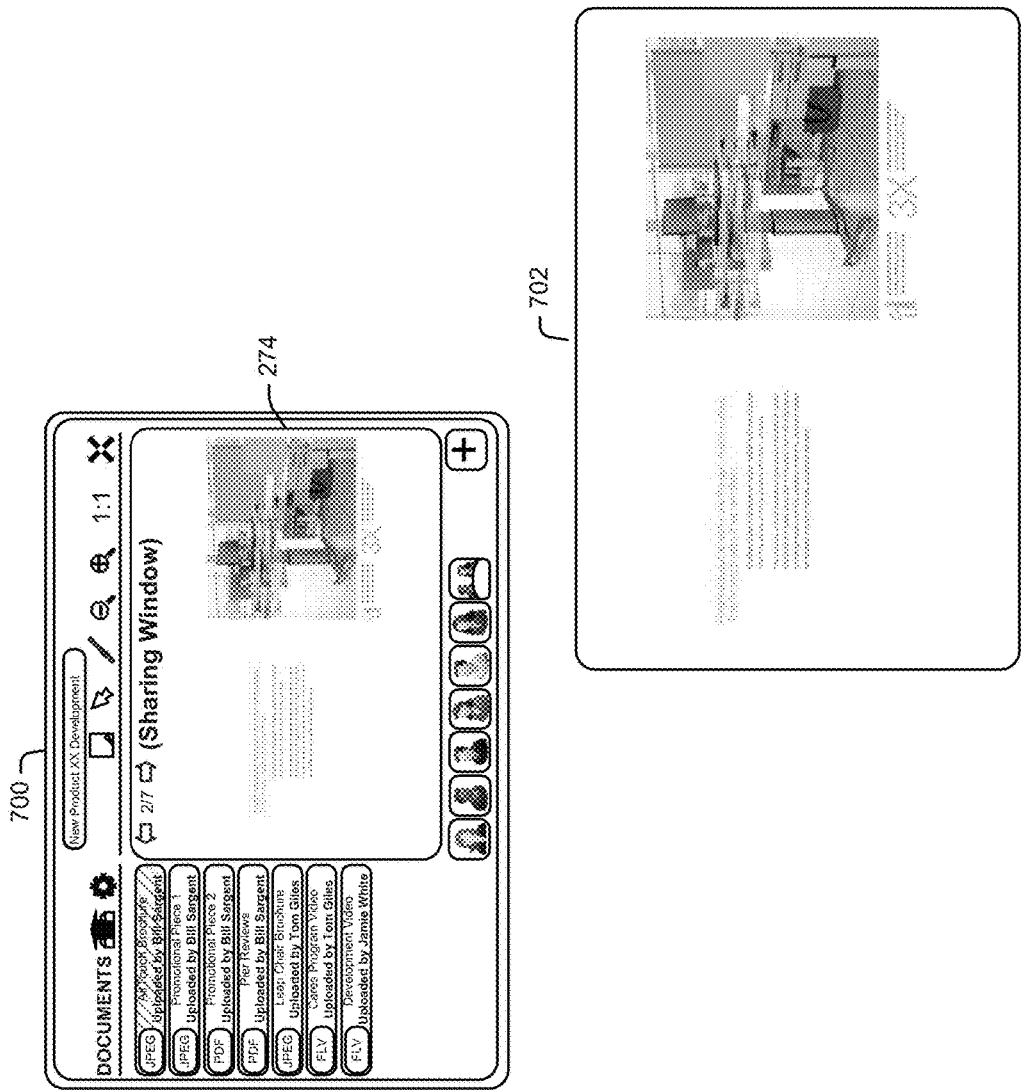
FIG. 31 shows a conferee device screen shot and a large display screen shot where the large display screen shot does not include session navigation tools while the device screen shot includes session navigation tools.

Referring again to FIG. 1, in many cases large common screens 420 will only be equipped to operate as output devices and will have no input capability. In these cases, there is no reason to present input tools and icons on the common screens as they would be unusable. For this reason, it is contemplated that, in at least some cases, screens invited to sessions that do not have input capabilities may present only a shared window view instead of the conferee interface view described above so that the shared content can be presented in a larger format. For instance, see FIG. 31 where the conferee interface view is shown at 700 and an exemplary invited large screen view is shown at 702. The large screen or output view 702 mirrors the content shown in sharing window 274 on view 700 and may not include any of the other information (e.g. the document queue, the conferee queue, the tools for page manipulation, etc.)

Figure 32:
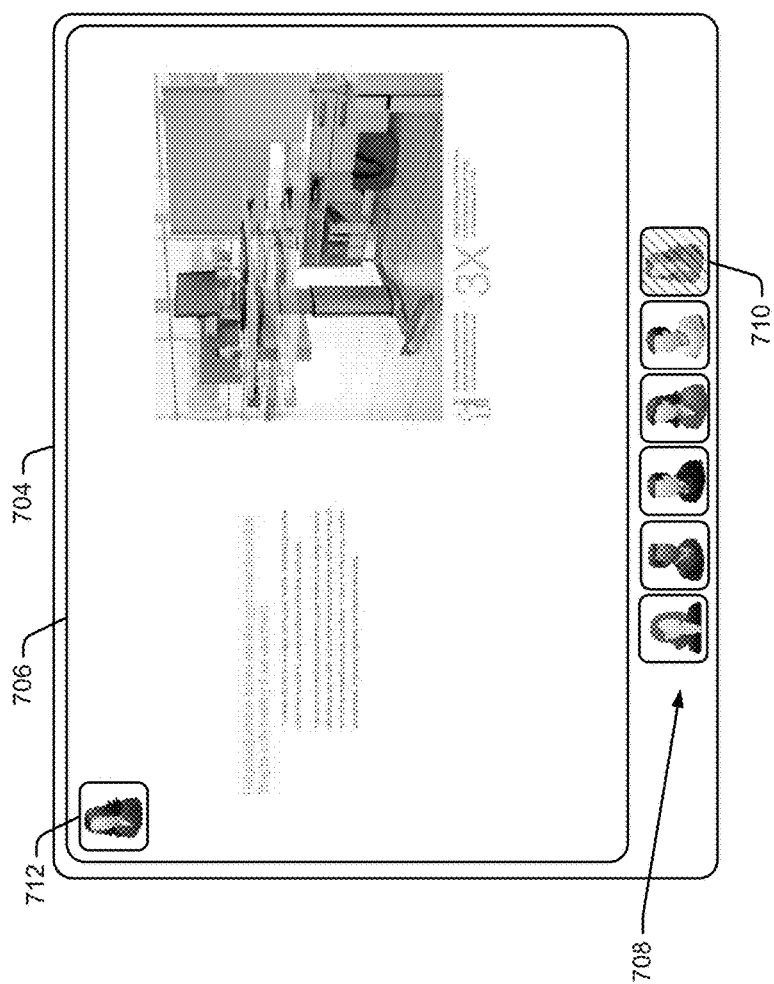
FIG. 32 is a large display screen shot that, in addition to showing a large representation of a session sharing window, also includes a conferee queue representation that shows conferees currently linked to a conference where a conferee icon associated with the conferee that opened the document currently in the sharing window is highlighted.

In other cases, the output view may include at least some indication of who is linked to a session and/or who has control of the session at any specific time. To this end, for instance, see FIG. 32 that shows an output view 704 including a shared window 706 and a conferee queue 708 that shows images of videos of conferees currently linked to the session associated with the view. In addition to showing linked conferees, a currently active or more recently active conferee may be indicated via cross-hatching 710 or otherwise visually distinguishing the conferee's icon in queue 708. For instance, if the conferee associated within icon 710 is the most recent conferee to have presented the page in space 706, icon 710 may be highlighted either for a short time or persistently until another conferee switches the page or the document shown in shared window 706. In the alternative, a supplemental or "indicator" image 712 of the conferee controlling the sharing window may be presented in a peripheral area of the sharing window or at some other discrete location outside the sharing window to indicate a current controlling conferee.

In other cases at least some of the large common displays used for a session will be interactive including a touch screen or the like so that one or more conferees can interact therewith to manipulate a session in ways described herein. In these cases a view similar to the view shown in FIG. 19 may be presented on a large common screen including queues and tool icons. In at least some cases it is contemplated that the system server 12 may keep track of screen capabilities and automatically provide either a sharing window view or a user interface view depending on screen capabilities. In other cases each device linked to a session may indicate its capabilities to the server causing the server to select the interface to display.

In at least some cases it is contemplated that a location tracking system may be linked to the system server so that locations of personal and portable conferee devices used to link to sessions can be determined. Conferee device location could then be used to help a conferee identify resources available proximate a conferee's location that could be used to enhance a session. For instance, a conferee's device location and hence the conferee's location could be used to identify large display screens in the vicinity of the conferee that are available for linking to a session.

Referring again to FIG. 1, wireless access points or other sensors that can generate information useable to identify the locations of conferees within buildings or other spaces are shown at 719. In the case of wireless access points, signals from several of the access points can be used to triangulate the location of a conferee's device within a space. In other cases the sensors 719 may include entry or exit sensors in a doorway associated with a conference space or other proximity sensors that sense when a conferee's device is in a relatively specific area. Signals from the sensors are received by server 12 and used to track device locations. In the alternative, a separate device tracking system may track and provide location information to server 12. Then, when a conferee joins a conference session, the server can offer specific proximate large screens to the conferee for use to help the conferee narrow down optimal options.

Figure 33:
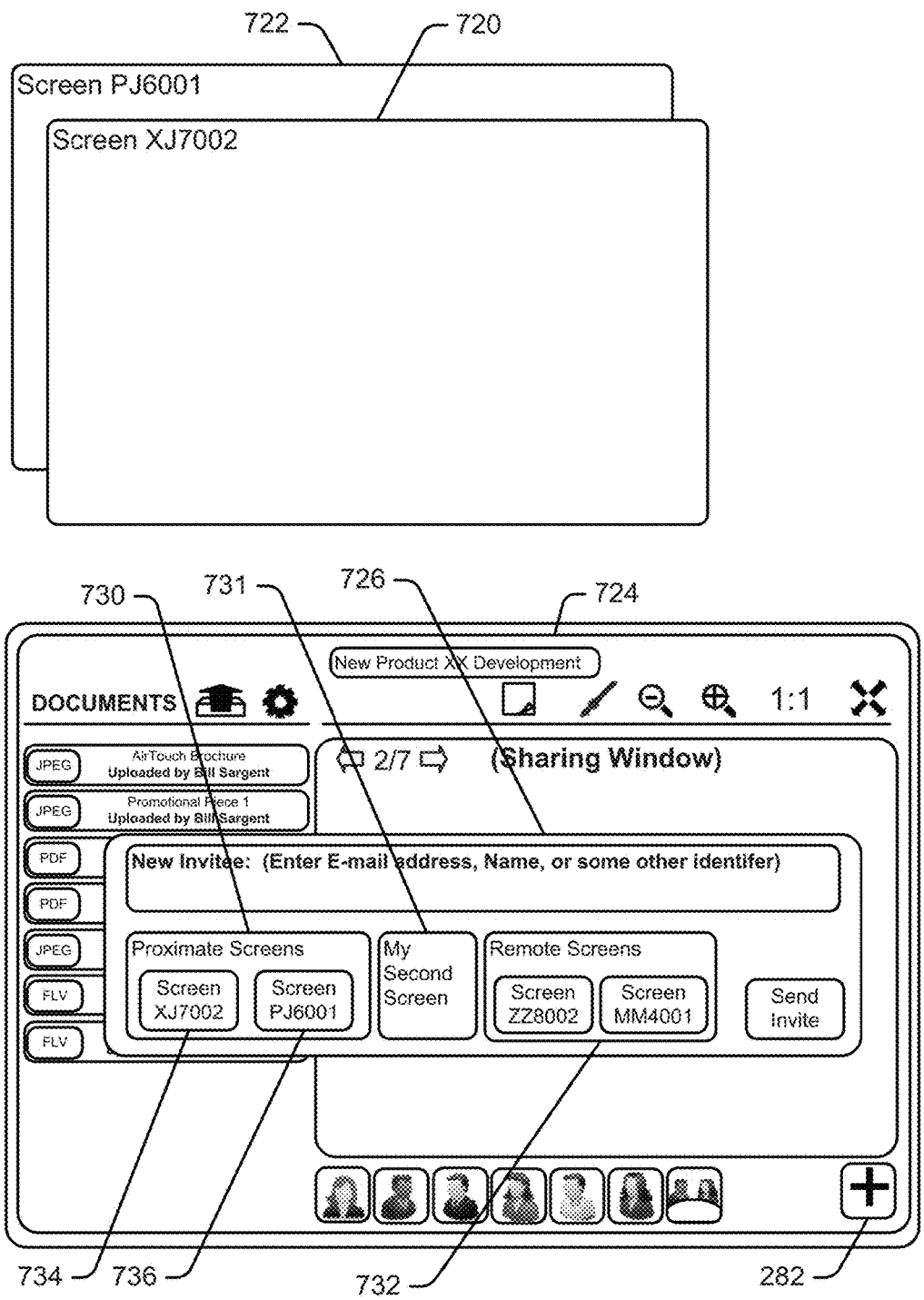
FIG. 33 shows a conferee device screen shot as well as two large display screens where the device screen shot includes tools for inviting large screens to a session.

Referring to FIG. 33, a schematic shows first and second large display screens 720 and 722 that may be mounted within a conference room as well as a conferee device display screen shot 724 where a conferee has selected the add device icon 282 to identify at least one common display screen proximate the conferee to be invited to the session. When icon 282 is selected, invite window 726 is opened which, among other things, enables the conferee to select additional screens to invite to the session. Window 726 includes a "Proximate Screens" sub-window 730 and a "Remote Screens" sub-window 732. Any screen that is in the near vicinity of the conferee as recognized by server 12 will be listed in sub-window 730 and all other screens that may be invited are listed in sub-window 732. In addition, screen identifiers XJ7002 and PJ6001 are displayed or presented on screens 720 and 722, respectively, to help the conferee distinguish one from the other. The identifiers are also presented in screen selection icons 734 and 736 which can be selected to invite one or both of screens 720 and 722 to the session.

It has been recognized that many common large display screens within space generally may have several different uses and the conferencing use may only be one of several uses. For instance, when not used for conferencing, a common screen may simply present a news program or may be programmed to loop through various advertisements or to present an interesting blog or may be programmed to perform any of several other functions. In these cases, a screen identifier like XJ7002 should not be presented all the time and should only be presented when a conferee is seeking a large screen for viewing a presentation. In this regard, referring again to FIG. 33, when a conferee selects icon 282 to invite a proximate large screen, server 12 may identify proximate large screens and control one or more of those screens to present a screen indicator like XJ7002 to aid in selection and on the fly configuration of session devices.

Figure 34:
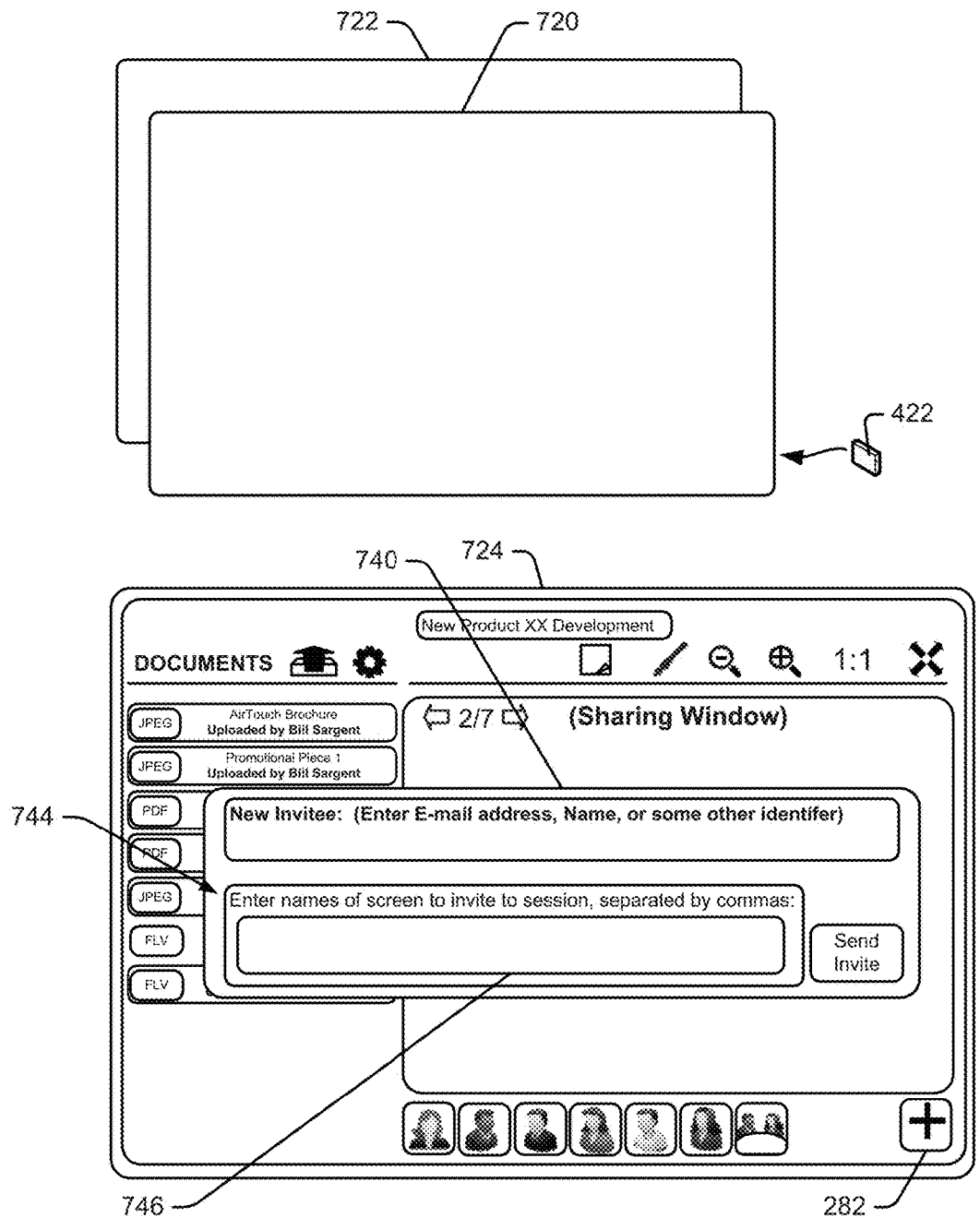
FIG. 34 is similar to FIG. 33, albeit where a dongle is used to render a large display screen linkable to a session where the dongle has not been linked to a large screen.

As described briefly above, in some cases a dongle or other portable wireless transceiver device may be linked to a common display screen to render the display addressable during a session. For instance, see FIG. 34 where large screens 720 and 722 are again shown along with a screen shot 724 from a conferee's device display and a dongle 422. In FIG. 34, the dongle has not been plugged into one of the screens. The conferee has selected icon 282 to invite a large output screen to a session and that selection has opened window 740 that requests that the conferee enter a screen name or identifier in a field 746 to invite the screen to the session.

Figure 35:
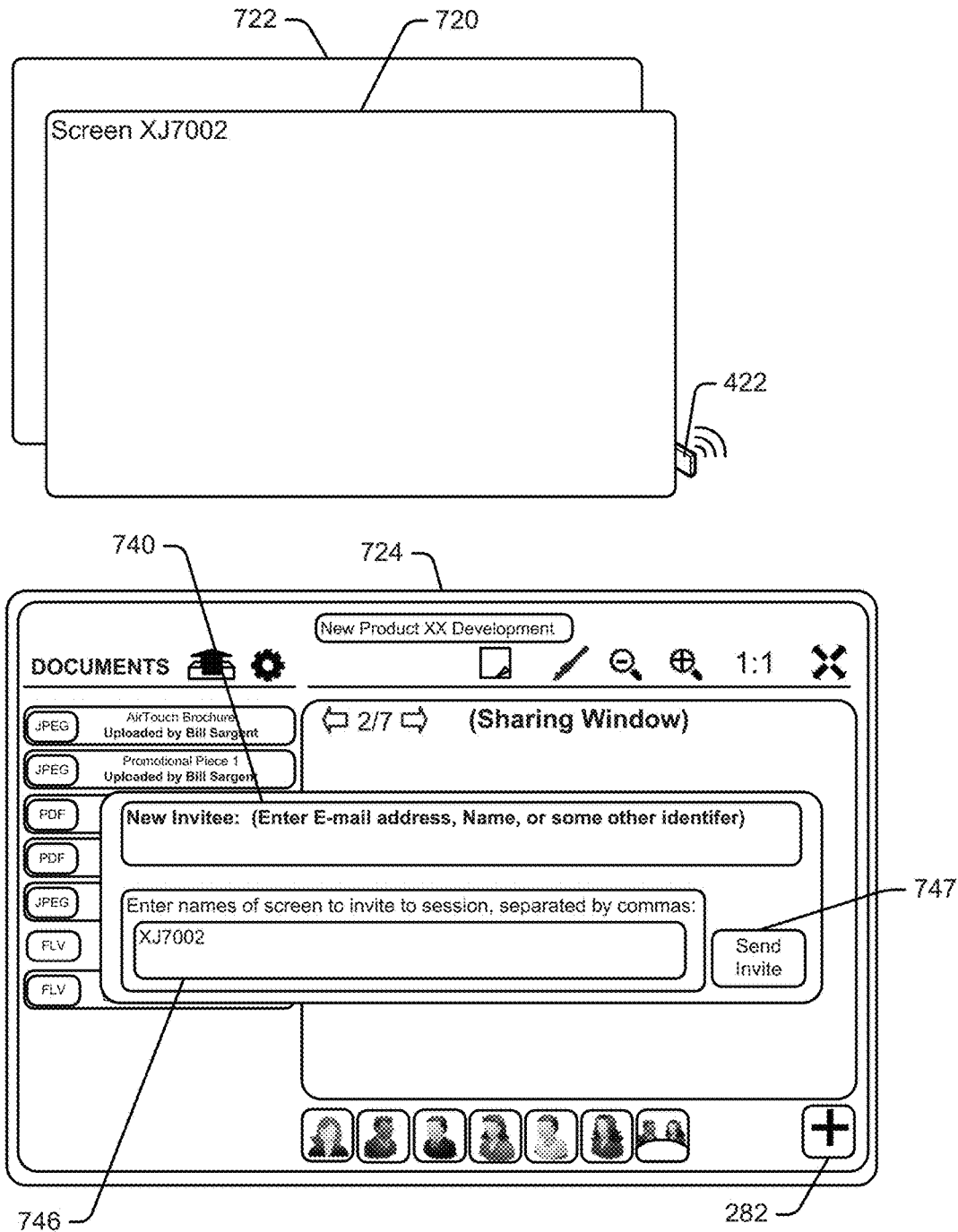
FIG. 35 is similar to FIG. 34, albeit where the dongle has been inserted and a conferee has entered a display screen indicator into an invite field.

Referring also to FIG. 35, the conferee plugs the dongle 422 into an HDMI or other input port on the screen 720. When the dongle is plugged in, the dongle runs a software program and, among other things, generates an identifier XJ7002 which is presented on the screen 720. The conferee can enter the screen name in field 746 to specify the screen to be invited. In the alternative, the dongle 422 may transmit its identifier to proximate conferee devices and the conferee device having window 740 open may automatically fill in field 746. Once send invite icon 747 is selected, server 12 links to screen 720 via a virtual network address, transmits session documents to the screen 720 and a processor either in the screen 720 or in the dongle 422 caches the documents in memory for rapid access during the session.

Figure 36:
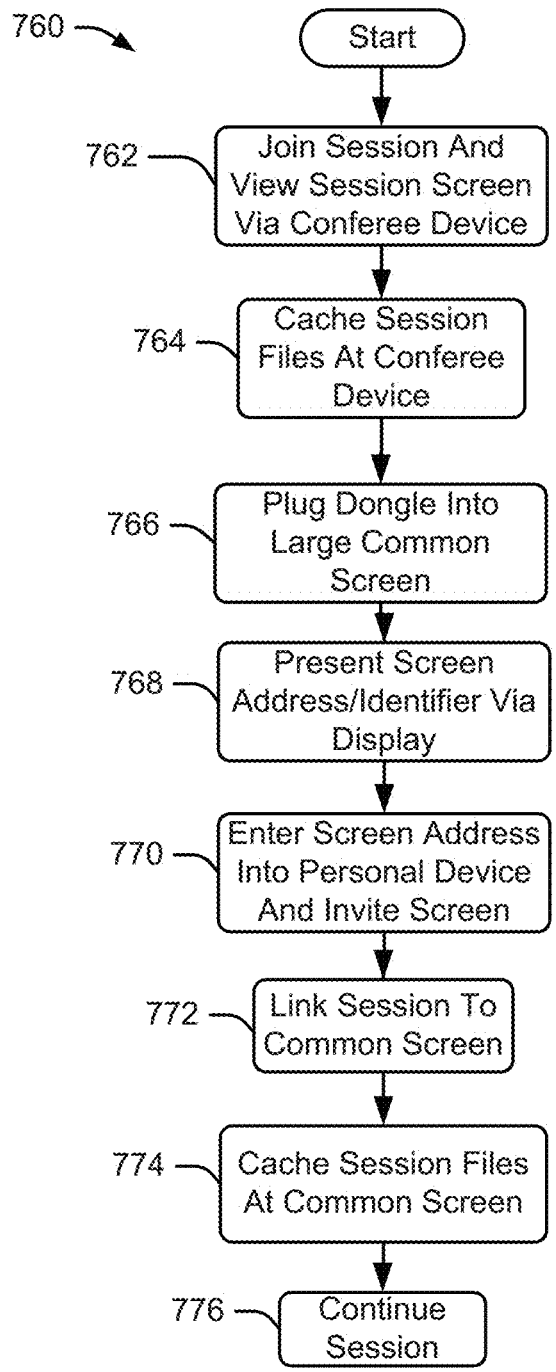
FIG. 36 is a flow chart illustrating invitation of a large screen to a session and a caching process whereby session documents in a queue are cached in a large screen memory or an add on dongle.

A process 760 for using a dongle to link a screen to a session is shown in FIG. 36. At block 762, a conferee uses the conferee's personal portable or other personal computing device to link to a session. At block 764, the server 12 (see again FIG. 1) transmits all of the session files to the conferee's device which are cached in a memory associated with the conferee's device. At block 766, the conferee plugs the dongle 422 into a large common screen that the conferee intends to invite to the session causing presentation of the screen address via the display at block 768. At block 770, the conferee enters the screen address into an address field (see 746 in FIG. 35) causing the server 12 to link to the screen associated with the entered address at 772. At 774, the server transmits the session files to the newly linked screen and at block 776 the session continues, now with shared content on each of the conferee's personal device and on the newly linked large display screen.

It should be clear that in at least some embodiments of the present disclosure, any conferee that is invited to a session or that is linked to an ongoing session has the ability to invite large common screens to the session without having to interrupt the ongoing session and without requiring any authorization from other session conferees. In effect, a conferee can independently change her device viewing configuration without disrupting any other conferees. Similarly, any conferee that is invited to a session or that is linked to an ongoing session has the ability to invite other conferees to the session without seeking authorization from other conferees.

In at least some cases, where server 12 can track locations of conferee devices used in a session, server 12 may be programmed to delink from a screen when no conferees are proximate the display only screen. For instance, if conferees leave a conference room and are still participating in a conference session via their portable devices, server 12 may delink from large display only screens in the conference room so that potentially sensitive documents are not presented in the conference room while conferees are absent.

Figure 37:
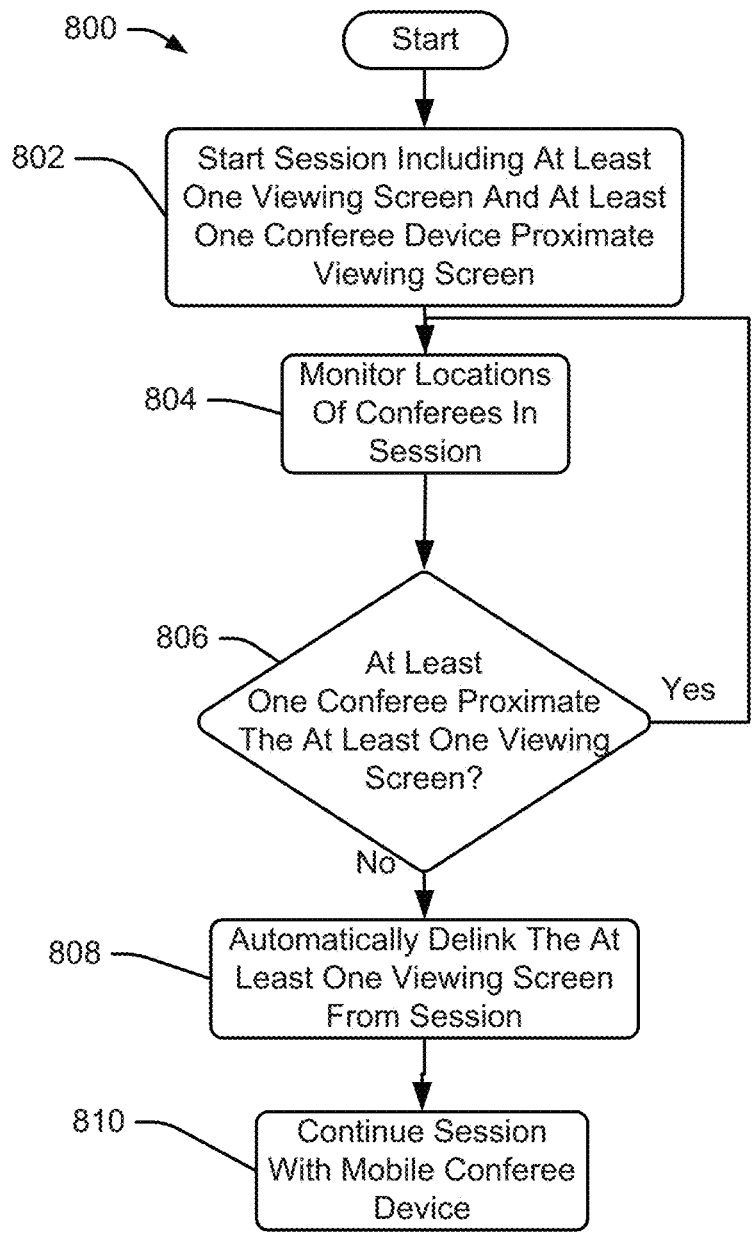
FIG. 37 is a flow chart illustrating a process whereby, if no conferee devices are located proximate a large display screen that is linked to an ongoing session, the large screen is dis-associated with the session.

Referring to FIG. 37, a process 800 for delinking a session from common screens when conferees move away from the common screens is illustrated. At block 802, a session is started including at least one common viewing screen and at least one conferee device that is proximate the viewing screen. At block 804, server 12 monitors the locations of conferees in the session by monitoring the locations of the conferee devices. At block 806, server 12 determines if at least one conferee is proximate the at least one common viewing screen. Where at least one conferee remains proximate a common viewing screen, the session remains linked to the common screen as control loops back up to block 804. If at least one conferee is not proximate the common viewing screen, control passes to block 808 where server 12 delinks the session from the common viewing screen. At block 810 the session continues with other devices linked to the session including the mobile or portable conferee devices.

In some cases when a last conferee leaves a space in which a common screen is presenting a session, server 12 will present a query in a pop up window (not illustrated) asking the conferee if the session should be delinked from the common screen. In this case, the conferee could allow the session to continue on the common screen for some reason. For instance, if the conferee is only leaving the conference space for 5 minutes the conferee may want to continue to present the session on the common screen to avoid the need to re-link to the session. As another instance, there may be conferees in the space viewing the session on the common screen that do not have personal devices linked to the session and the conferee leaving the session may not want to cut off the other unlinked conferees from the session.

In some cases when a last conferee leaves a session, the session may remain linked to the common screen but the common screen may be blanked out or otherwise may show a different scene than the session view until one of the conferees with a device linked to the session again enters the conference space. When a conferee reenters a space, the server may automatically re-present the session in its current state. In the alternative, the server may offer the conferee the choice to re-present the session on the common screen in its current state.

In many cases one conferee may have access to two or more screens and may prefer to present some session content on a second personal screen during a session. For instance, many people today use both a laptop and a tablet type computing device (e.g., an Ipad, an Android pad, etc.), where each of the laptop and the tablet device includes a separate display screen. In at least some embodiments it is contemplated that a conferee may be able to invite two personal display devices to a session where the second display device can be used as a private second screen for viewing an additional document view.

Referring again to FIG. 33, in addition to the features described above, the exemplary invite window 726 includes a "My Second Screen" icon 731. When icon 731 is selected, either a pre-input address of the conferee's second device (e.g., a phone number or other identifier) is used to invite the second device to the session or the conferee is queried for the address of the second device which the conferee can manually enter. Once server 12 has the address of the second device, server 12 links to that device and transmits the session documents thereto to be cached in a memory associated with the second device. In addition, server 12 stores a flag indicating that the second device is a second personal device for the conferee so that the second device can be driven in a different fashion than a primary display device.

Figure 38:
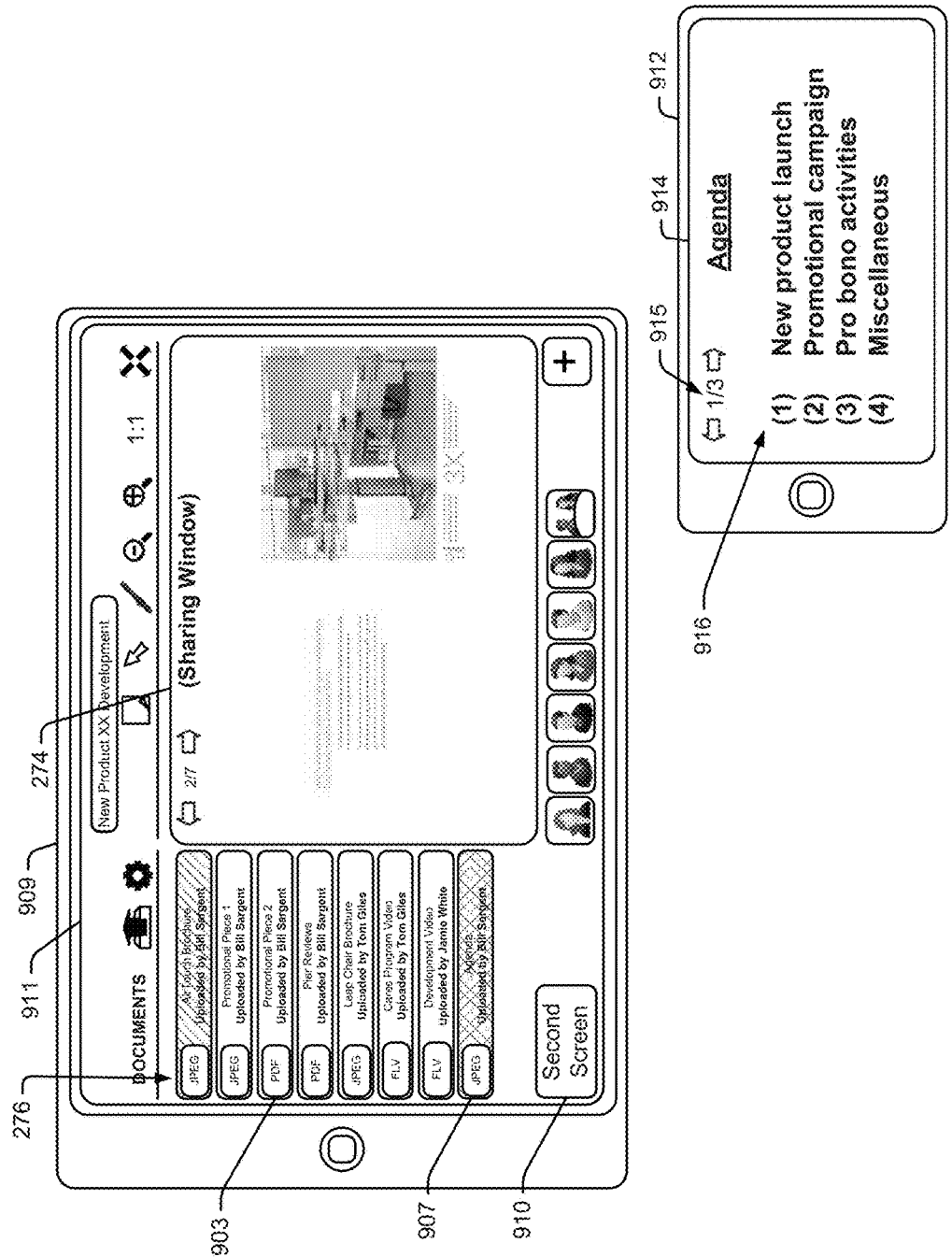
FIG. 38 shows a tablet type computing device and a smart phone type computing device that are used by a single conferee where different session content is presented on each of the devices.

Referring to FIG. 38, a first or primary device 909 and a second or secondary device 912 are shown that include a tablet type device 909 and a smart phone type device 912. The primary device screen 911 looks similar to the screens described above with two exceptions. First, screen 911 includes an icon 910 associated with the second device 912. Second, screen 911 includes an icon 907 that is shown double cross hatched to indicate that the document associated therewith is currently being presented on the second device display which is labeled 914. The second device display 914 presents the second document that is associated with highlighted icon 907 at 916 which, in the present example, is an agenda for the session. Here, the second screen 914 presents only a viewing image with a stripped down interface that includes a progression tool 915 for changing the page of the document presented on screen 914. The presented second screen 914 does not include any other interface tools, a document queue, a conferee queue, etc., each of which is presented via display screen 911. Instead, the instance of a document presented via screen 914 is enlarged to the maximum size so that the document can be viewed relatively easily.

In the FIG. 38 example, a conferee can use the queues and other tools presented via device 909 in the same manner that is described above. In addition, the conferee can change the content on the second screen 914 via actions on the first screen 911. For instance, the conferee can change the document presented on the second screen 914 by simply dragging a different document from the queue 276 to the second screen icon 910. If a different document is dragged to icon 910, the icon associated with the dragged document in the queue would be highlighted with double cross hatching to indicate that the document associated there with is presented on the second screen 914 and document icon 907 highlighting would be removed.

In the FIG. 38 case, the content on the second screen 914 may only be for use by the conferee that invited the second screen and may not be mirrored on other session screens. In this case, the second screen operates like a private window. In the alternative, where at least two conferees use a second screen, in at least some cases, all second screens may be mirror images of the other second screens linked to the system. Thus, for instance, where each of two conferees use two devices as in FIG. 38 to access more information during a session, the server 12 may automatically associate the second display screens with each other so that any document or page presented on one of the screens is automatically and essentially in real time, presented on the other of the second display screens. For example, in FIG. 38, assume that each of first and second conferees are viewing the same first and second screens 911 and 914 on their own devices at two disparate locations. Here, if the first conferee drags document icon 903 into the second screen field 907, the document associated with icon 903 would be presented on screens 914 on each of the first and second conferee's second devices. Thus, remote conferencing using multiple screens that can be associated with each other on the fly is contemplated.

Figure 39:
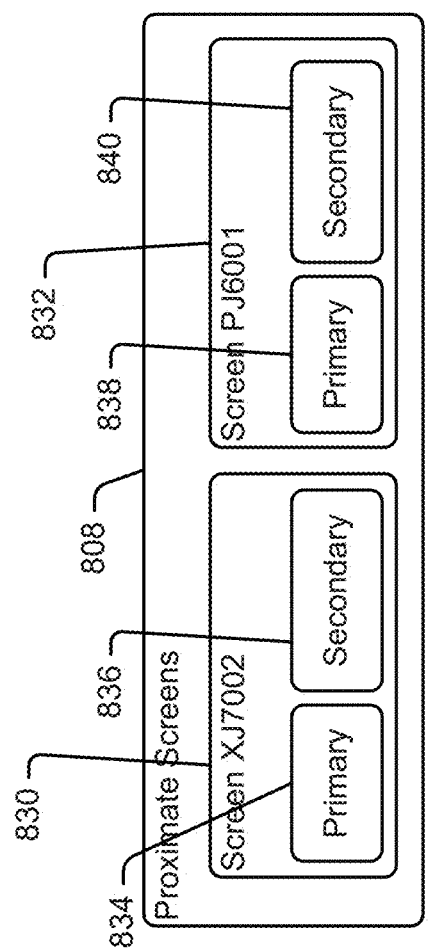
FIG. 39 shows a window that may be presented via a conferee's device display screen for designating screens as primary or secondary when a screen is invited to a session.

In addition to being able to invite two personal devices to a session, in at least some embodiments it is contemplated that several proximate common screens may be invited to a session so that two or more document may be viewed on the proximate screens at the same time. In this regard, see FIG. 39 where a sub-window 831 that may replace sub-window 730 in FIG. 33 is illustrated for specifying if a common screen is to be used as a primary display device or a secondary display device. In FIG. 33, when a conferee selects icon 282 to open the invite window 726 including sub-window 808, different controls 830 and 832 for two proximate screens (see again 720 and 722 in FIG. 33) are presented. Control 830 allows a conferee to specify if screen XJ7002 is to be used as a primary screen 834 or as a secondary screen 836 while control 832 allows the conferee to specify if screen PJ6001 is to be used as a primary screen 838 or a secondary screen 839.

Figure 40:
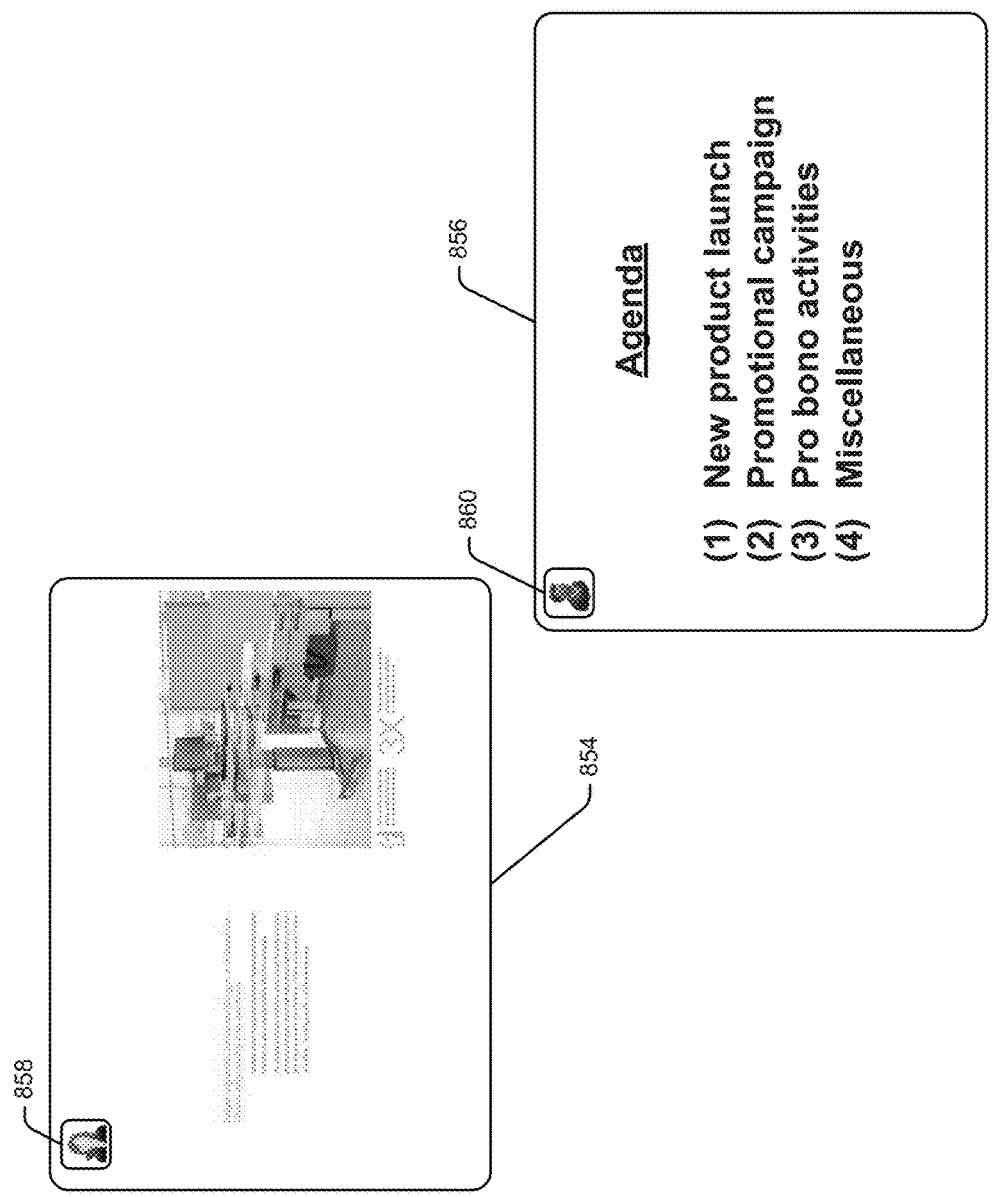
FIG. 40 shows two screen shots correspond to two large display screens that may be used during a conferencing session.

In at least some cases a secondary common screen will only be available in systems where the server mirrors content on all secondary screens so that conferees with two screen access always see the same content on each of the first and second screens. For instance, see FIGS. 38 and 40 where two different documents in widow 274 and on screen 914 are mirrored on two large common display screens 854 and 856. Icons 858 and 860 indicting via an image or video of conferees which conferee moved each document to the sharing spaces are shown. In other cases where at least one of the common screens is also an input device (e.g., a touch sensitive screen), the input capable screen may present the complete control interface as shown at 911 in FIG. 38 and the second screen may be controlled in a semi-private fashion without mirroring the second screen on other session device displays.

In other embodiments it is contemplated that two sharing windows may be presented on each or at least a subset of conferee device displays or perhaps on all conferee device displays so that first and second documents can be viewed at one time by the subset or all of the conferees. To this end, see FIG. 41 which shows a screen shot that includes a second sharing window 852 that is smaller than primary sharing window 274. Here, any conferee can move any document into sharing window 852 by dragging an associated document icon from the queue 276 into space 852. When a conferee changes the document viewed in window 852 on the conferee's screen, the document in other secondary spaces on other conferee devices is similarly changed. Here, clearly the image in the larger sharing space 274 is easier to view than the image in the second space 852. To switch the documents among the two spaced 274 and 852, any conferee can drag a document from space 852 to space 274 or vice versa. Here, in at least some embodiments an icon including the image or video of the conferee that moved the most recent document into each of spaces 274 and 852 may be spatially associated with the space as shown at 855 and 857.

Figure 41:
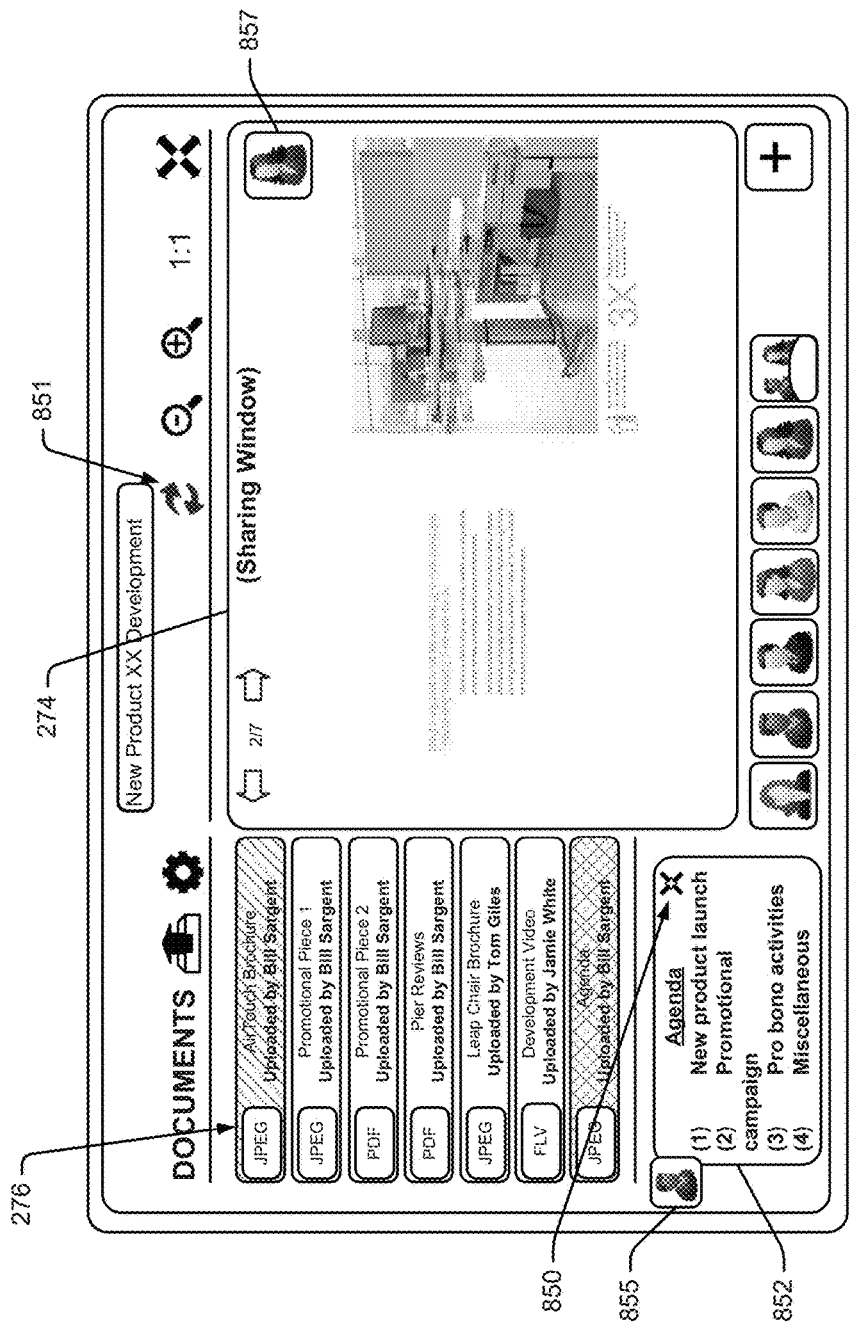
FIG. 41 is a screen shot illustrating a conferee device display screen that includes first and second sharing windows where document icons are highlighted to indicate which document is in which window.

In at least some cases where two large common and proximate displays are linked to a session and a conferee only has access to a single display (e.g., a portable laptop display), the single conferee display may present the screen shot in FIG. 41 showing both the first and second sharing windows 274 and 852 while the large common displays 854 and 856 mirror the first and second sharing windows 274 and 852, respectively. In this case, any change to either of the documents in either of the first or second sharing windows 274 or 852 would be mirrored on screens 854 and 856, respectively. To set this arrangement up, the conferee would simply invite the two large screens to the session and would specify each as primary or secondary.

In at least some embodiments where server 12 supports audio and video conferencing as well as data conferencing, server 12 may be programmed to present video of a most audibly active conferee in a session. For instance, where a first conferee speaks for two minutes followed by a second conferee for 18 seconds, the system may present video and audio of the first conferee to all linked devices for the first two minutes followed by audio and video of the second conferee for the next 18 seconds.

Referring again to FIG. 1, to obtain audio from conferees, microphones 17 may be provided for each conferee device to feed the audio to server 12. Here, server 12 is programmed to compare audio from the different microphones and identify the loudest audio signal received. Video from a camera associated with the microphone that generates the loudest audio signal is then transmitted to each of the session linked devices to be displayed. In at least some cases the server 12 would be programmed with some hysteresis so that inadvertent loud sounds do not switch the presented video from one conferee to another to quickly. Where there is a silent period, in some cases, the server would maintain the video of the conferee that most recently spoke or may switch out to a general conference room image of conferees in a space associated with the session.

Figure 42:
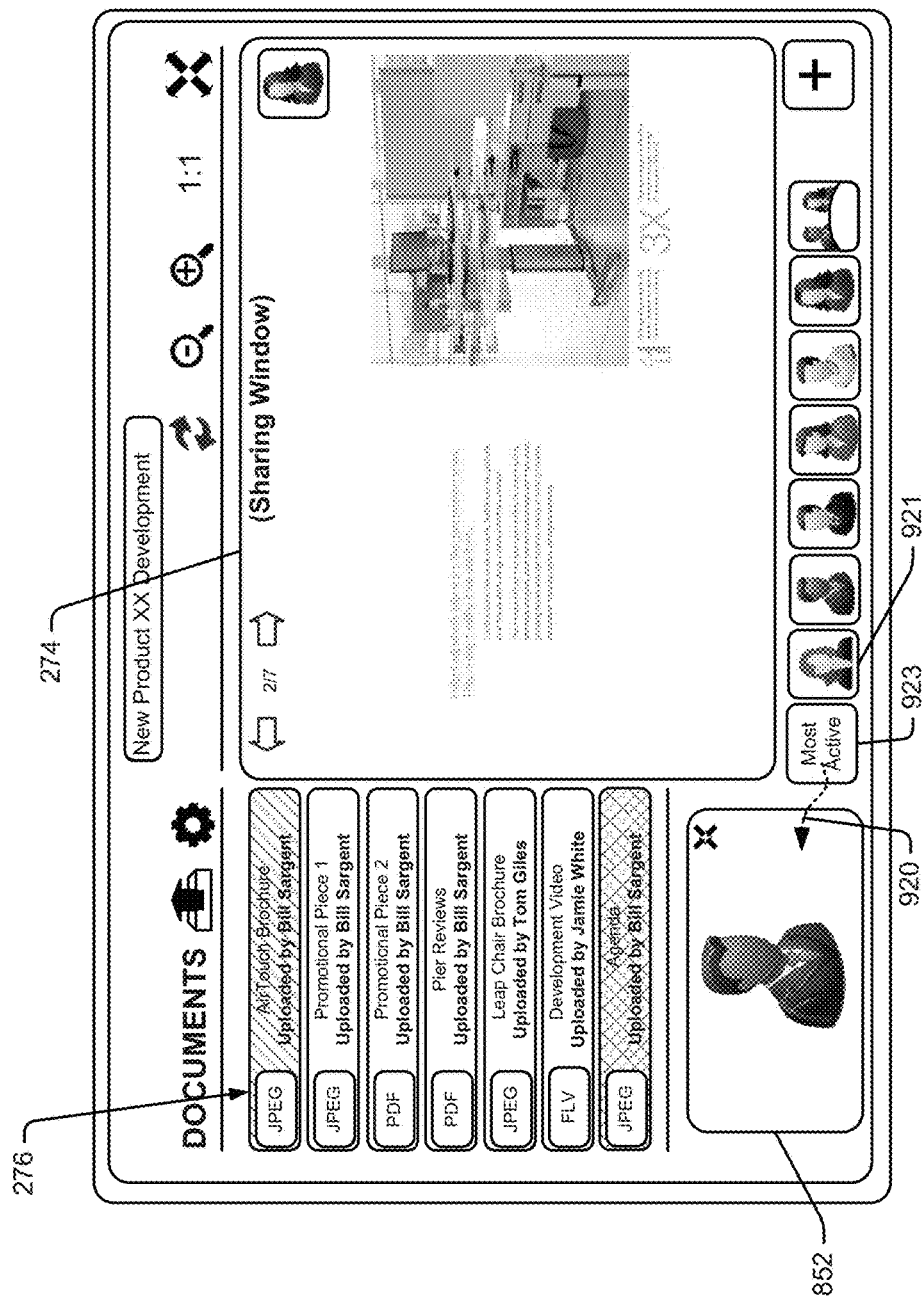
FIG. 42 is a screen shot illustrating a conferee device display that includes a sharing window and a smaller window for showing a real time video of a conferee.

Referring again to FIG. 42, in at least some cases the video of the most audibly active conferee may be presented via either the primary screen 274 or the secondary screen 852, at the direction of any one of the conferees linked to the session. For instance, in FIG. 42 a "Most Active" icon 923 is presented in the conferee queue where icon 923 can be dragged to either of the primary or secondary windows to show the video of the most active conferee. Arrow 920 represents a dragging action which results in the video of the most active conferee in space 852 as shown. Other conferee icons (e.g., 921) may also be dragged into either of the primary or secondary sharing windows 274 or 852, respectively, to show a persistent video of one of the conferees.

In at least some cases, any conferee may be able to replace any conferee video in either of the primary or secondary sharing windows by dragging a document icon from document queue 276 to one of the primary or secondary windows or by dragging another conferee icon to one of the windows.

Figure 43:
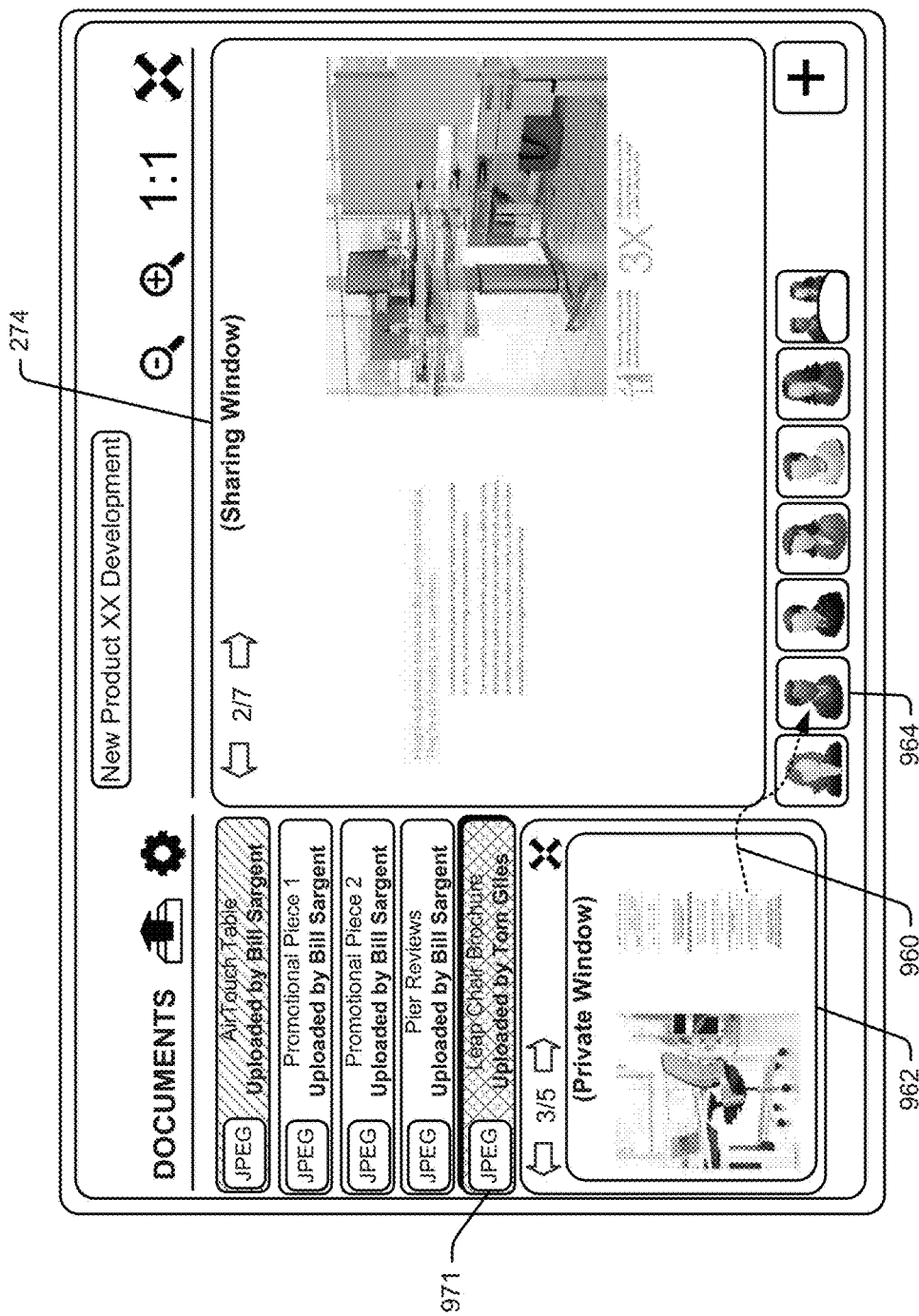
FIG. 43 is a screen shot showing how a document in a private window may be shared in a side bar fashion with another conferee linked to a session.
Figure 44:
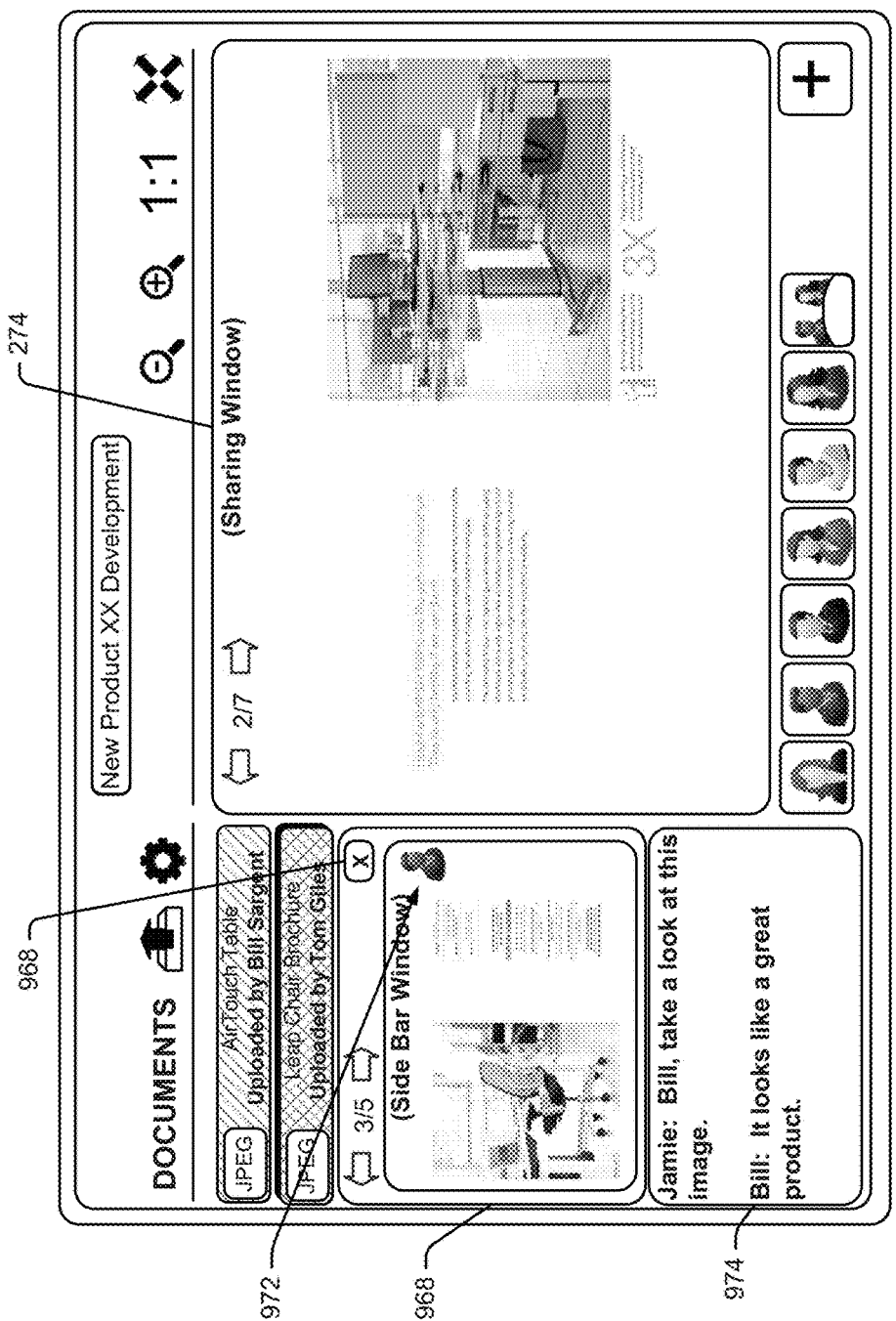
FIG. 44 is a screen shot showing a side bar view of a session.

It has also been contemplated that there will be times when a subset of conferees linked to a session may want to share a session document amongst themselves without sharing with the larger group for some reason. For instance, referring to FIG. 43, a first conferee associated with the device presenting the screen shot shown in FIG. 43 may want to share a document presented in the first conferee's private window 962 with a second conferee associated with conferee icon 964. In at least some cases it is contemplated that, to share the document in private window 962, the first conferee can simply drag from window 962 to the conferee icon 964 to effectively "drop" the document from window 962 into a side bar window as shown in FIG. 44 at 968. Here, the side bar window 968 would be presented on the first conferee's device display as shown in FIG. 44 and would also be opened up on the second conferee's device display in a similar fashion. In some cases a dialog window 974 would also be opened to enable the conferees to text via an instant messenger application or the like back and forth without communicating with other conferees in the session. A conferee indicator 972 is presented on the side bar window or is at least spatially associated there with to indicate the identity of the other conferee linked to the side bar. To add another conferee to the side bar, an icon associated with the other conferee may be selected and dragged into the side bar window causing the server to present the side bar window on the other conferee's device display and causing each of the first and second conferee's devices to present another indicator akin to 972 to indicate the identity of the other conferee added to the side bar.

In some embodiments where a side bar is formed between two or more conferees, server 12 will automatically delink audio between the two or more conferees that are part of the side bar from the larger session so that the side bar conferees can have a semi-private conference independent of the other conferees. In some cases, while the side bar audio is cut out of the larger session, the larger session audio may continue to be presented to the side bar conferees either at normal volume level or at some reduced volume level so that the side bar conferees can still follow the larger session while conducting their side bar. In this case the text window 974 may not be needed. At any time during a side bar, close icon 968 may be selected to close the side bar session. When a side bar is closed, in addition to removing the side bar window from conferee screens, full conferee audio would again commence.

It has further been recognized that, in addition to sharing documents like PDFs, JPEGS, Flash videos, etc., conferees in some cases will want to show content within the context of operating applications such as a word processor, a spread sheet application, various drawing programs, etc. One way to enable conferees to share content in operating applications is to allow a conferee to run an application on the conferee's computing device and share the conferee's device "desktop" with other conferees in a sharing window during a session.

In order to maintain a simple and intuitive interface where all features work in a similar fashion, as in the case of "fixed" documents that have a generally persistent form (e.g., PDFs, videos, etc.) and that are added to a session queue prior to sharing, prior to sharing a desktop during a session, an icon for controlling desktop sharing has to be provided in a queue on the session interface. To this end, see again FIG. 20 where the list of sources 534 includes a "My Desktop" option 531 that can be selected to add an icon for a conferee's desktop to a queue. Unlike static documents (e.g., a PDF, a JPEG, etc.) that do not change and therefore can be uploaded and cached in queues by devices linked to a session once for subsequent use, a desktop is dynamic (e.g., changes as a conferee interacts therewith) and therefore caching a desktop is not generally an option. Instead, when a desktop is added to a queue, only a desktop icon is added to the queue where the icon can be used to start a desktop streaming process when selected for sharing.

Figure 45:
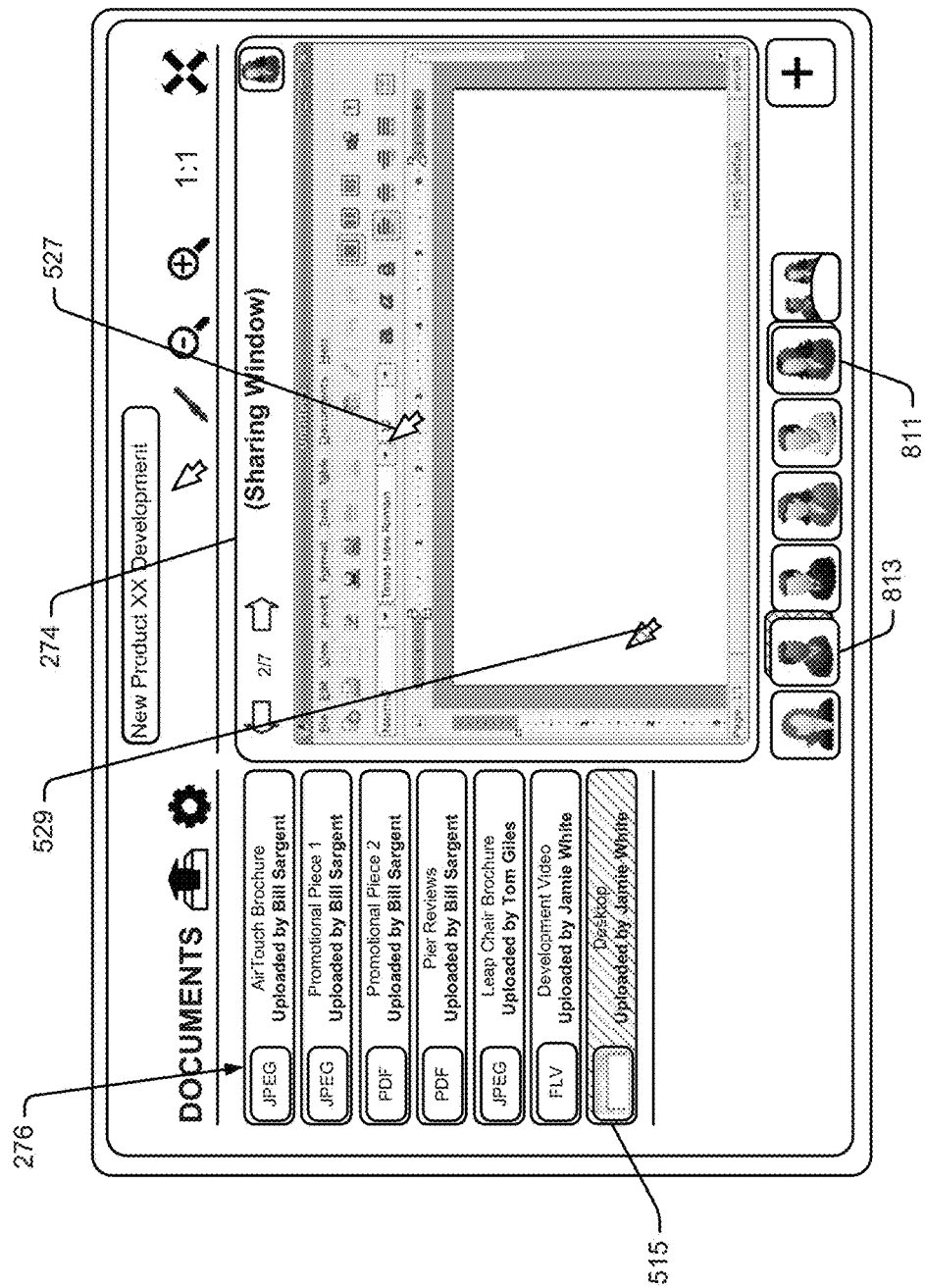
FIG. 45 is a screen shot that shows a conferee's desktop being shared in a sharing window.

Referring to FIG. 45, in at least some cases a desktop icon 515 may be added to a general document queue for a session to be moved into a sharing window 274 by any conferee at any time. Here, it is contemplated that when a conferee other than the conferee associated with a desktop icon uses the desktop icon to share another conferee's desktop, an intermediate step may occur where the conferee associated with the desktop to be shared has to authorize the sharing process. For instance, upon a conferee attempting to share another conferee's desktop, a pop up window may appear on the display screen of the device used by the conferee associated with the desktop to be shared querying whether the conferee authorizes sharing or not. In this case desktop sharing would only commence upon an affirmative response.

In other cases desktop sharing in a session may be substantially restricted so that only a conferee that adds a desktop icon to a session queue can share the desktop in a sharing window. To this end, desktops are dynamic and therefore, as a conferee uses her desktop, the information presented on the desktop often is not intended for sharing in a session and instead, the desktop has to be prepared for sharing prior to the act of sharing. In this case, if any conferee could select the desktop of another conferee represented in the queue for session sharing at any time, a shared desktop could include information unintended for sharing when the act of sharing occurs. Restricting desktop icon selection to conferees that add a desktop to a session should avoid unintended desktop sharing.

Even though a desktop icon may only be selectable for sharing by a conferee that adds a desktop icon to a session queue, it is useful to include a desktop icon in queues on all session linked interface devices so that all conferees are aware that other conferees are contemplating sharing their desktops. Thus, in at least some cases, desktop icons may be presented in all session queues even though only one conferee (e.g., the conferee associated with a desktop) may be able to select each of the desktop icons for sharing. In at least some cases, while all desktop icons added to the session by any conferee may appear in each document queue, desktop icons that a specific conferee cannot select for sharing (e.g., desktop icons associated with other conferees) may be visually distinguished to indicate inability for the conferee to select. For instance, desktop icons that are not selectable by a conferee may be rendered semi-transparent to indicate that the icons cannot be selected.

In still other cases desktop icons may be added to private queues for each conferee so that only the conferee associated with the desktop sees the icon and can select the desktop icon for sharing. To this end, see again FIG. 28 that shows a conferee's desktop icon 513 in a private queue. By placing the desktop icon a private queue, a conferee has a sense that the desktop is private and will not be shared unless the conferee takes affirmative steps to share. In addition, where desktop icons are only presented in private queues, conferees are not confused by their appearance in the session document queue.

To move a desktop into the sharing window, a conferee simply drags (or double clicks) the desktop icon 515 (or 513 in FIG. 28 in the case where the desktop icon is in a private queue) into the sharing window 274 causing the document shared in the window 274 to be replaced by the desktop image. When the desktop icon is dropped in window 274, the device associated with the desktop icon starts to stream the dynamic desktop image to the session server 12 which in turn distributes the dynamic desktop image to all devices linked to the session. Each device receiving the streaming desktop uses the streaming desktop to drive the sharing window 274 on the interface in the session browser (see streamed image in window 274 in FIG. 45).

Because the device associated with a shared desktop icon is linked to the session and therefore typically has a session interface akin to the interface shown in FIG. 45 open when the desktop is shared, initially the streamed desktop image will often include the interface view in its current state. Where a conferee's device is windows based and the session interface browser is open in a first window, the conferee may maximize a second window and run an application in the second window that would become the streamed desktop image.

To end desktop sharing, the conferee that is sharing the desktop can re-access the session interface in the first window and move any content object including a static document, a conferee video, etc., into the sharing window. Similarly, any other conferee can end desktop sharing by moving a content object into the sharing window. When a conferee other than the conferee that is sharing a desktop image moves another content object into the sharing window 274, if the conferee that was sharing the desktop image is not viewing the session interface browser in a window, the window including the interface browser is automatically rendered viewable so that the conferee knows that the desktop sharing has ceased.

Where a conferee's device is screen based (e.g., different applications are opened on different screens that can be accessed one at a time as on many smart phones, tablet devices, etc.) and the session interface browser is open in a first screen, upon sharing the desktop image, the conferee may open a second screen and run an application on the second screen that would become the streamed desktop image. To end desktop sharing, the conferee that is sharing the desktop can re-access the session interface on the first screen and move any content object including a static document, a conferee video, etc., into the sharing window. Similarly, any other conferee can end desktop sharing by moving a content object into the sharing window. When a conferee other than the conferee that is sharing a desktop image moves another content object into the sharing window 274, if the conferee that was sharing the desktop image is not viewing the session interface browser on a screen, the screen including the interface browser is rendered viewable so that the conferee knows that the desktop sharing has ceased and to give the conferee a view of the session that is consistent with the view seen by other linked conferees.

Although not shown, in at least some cases, there may be a way for one or any conferee linked to a session to end desktop sharing by, in effect, blanking content in the sharing window so that no content is shared in that window. In this manner desktop sharing could be ended without requiring sharing of other content in the sharing window to avoid possible confusion if there is no other content that a conferee would like to share at the specific time.

In other cases, when a conferee shares a desktop by dragging the desktop icon into the sharing window on an interface browser, the conferee's device may automatically minimize the interface browser so that whatever is "below" the browser on the conferee's device is immediately viewable on the conferee's device display and therefore is immediately streamed to server 12 and on to the other session linked devices for sharing. This process eliminates the intermediate step of streaming the session interface to all conferees that has to be minimized prior to sharing the intended desktop content. Thus, here, a conferee intending to share a desktop application would open the desktop application in a second window or on a second screen and prepare the application. For instance, where a drawing program is to be shared, the drawing program would be opened in the second window or on the second screen and then the session interface browser in the first window (e.g., a window in addition to the window in which the session browser is operating) or on the first screen would be used to drag the desktop icon to the sharing window 274. Upon sharing the desktop, the first window or screen would be minimized and the second window or screen showing the session browser including the prepared drawing application would be shared.

In still other embodiments an intermediate step prior to sharing would occur to enable a conferee to confirm that a desktop is ready to share or to prepare the desktop prior to sharing. For instance, the intermediate step may include presenting the current state of a conferee's desktop in a private view so that the conferee can confirm that the desktop is in condition for sharing. To this end, in FIG. 28, when the desktop icon 515 is dragged to sharing window 274, the conferee's desktop may be shown as part of an intermediate step as in FIG. 46 with the session interface removed from the conferee's display and the current state of the desktop shown as at 737. Here, the conferee can manipulate the desktop in real time to control a maximized application, open new windows to run other applications, search web pages to be shared, overlap several windows with several different applications opened and operating at the same time, etc.

Figure 46:
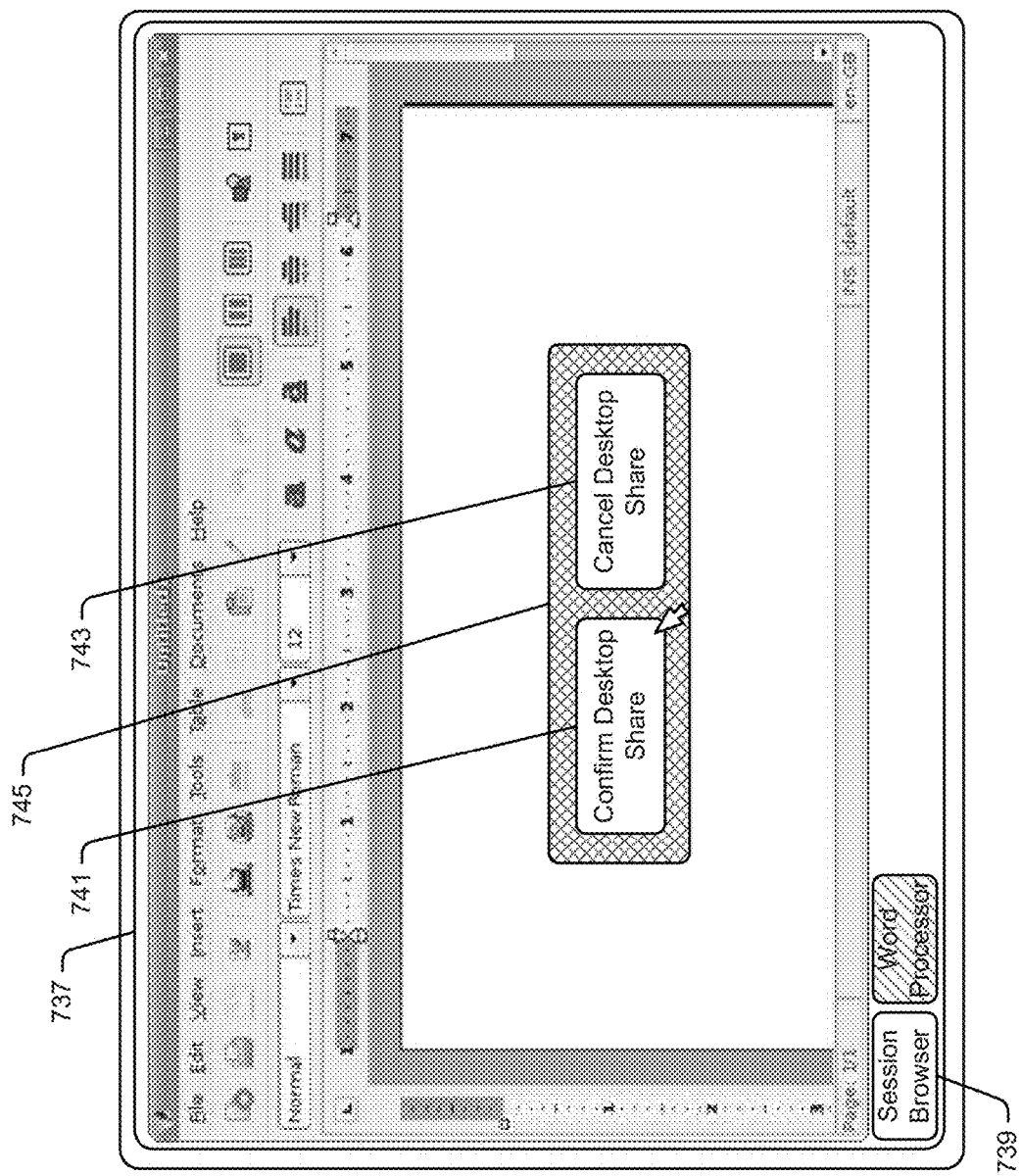
FIG. 46 is a screen shot showing an intermediate step that occurs when a conferee starts the process of sharing the conferee's desktop to ensure that a desktop is not inadvertently shared.

In addition to showing the current state of the conferee's desktop, the FIG. 46 view adds a session browser icon 739 to the open applications toolbar at the bottom of the view that can be selected to re-access the session interface browser. In addition, the device presenting the FIG. 46 view also presents a simple sharing control overlay 745 to the conferee that is considering sharing the desktop. The sharing control overlay includes a "Confirm Desktop Share" icon 741 and a "End Desktop Share" icon 743. Once the conferee has prepared the desktop for sharing via the FIG. 46 interface, the conferee commences sharing by selecting icon 741. Prior to selection of icon 741 the desktop has not been shared in the session and thereafter, the device presenting the desktop streams the desktop image to server 12 and on to the other session linked devices to be presented in the sharing spaces 274. If the conferee decides not to share the desktop, the conferee selects icon 743 which re-maximizes the session interface browser (see again FIG. 45) without sharing the desktop.

If the desktop is shared, during the sharing process, in at least some embodiments the device sharing the desktop presents a persistent sharing control overlay for ending the desktop sharing activity. To this end see the exemplary screenshot 755 in FIG. 47 where a control overlay includes a "Cancel Desktop Share" icon 743 that can be selected at any time to end the desktop sharing activity and return to the session interface browser view. In at least some cases the control overlay is only presented on the desktop that is being shared and is not streamed as part of the desktop image to the server 12 or other session linked devices.

While the system described above requires a conferee to affirmatively add a desktop icon to a queue prior to sharing a desktop from the conferee's device, in other cases a desktop icon may automatically be added to the session document queue or to the private queue for each conferee interface device linked to a session. Thus, for instance, in a case where desktop icons are located in private queues, each of ten conferees linked to a session would have a unique desktop icon in his or her private queue (see again FIG. 28) at all times and manual addition of the icon to a queue would not be required. By providing desktop icons automatically in a queue, possible confusion related to whether or not a desktop can be shared and how to upload a desktop icon can be avoided. Here, because desktop images are not cached and instead are streamed only when shared, adding desktop icons automatically to session interfaces does not require caching and does not require streaming until a conferee actually shares a desktop with other conferees.

In some embodiments only a conferee sharing a desktop can control the applications run on the conferee's desktop. For instance, where a conferee shares a word processor document via a session interface, the conferee can manipulate the document by adding text, changing fonts and font size, highlighting text, adding a table, etc., but other conferees viewing the desktop shared in a sharing window 274 of a session interface can only watch the application being manipulated.

Figure 47:
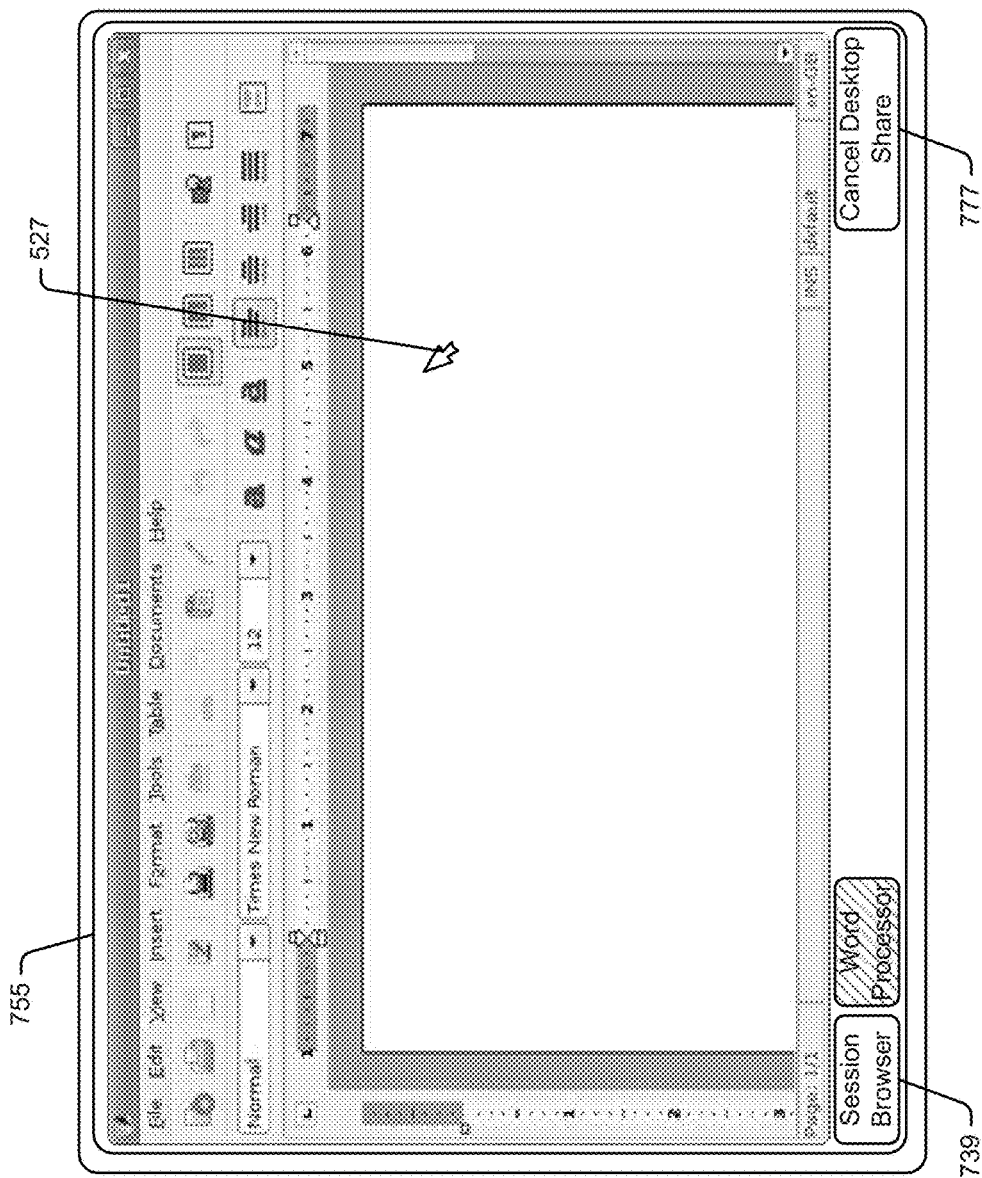
FIG. 47 is a screen shot showing a view that a conferee may have when the conferee's desktop is being shared in a session.

In other cases it is contemplated that any conferee may be able to interact with any application that is shared by another conferee via a shared desktop. To this end see again FIGS. 45 and 47. Here it is assumed that the conferee associated with icon 811 in FIG. 45 is sharing a desktop as shown in FIG. 47 and that other conferees see the shared desktop as shown in the sharing window 274 in FIG. 45. Pointing icon 527 is controlled by the conferee sharing the desktop while pointing icon 529 is controlled by the conferee associated with icon 813. The conferee icons 811 and 813 are highlighted or otherwise visually distinguished in a fashion similar to the pointing icons 527 and 529, respectively, so that conferees can discern which conferee is controlling which pointing icon. For instance, the shadow boxes about icons 811 and 813 may be red and blue respectively and the pointing icons 527 and 529 may also be red and blue, respectively.

As pointing icon 527 is moved about on the desktop shown in FIG. 47 and as the desktop is used to modify the word processor document, movement of the icon 527 and document modifications are simply reproduced on all session linked devices as part of the dynamic streaming desktop image.

To enable the conferee associated with icon 813 to control the streaming desktop shared by the conferee associated with icon 811, the precise locations of any activity on the image of the shared desktop in space 274 are identified and commands related to the activities are correlated with the locations and the locations and commands are transmitted to the conferee device that generates the desktop. For instance, referring again to FIG. 45, as icon 529 is moved about on the desktop image in window 274, the location of the icon and a command to create the pointing icon are transmitted to the device generating the desktop. As another instance, if a conferee clicks on a point in the word processor document, the click location and a command indicating that a click occurred are transmitted to the device generating the desktop. As one other instance, after a click at a location, if a conferee types a word, the locations of each letter and each letter generated are transmitted to the device generating the desktop.

Upon receiving locations and associated commands, those locations and commands are used by the operating system and applications on the device generating the desktop to drive the operating system and the applications. For instance, the command to generate a pointing icon is used to create a pointing icon on the desktop image at the associated location on the desktop image, the command to click at a point in a word processor document is used to generate a cursor at the associated location, and the commands indicating locations and associated letters that comprise a word are used to drive the word processor program to add the letters at the associated locations in the document. As the commands and associated locations are converted into changes to the desktop image, the resulting new desktop images are streamed to the server 12 and on to the session linked devices to be shared among the session conferees. In these cases, the session browsers are equipped to obtain commands for controlling the operating system and applications run by a device linked to a session and can transmit those commands to the operating system and applications to be performed to control the operating system and applications to change a desktop image essentially in real time.

In other embodiments where a software application is ubiquitous so that every device or at least a sub-set of devices linked to a session have the application loaded or can obtain free access to the application (e.g., internet based word processors, spread sheets, etc.), when an application is shared, each device may open its own instance of the application and load up a document from the shared application for viewing and interaction. Here, any conferee input from any conferee may be streamed to each session linked device and may be used to update the device specific instance of the application and shared document. This type of system where a shared application is run by each linked device and an instance of a shared document on the application is stored on each linked device, like the cached documents, can expedite the process of sharing the application, the related document and any edits, annotations, etc. made to the document.

Figure 56:
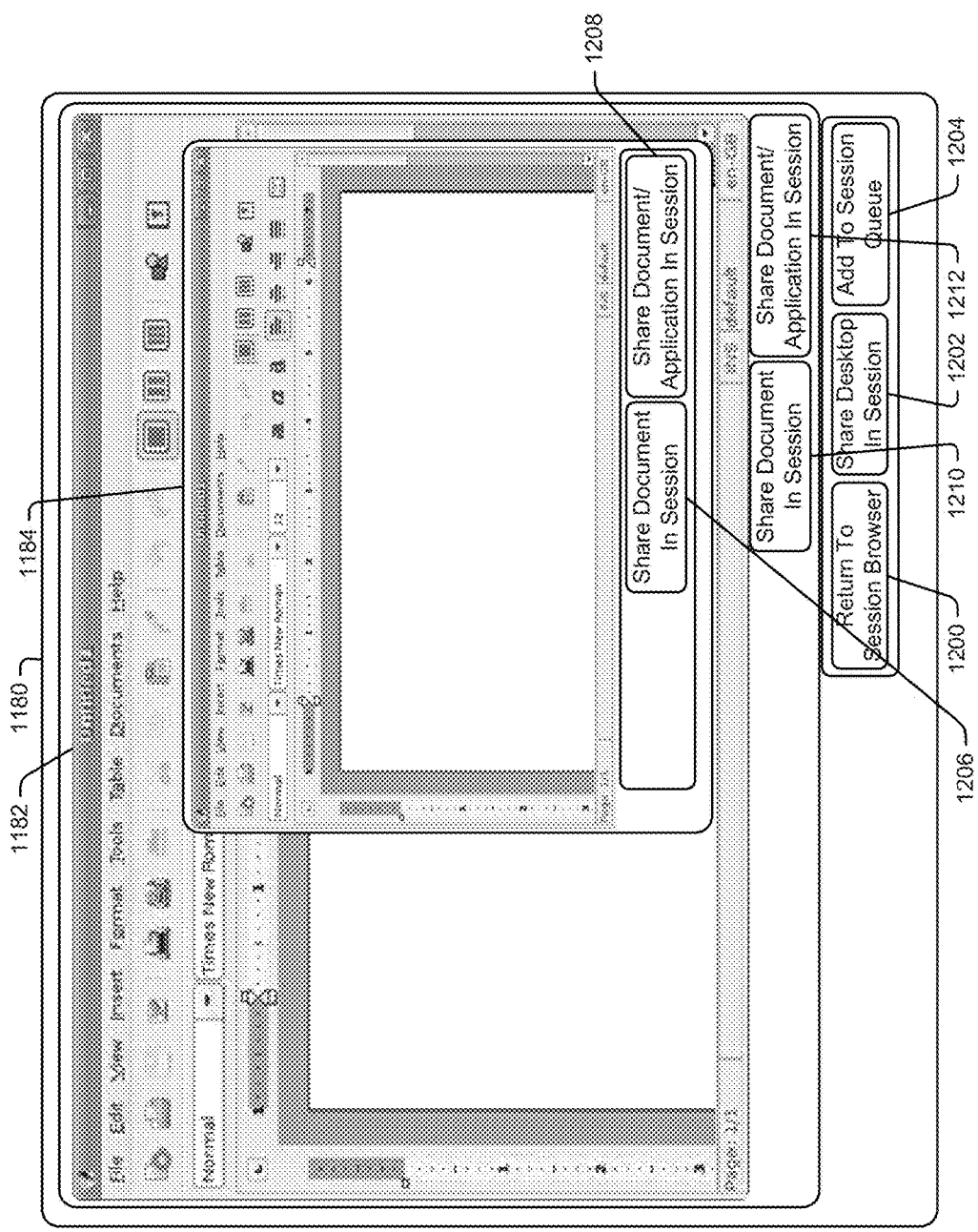
FIG. 56 is a screen shot showing output of a conferee's device display that enables a conferee to share output of applications run on the conferee's device with other conferees linked to a session.

In at least some embodiments, it is contemplated that any time a conferee has the session application open in a browser window or on a browser screen, the system may present a session overlay or border for sharing the conferee's desktop image or adding the desktop to the session queue whenever the conferee is viewing a window or screen other than the session window or screen. Thus, for instance, referring again to FIG. 42, assume that the conferee associated with icon 921 wants to share an application running on a different screen on her device. The conferee may use a standard interface feature on her device to switch to the other screen causing her device to present the other application as shown in FIG. 56. Upon switching to the other screen, the device may present the application open on the other screen as shown with a sharing overlay that includes a "Return To Session Browser" icon 1200 and a "Share Desktop In Session" icon 1202. To return to the session open on the session browser screen, the conferee can select icon 1200.

Here, the conferee may switch to another application open on yet a different screen and the overlay including icons 1200 and 1202 would be persistently presented. Once the conferee opens an application that the conferee would like to share, the conferee can simply select icon 1202 to start streaming the conferee's current desktop image to the session server and on to the session linked devices for sharing in the sharing window. Once sharing commences, desktop sharing can be halted in any of the ways described above (e.g., selection of a cancel icon 777 as in FIG. 47, etc.). Instead of immediately sharing the desktop and opened application, the conferee may select the "Add To Session Queue" icon 1204 to add a desktop icon to the session queue in cases where a desktop icon is not already automatically included in the queue.

Here, while an application in a screen is being shared, the sharing conferee can control the application to change content and the changes would be presented to other linked conferees. In addition, the sharing conferee could switch to a different screen in which a different application is open and that application would be shared with session linked conferees. When the conferee switches to a different application to share, the overlay shown in FIG. 47 would persist so that the conferee could cancel desktop sharing or return to the session browser at any time.

It has been recognized that, instead of sharing content via dynamic applications (e.g., a spreadsheet, a word processor application, a drawing application, etc.) via desktop sharing, in at least some cases a conferee will want to share only an application without sharing an entire desktop. For instance, while a conferee is using a smart phone, a tablet type device, a laptop or the like, often times information will appear on the device screen that is out of the control of the conferee. For example, an instant message window may pop up to present a message from a friend at any time or a meeting or appointment reminder window may pop up at any time. As another instance, a conferee may prefer sharing on an application by application basis as opposed to a dynamic desktop so that the conferee does not inadvertently and unintentionally share an application or content in the application.

In addition, it has been recognized that in many cases conferees will want the ability to privately peruse content or a document associated with a dynamic application that another conferee places in a session queue in a manner akin to that described above with respect to static documents at any time prior to, during or after a session period. Thus, for instance, it would be useful in many cases for a first conferee to add a first word processor document that exists in a dynamic application to a session queue for access via the application during a session and for any conferee invited to the session to be able to view the first word processor document even if the conferee cannot access or control the application on the first conferee's device.

In at least some embodiments it is contemplated that the system will enable any conferee to add a document or file to a queue where, at the time the document or file is added to the queue, the document or file only exists as content in a dynamic application. Here, upon adding a document to the queue, in at least some cases, the document is added in a format that captures the content of the document in a persistent fashion which is independently accessible by any conferee at any time unless the document is affirmatively removed from the session queue. For instance, in at least some cases a PDF or JPEG of the document may be generated and added to the queue to be accessed by any conferee. In this case, the PDF or other format document in the queue may represent the document itself or, in other cases, may represent screen shots of the output of the dynamic application including the content (e.g., a specific document) to be shared presented within the application itself. Documents generated for the queue in this fashion are cached for quick access by any of the session linked devices.

Once an application and associated content is added to the session queue as a document, in addition to any conferee being able to open the document in a private window, any conferee may also move the document into the sharing window via double clicking the document, dragging an icon associated with the document from the queue to the sharing window, etc. When the document is opened in a private window, in at least some embodiments, the document is opened in a static form as opposed to within the application associated with the document so that, when in private view, none of the conferees can use the associated application to alter the content of the document.

In at least some cases, whenever any conferee opens a document associated with a dynamic application in the sharing window, the application associated therewith is automatically run and the document is opened within the application in the sharing window so that any conferee may edit the document using the application in the sharing window. Here, when a document is edited in a sharing window, in at least some cases, the edits to the document are stored on the device of the conferee that added the original document to the queue and a new persistent (e.g., a PDF) version of the document is generated and stored in the queue as part of the session record for subsequent access.

In other embodiments, when a document or file associated with a dynamic application is added by a first conferee to a session queue, only the first conferee may be able to edit the document despite the capability of other conferees to access the shared persistent version of the document. For instance, when a word processor application and associated word process document is shared by a first conferee by placing the application/document in a session queue and the document is represented as a PDF (e.g., in a persistent form), conferees other than the first conferee may only be able to access the PDF version of the document. Here, when a second conferee shares the document in the sharing window, only the PDF version of the document may be presented.

If, however, the first conferee shares the document from the queue by dragging the document to the sharing window, the system may automatically cause the first conferee's device to run the application associated with the shared document, load the shared document and start to stream the shared document to the session server to be passed on to the other session linked devices. Here, once the document is opened in the associated application and the application and document are being streamed to the other linked devices, the first conferee can used the conferee's device to manipulate or edit the document within the application and those manipulations are shared with the other conferees via their devices essentially in real time.

In this case, because only the application as opposed to the first conferee's complete desktop is shared, any pop up windows will only appear on the first conferee's device and not within the shared session window or space. Similarly, if the first conferee opens a second screen or window to access a second application while the document and first application open in a first screen or window are being shared, the contents in the second screen or window are not shared.

In at least some embodiments it is contemplated that any conferee may be able to add two or more applications and related content (e.g., a document) to a session queue. For instance, a first conferee may add each of a first word processor document in a word processor application and a first spreadsheet in a spreadsheet application to a session queue. Thereafter, the first conferee may be able to access any of the applications in the queue at any time to open the application and related document for private viewing, sharing, etc.

Referring again to FIG. 56, the exemplary screen shot shows a desktop image 1180 where two different applications are opened in first and second windows 1182 and 1184 and where the second window 11845 overlaps the first window 1182. Here, each application window includes an overlay or border section that includes session related icons for sharing applications presented within the separate windows. To this end, window 1184 includes a "Share Document In Session" icon 1206 and a "Share Document/Application In Session" icon 1208 as part of the overlay or border to be presented via a conferee's device when the conferee is linked to a session and the conferee accesses an application in a window or on a different screen from the window or screen in which the session interface is presented. Icon 1206 can be selected to open a persistent version (e.g., a PDF) of the document in the sharing window of the session interface. In this regard, when icon 1206 is selected, the system generates (e.g., automatically prints a PDF version) a persistent version of the document presented via the application in window 1184, adds the document to the session queue if its is not already in the queue, cashes the document for access via each of the session linked or at least session associated (e.g., some devices by be associated with a session but not currently liked) conferee devices and causes each of the session linked devices to open the shared document in a sharing window.

Referring still to FIG. 56, icon 1208 can be selected to duplicate the output of application running in window 1184 in the shared window of the session interface including the document currently presented in window 1184. In this regard, when icon 1208 is selected, the system streams the output of the application running in window 1184 to the session server which passes the streamed video to all other session linked devices for substantially real time sharing. At this point, instead of seeing the entire desktop image as shown in FIG. 56, session conferees will see the application output from window 1184 in the sharing windows of the session interfaces. Once the application is shared, any edits to the document presented by the application are presented simultaneously via all of the shared windows.

Referring yet again to FIG. 56, a separate set of session control icons are presented as part of an overlay or border for window 1182 including a document sharing icon 1210 and an application sharing icon 1212. Icons 1210 and 1212 operate in a fashion similar to that described above with respect to icons 1206 and 1208. Thus, for instance, if a first conferee is sharing the application currently running in window 1184 in a session sharing window of the session interface and the first conferee selects icon 1212, the system would change to duplicate or replicate the application and content from window 1182 in the sharing windows of the session interfaces.

In at least some cases it may be that a window overlay or border including session control icons would only be provided for a top window when windows are layered on top of each other to avoid confusion or so that space on a display screen is not taken up by too many session control icons. Thus, for instance, in FIG. 56, because window 1184 is on top of window 1182, the overlay including icons 1206 and 1208 may be presented while the overlay for window 1182 including icons 1210 and 1212 may not be presented. If window 1182 were moved to the top spot, the overlay would be removed from window 1184 and presented for window 1182 in this case.

In at least some cases, after a conferee shares an application and content associated therewith, the conferee can navigate to other windows or screens including the session interface or some other application program to perform other tasks while the shared application and content are continually presented via the shared windows. Thus, for example, in FIG. 56, if the application in window 1184 is shared, the conferee that shared window 1184 may select window 1182 to bring the application run therein to the top of the desktop and may edit the document presented in window 1182 while still sharing the application in window 1184. This feature enables great flexibility for an application sharing conferee to continue to perform various tasks while still sharing an application.

Figure 48:
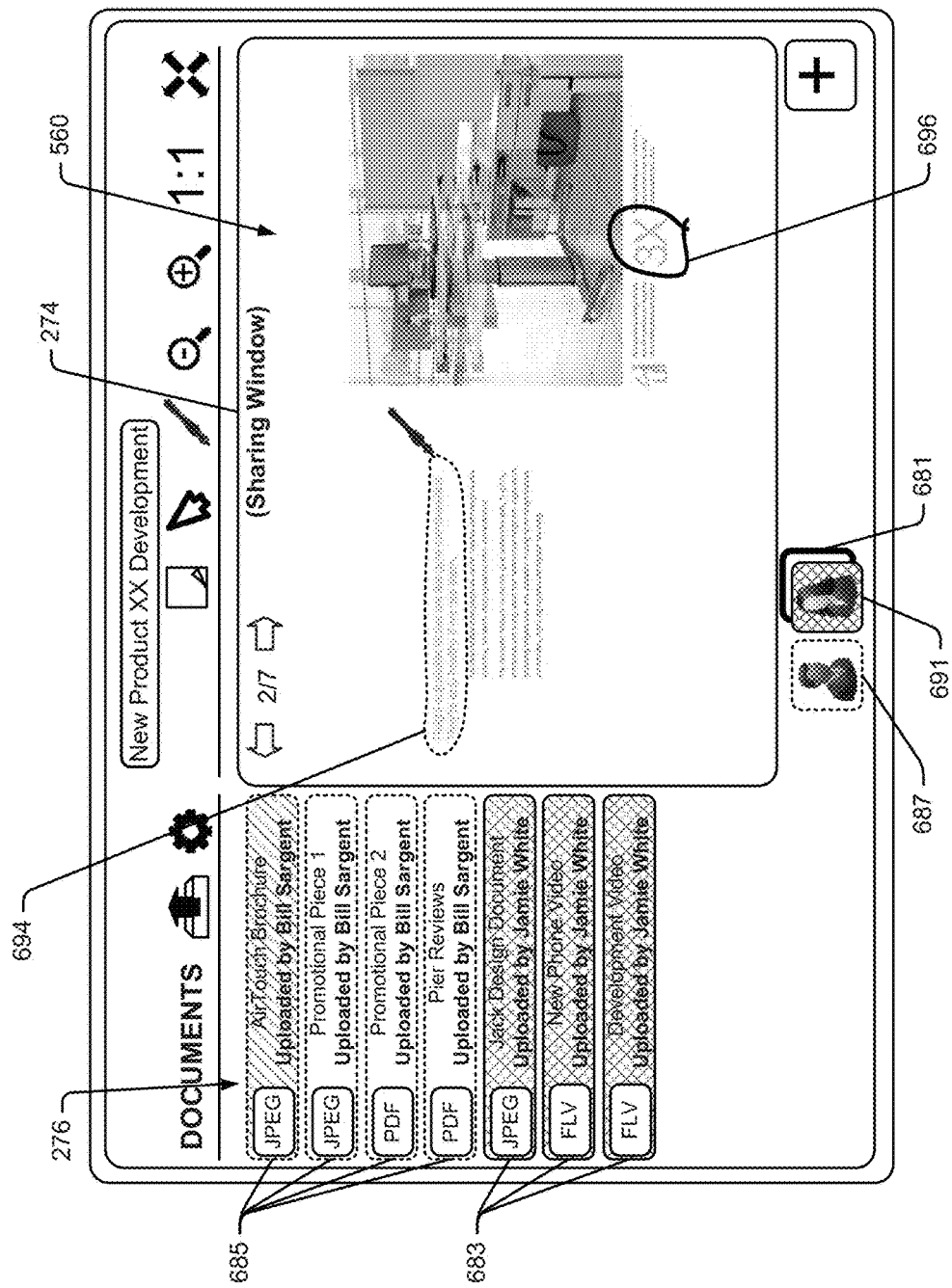
FIG. 48 is a screen shot showing differently visually distinguished features on a conferee device display linked to a session where the different appearances indicate ownership of actions, documents, etc., associated with the features.

Referring to FIG. 48, an exemplary session interface screen shot is illustrated that shows various highlighting and other visual effects meant to convey ownership of different activities on the screen. In this regard, the exemplary interface includes a shared document 560 in sharing window 274 where cross hatching of a first document icon 561 in the document queue 276 indicates that the document in the sharing window 274 is associated with icon 561. The shadow box 681 on conferee icon 691 indicates that the conferee associated with icon 691 opened the document in sharing window 274. Each document icon in queue 276 is highlighted with a distinguishing border that indicates which conferee added the document to the session queue. For instance, each of icons 685 is highlighted via a dashed border to indicate that each of those documents was added to the queue by the conferee that is associated with the conferee icon that has a similar dashed border (e.g., icon 687) in the conferee queue. Similarly, each icon in the set labelled 683 has been double cross-hatched to indicate that each of those documents was added to the queue by the conferee that is associated with the conferee icon that has a similar double cross-hatching (e.g., icon 691) in the conferee queue.

Referring still to FIG. 48, annotations of a document page in window 274 also have appearances that are keyed to the different conferees. For instance, annotations by the conferee associated with icon 691 that has a solid border may include solid lines as at 696 while annotations by the conferee associated with icon 687 that has a dashed border may include dashed lines as at 694. While shown as solid and dashed lines and borders, in particularly advantageous embodiments all of the borders and lines use colors to visually distinguish. Thus, in FIG. 48 for instance, all dashed lines and borders may be red while all solid lines and borders associated with document icons, conferee icons and annotations may be blue to help conferees quickly discern who is doing what regarding the session interface.

Figure 49:
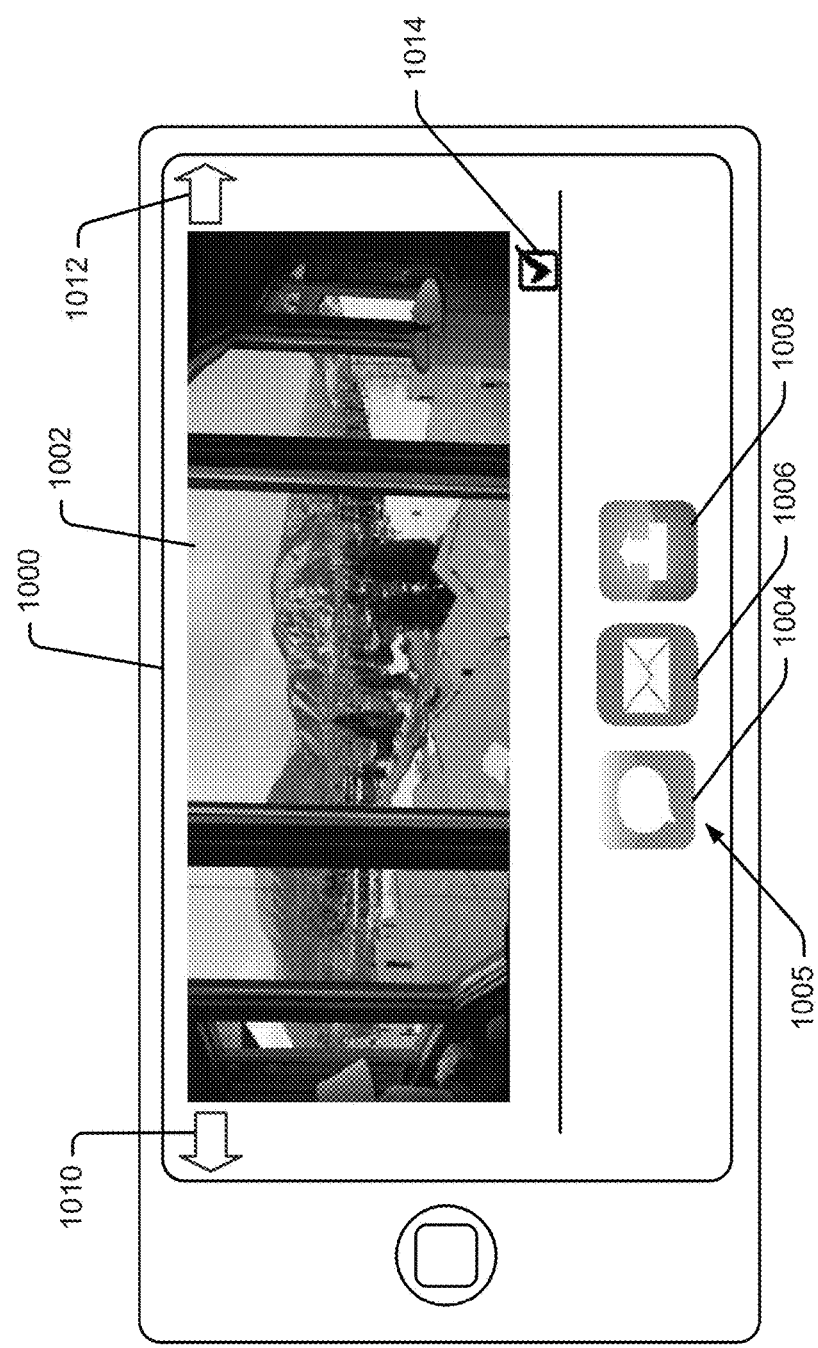
FIG. 49 shows a smart phone type device including an interface for adding an image to a session queue with minimal friction.

It has been recognized that a smart phone or tablet type device or even a camera that is capable of wireless communication represent particularly advantageous devices for generating content to be shared in a session. To this end, a session application may be loaded on to a smart phone that enables a conferee to quickly and easily upload images obtained via the phone camera to a session queue. Referring to FIG. 49, in at least some cases a conferee can use a phone camera, digital camera or other device including a digital camera to take one or more pictures/images or video to be added to a queue. Then, when the conferee accesses a conventional image sharing menu 1005 that enables the conferee to share images via a chat application (see chat icon 1004 in FIG. 49), an e-mail application (see e-mail icon 1006) or other sharing applications, a session icon 1008 may be presented along with the other sharing application icons that can be selected to add an image to a session queue.

Figure 50:
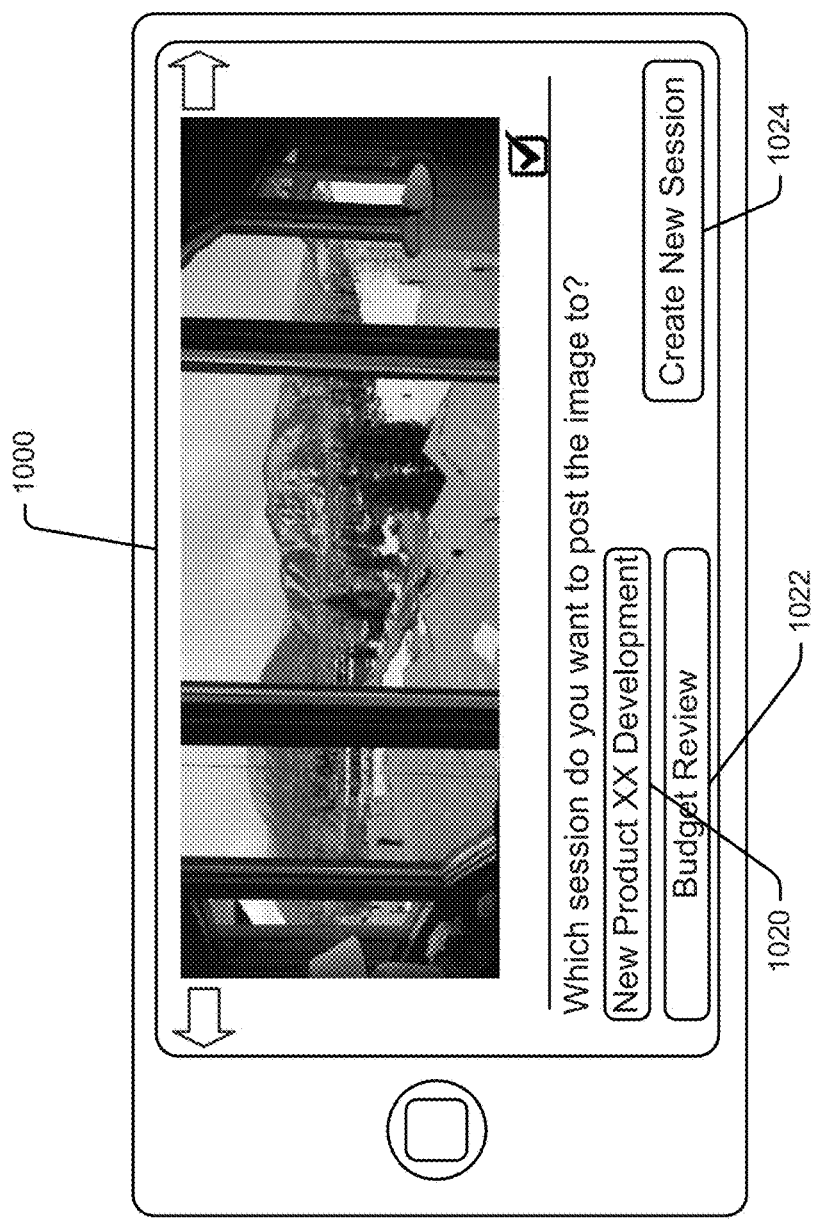
FIG. 50 is similar to FIG. 49, albeit showing the device in an intermediate state where a conferee selects one of several sessions to which to add an image.

To add one or more images to a queue, first the conferee uses screen arrows 1010 and 1012 or some other on screen navigation tool like a swiping action to locate the images to be added to the queue. Images to be added can be tagged via selection of an on screen check box 1014. Once images to add to the queue have been selected, the conferee selects session upload icon 1008. In at least some embodiments, when icon 1008 is selected, an interface for selecting one of several existing session queues or to start a new session queue is provided as shown in FIG. 50. FIG. 50 includes a separately selectable icon 1020 and 1022 for each session that the specific conferee is currently associated with. Thus, each conferee that uses the system may have a different set of session options presented. FIG. 50 also includes a "Create New Session" icon 1024 that can be selected to instantiate a new session with a new session queue to which one or more images can be added.

It has also been recognized that it would be helpful if the conferencing system were able to distinguish new files in a queue from old files. Here, the terms "new" and "old" may mean different things in different systems. For instance, a new document to a specific conferee may mean a document added to the queue since the last time the conferee accessed the session queue. As another instance, a new document to a specific conferee may mean a document that has never been opened while the conferee was logged into a session regardless of whether or not the document was in the queue the previous time the conferee logged into the session. As still one other instance, even if a document has been viewed by a conferee, if the document has been changed via annotation, addition of a note, etc., the document may be considered "new" to a conferee.

In at least some embodiments documents that are new to a conferee may be highlighted or otherwise visually distinguished in some fashion. For instance, in FIG. 51, documents 1050 that have been added to the session queue 276 since the last time Jamie White accessed the queue are shown highlighted in cross hatch. In the alternative, the cross hatched document icons 1050 may indicate documents that have never been opened while Jamie White was logged into a session or documents that have at least been changed since Jamie White was last linked to a session. In some cases documents newly added to the queue may be visually distinguished (e.g., shown in different color) in a fashion different than documents that have been changed and/or documents that have been in the queue for some time but that have never been opened while a particular conferee was logged onto a session. For instance, for a first conferee, newly added documents may be highlighted red, changed documents may be highlighted blue and old documents never opened while the first conferee was logged on to a session may be highlighted green.

Where several conferees are logged into a session at the same time, the highlighting to indicate "new" documents may be different for each conferee. For instance, a first conferee may have been logged in for each of five conferences related to a session while a second conferee only logged in for two of the five. In this case it is highly likely that the first conferee has viewed more queue documents than the second conferee and therefore the second conferee would have more document icons highlighted as "new" than the first conferee.

Instead of highlighting new documents in the session queue, the system may present two queues, one including new documents and the other including old documents. In this case the interface including both queues may look a lot like the interface in FIG. 28 except that the queues 672 and 674 would be labeled "old" and "new" instead of "session" and "private." In still other embodiments it is contemplated that a third category of documents may be distinguished by the system including, for instance, documents in the queue but never opened while a specific conferee was logged onto the system, but that were reviewed by other conferees in a prior sharing session. This third category may be visually distinguished (e.g., highlighted using a third color) or presented in a third suitably labeled queue. A fourth category may include documents viewed by a sharing sub-set of session conferees since the last time a specific conferee participated in a conference associated with the session. This would help a conferee understand what was missed during a recent conference.

In some embodiments a conferee may be able to cause the system to highlight documents added to a queue by that conferee or any one conferee or sub-set of conferees so that those documents can be easily distinguished. For instance, see FIG. 51 where each document icon 1052 added to the queue by Jamie White is shown with a shadow box. Highlighting icons for a conferee may be automated where icons added by each conferee are automatically highlighted in some fashion on the device used by the specific conferee. In other cases a conferee may be able to select (e.g., double click) a conferee icon (see 1055 in FIG. 51) in the conferee queue 278 to cause the system to highlight all documents added to the session queue by that conferee. For instance a conferee could select icon 1055 to highlight icons in queue 276 associated with documents added to the queue by the conferee associated with icon 1055.

It has further been recognized that it would be advantageous for at least some conferees to be able to look back at session conferences/meetings and see the sequence of various aspects of document manipulation. For instance, a conferee may want to see the sequence by which documents have been added to a session queue, the sequence in which documents have been accessed in session conferences, who posted and who accessed the documents, etc. To this end, in at least some embodiments a "History" icon 1048 as shown in FIG. 51 may be included on a session screen that can be selected to access a history function of the system.

Figure 51:
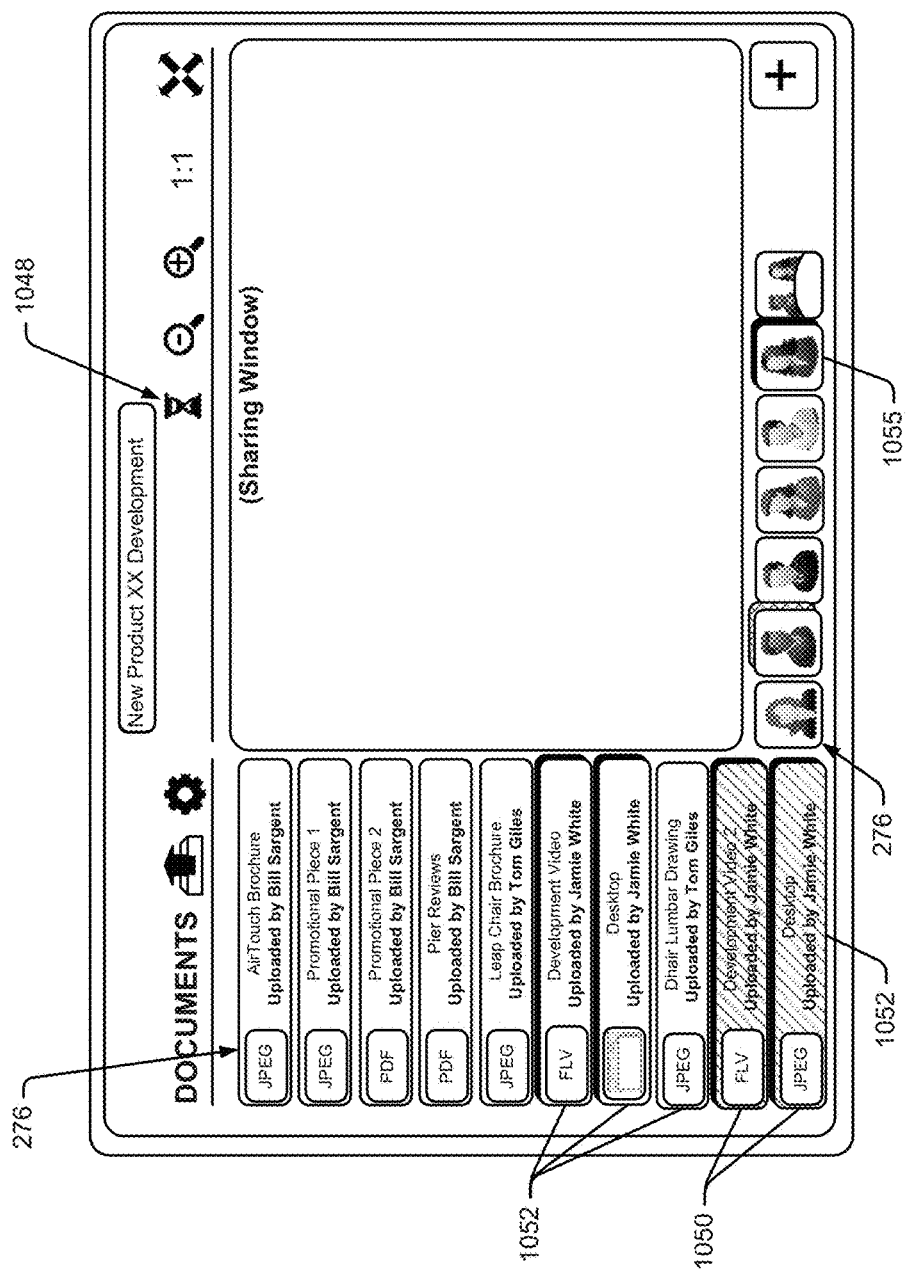
FIG. 51 is a screen shot showing highlighting of a specific conferee's documents in a queue as well as highlighting of documents that are "new" to the conferee associated with the device used to present the screen shot.
Figure 52:
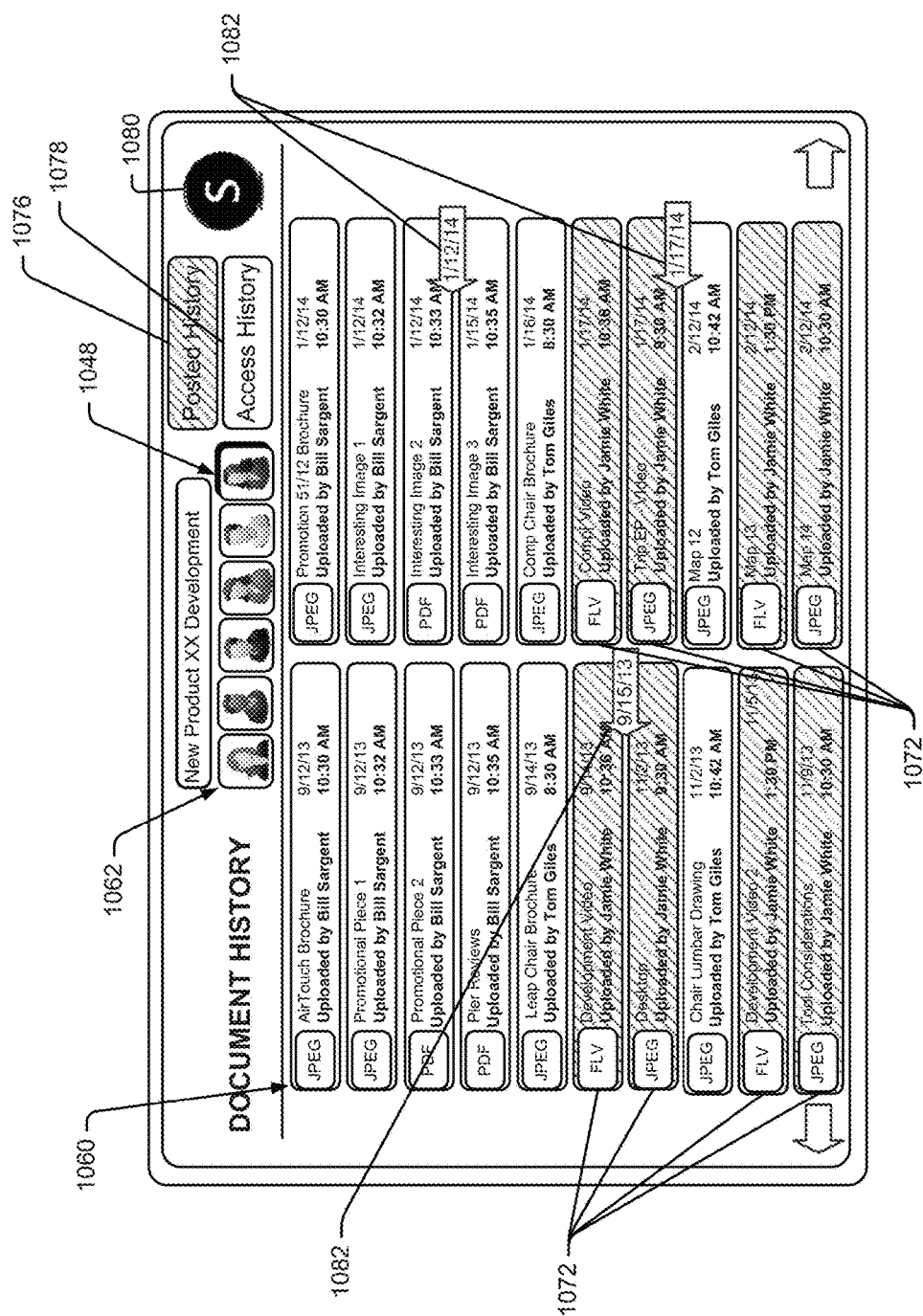
FIG. 52 is a screen shot showing a history view of a session.

When icon 1048 is selected, referring also to FIG. 52, the system may present a document history screen for viewing different aspects related to document sequencing. As shown, the view includes a document list 1060 showing the date and time documents where added to the queue. The view also includes a conferee queue 1062 showing images or video of each conferee currently linked to a session. In the alternative, the queue 1062 may show all conferees that ever participated in a session regardless of whether or not the conferee is currently linked to the session. Here, as in FIG. 51, a conferee may be able to highlight all documents in queue 1060 added to the queue by a specific conferee by selecting the conferee's icon in queue 1062. In FIG. 52, the conferee icon 1070 associated with Jamie White has been selected and is highlighted with a shadow box and document icons 1072 in queue 1060 that were added by Jamie White are shown highlighted with cross hatching to distinguish those documents from others in the queue.

Meeting icons 1082 are also provided on the view that indicate specific points in time at which session conferences occurred. Here, a session conference may include any session during which two or more conferees were logged on to a conference at the same time, during which more than half of the conferees associated with a session logged on, during which one or more documents have been shared among at least two or more conferees, or any other criteria that indicates a threshold level of activity. Each icon 1082 may operate as a hyperlink to other information about a session conference including a list of conferees that attended, documents reviewed and applications run, times related to document sharing and a log of additional activities.

Referring still to FIG. 52, the view includes a "session" icon 1080 for switching back to a session view as shown in FIG. 51. A "Posted History" icon 1076 is included for selecting the posted queue 1060 shown in FIG. 52. An "Access History" icon 1078 is provided for accessing another view of the document history that shows which documents were accessed and when. To this end see the view in FIG. 53 where document icons are arranged in an access queue 1100 that sequentially shows when (date and time) documents were accessed and by whom.

Figure 54:
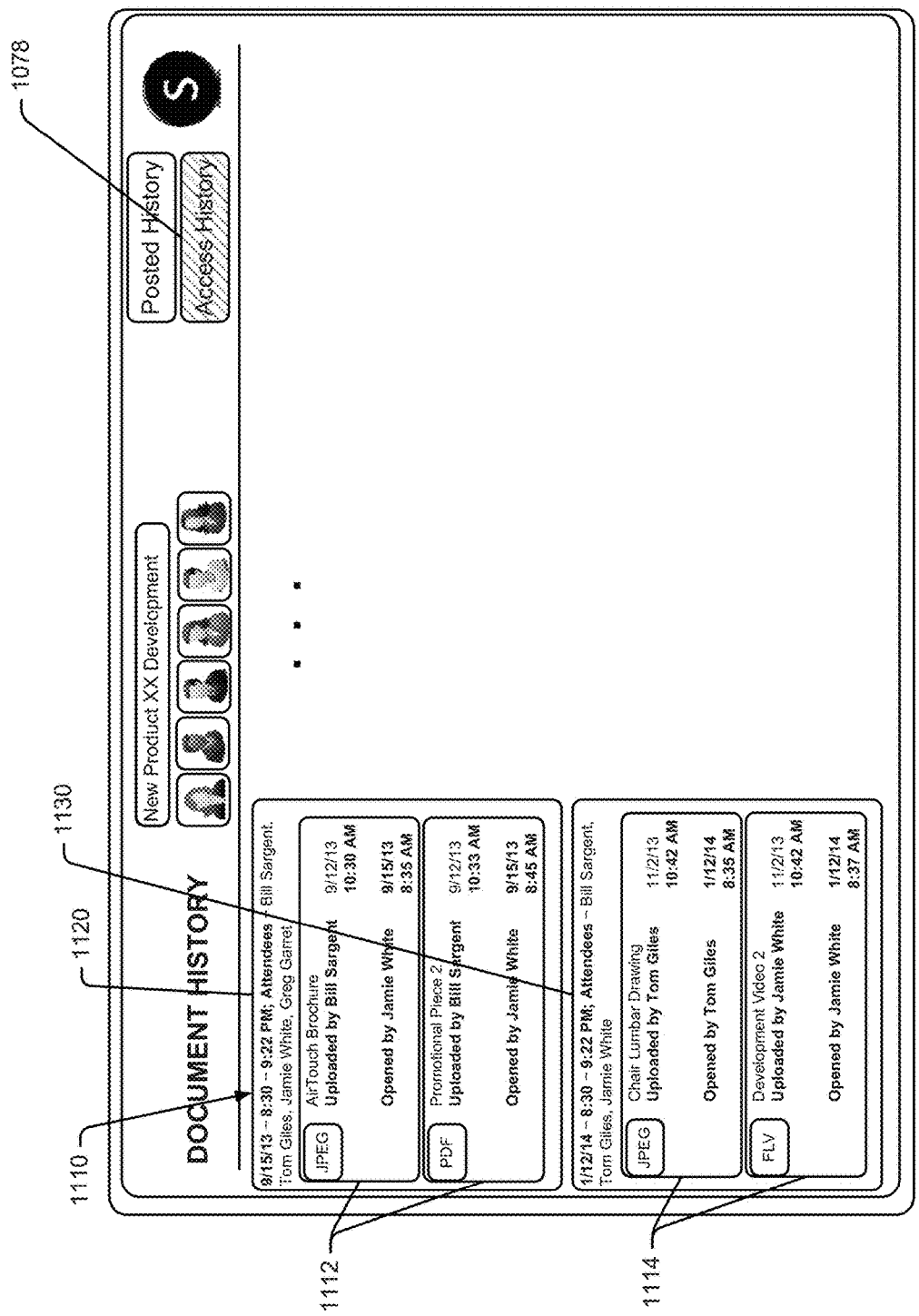
FIG. 54 s a screen shot showing a different session history view.

Referring to FIG. 54, another access view includes a document queue 1110 that arranges document icons by session conference. For instance, queue 1110 includes a first meeting entry 1120 and a second meeting entry 1130 where icons 1112 associated with documents accessed during the first meeting and icons 1114 associated with documents accessed during the second meeting are presented in the first and second meeting entries 1120 and 1130, respectively.

Figure 53:
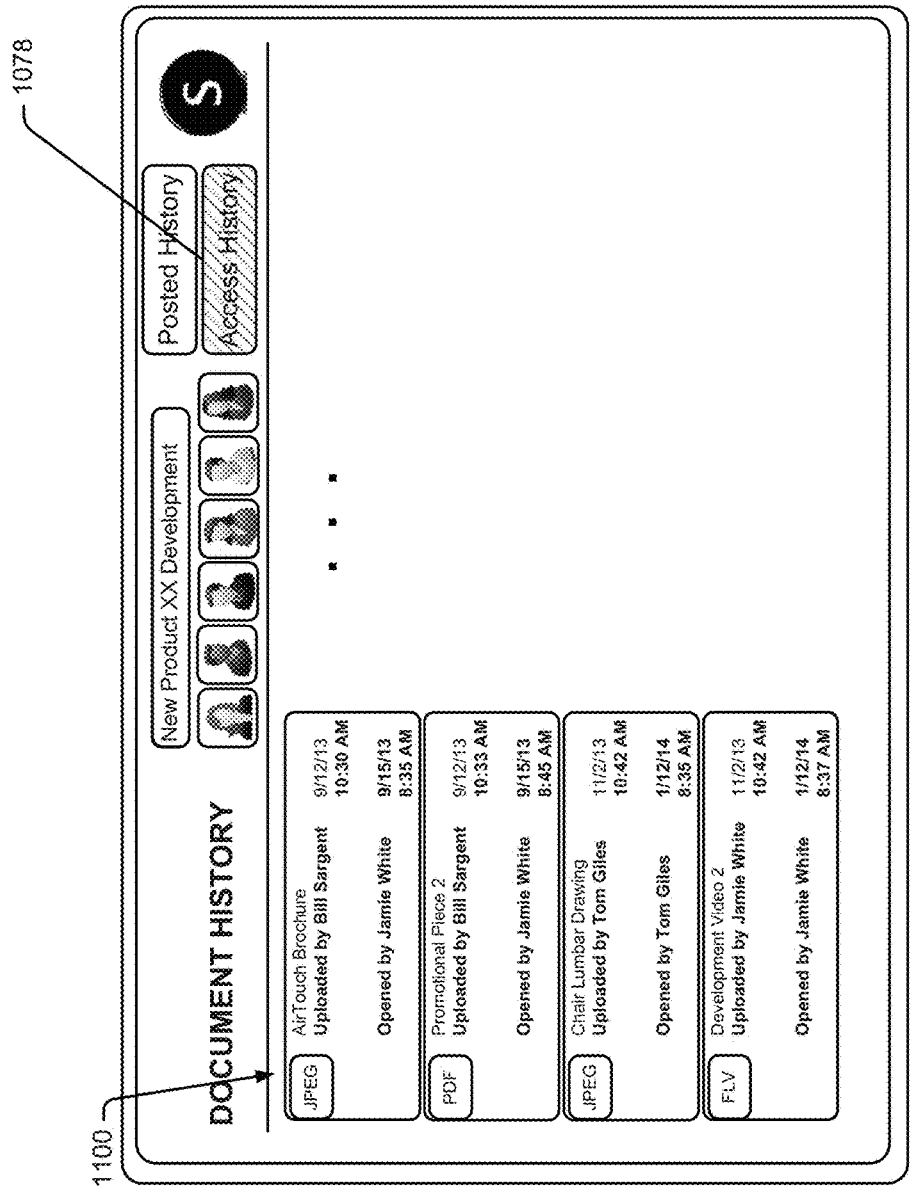
FIG. 53 is a screen shot showing a different session history view.
Figure 55:
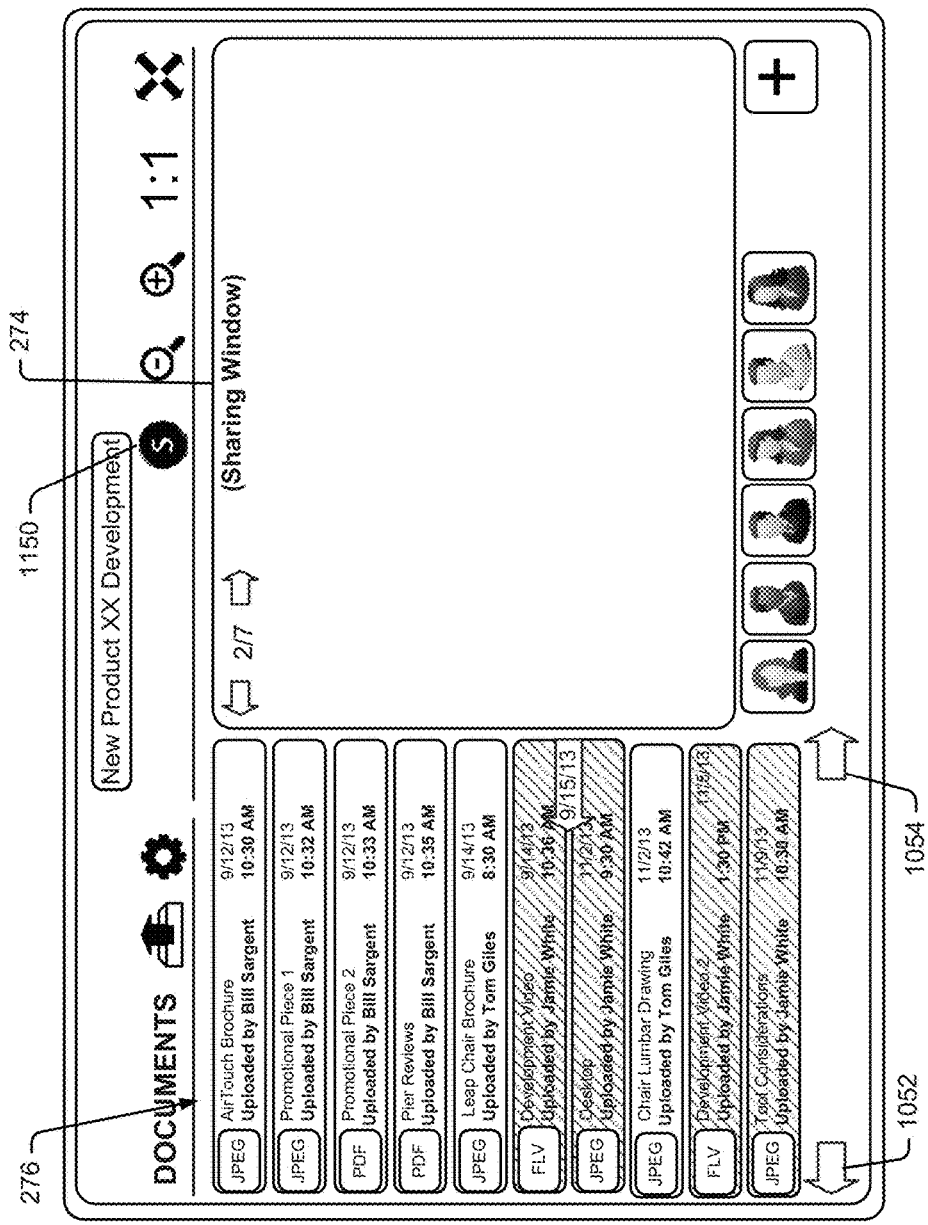
FIG. 55 s a screen shot showing a different session history view.

In any of the historical views shown in FIGS. 52 through 54, it is contemplated that any of the document icons may be selected to open the document associated there with in a private window for viewing privately by a conferee. FIG. 55 shows yet another historical queue view where documents are listed in the order in which they were added to the queue and include date and time information as well as information indicating the conferee that added each document to the queue. Here, the historical queue is located at the location of the session queue and therefore the look and feel of the session view including the sharing window 274 remains similar to when the session queue is presented. A conferee can switch between the FIG. 55 view and the FIG. 51 view by selecting icons 1150 and 1048.

The system described above offers may advantages over known conferencing systems. First, the disclosed system enables a conferee to schedule or start a current session with a plurality of other conferees easily and intuitively using e-mail or some other simple interface system.

Second, the system enables conferees to add content including documents and files to a session queue at any time including prior to a session conference, during a session conference or after a conference has ended. The queue can persist indefinitely and operate as a repository for any content that may be of interest to conferees that participate in a session. The queue can be added to or trimmed down to only maintain what is important to conferees at any time.

Third, in at least some cases the system enables any conferee to add new conferees to a session without requiring consent from any other conferees and without disturbing other conferees associated with a session. For instance, where five people are participating in a session conference, a first of the five can invite a sixth conferee independent of the other four conferees. As another instance, the first conferee could initiate a separate session conference with the sixth conferee without the other four conferees attending so that the first conferee could get the sixth conferee up to speed on session activities independent of the other conferees.

Fourth, in at least some embodiments, any conferee can add additional display screens or devices to a session independent of other conferees and without disturbing other conferees. For instance, a first conferee using a hand held device like a smart phone, a tablet, etc., may, during a session conference, move to a location where the first conferee has access to a large flat panel display screen. Recognizing the advantage of viewing a session via a large display screen, the first conferee can invite the screen via an address or identifier associated with the screen to the session conference. Thereafter, shared documents and files are also presented on the large screen that was added to the session.

Fifth, the system may help a conferee find an available large display screen that can be invited to a session. To this end, the locations of many personal devices can be tracked as a user moves about in a building, on a campus, etc. when a conferee logs on to a session or prior to when a conferee is scheduled to attend a session, the system may identify the location of the conferee's device as well as the locations of available large display screens and may offer to schedule or commence use of one or more screens by the conferee during the session.

Sixth, at least some embodiments of the disclosed system enable each conferee to separately view queued session documents in private windows while still having the ability to view a currently shared document in a sharing window. This enables each conferee to view and examine one document when the conferee independently determines that the document may be of interest without disturbing other conferees.

Seventh, in some embodiments private queues are provided for each conferee to enable conferees to gather possible documents for a session without worrying about others viewing the documents and either being confused or passing judgment. Private queue documents can be shared subsequently in session in a sharing window and may be moved to the session queue for access by all.

Eighth, in some systems all queued documents are cached by all conferee devices that link to a session to expedite sharing, moving between documents, etc. When a session is over, the cached documents are removed from the conferee device memories and instances of the queued documents are only persistently stored by the session server.

Ninth, in at lease some embodiments, conferees can share their device desktops (e.g., the current screen shot on their device display) with other conferees in a sharing window. Here, as in the case of sharing documents, any conferee can assume control of the sharing window from other conferee simply by opening the conferee's desktop in the sharing window.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. To apprise the public of the scope of this invention, the following claims are made:

What is claimed is:

1. A method of facilitating a collaboration session among a plurality of conferees, each conferee using a distinct interface device that includes a distinct display screen, the interface devices including at least a first interface device including a first display screen used by a first conferee, the method comprising the steps of:
presenting a first session interface on the first display screen, the first session interface including a first session queue and a first sharing window, wherein a first conferee using the first session interface can open any document in the session queue in the sharing windows of each of the interfaces;
presenting a second session interface on the second display screen, the second session interface including a second session queue and a second sharing window, wherein a second conferee using the second session interface can open any document in the session queue in the sharing windows of each of the interfaces; and
during a conference content sharing session while content is being shared among conferees in at least the first and second sharing windows:
(i) identifying other display screens that may be used to present shared content;
(ii) presenting screen selection options for at least a subset of the identified other display screens to at least the first conferee via the first session interface for selection;
(iii) receiving a selection via the first session interface of at least one of the presented screen selection options; and
(iv) in response to the received selection, associating the display screen that is associated with the selected screen selection option with the first and second session interfaces for accessing session content during the on-going session.

2. The method of claim 1 wherein the identified other display screens include at least a subset of display screens that are proximate the first conferee.

3. The method of claim 2 wherein the step of identifying other display screens includes identifying the location of the first conferee within a space and identifying display screens in the general area of the first conferee.

4. The method of claim 3 further including presenting a distinct identifier on each of the subset of display screens that are proximate the first conferee, the step of presenting screen selection options including presenting a separate screen selection option on the first session interface for each of the distinct identifiers presented on the subset of proximate display screens.

5. The method of claim 4 wherein, while shared content is shared on at least one of the other display screens in the subset, the shared content continues to be shared in the first content sharing window on the first session interface.

6. The method of claim 3 wherein the first conferee can select more than one of the other display screens for replicating content from the first content sharing window and wherein, upon selecting more than one of the other display screens, shared content is replicated on each of the selected other display screens.

7. The method of claim 1 further including the steps of, during the conference content sharing session:
(i) presenting screen selection options for at least a subset of the identified other display screens to at least the second conferee via the second session interface for selection;
(ii) receiving a selection via the second session interface of at least one of the presented screen selection options; and
(iii) in response to the received selection via the second session interface, associating the display screen that is associated with the selected screen selection option with the first and second session interfaces for accessing session content during the on-going session.

8. The method of claim 1 wherein at least one of the identified other display screens includes a display screen that is pre-associated with the first conferee.

9. The method of claim 8 wherein, upon selection of the at least one display screen that is pre-associated with the first conferee, the method includes presenting shared content on the selected display screen and removing the shared content from the first interface device display screen.

10. The method of claim 1 wherein the identified other display screens include at least a subset of other display screens that are located proximate the second conferee.

11. The method of claim 10 further including the steps of identifying the location of the second conferee within a space and identifying display screens in the general area of the second conferee.

12. The method of claim 1 wherein the identified other display screens include at least a subset of other display screens that are located proximate the second conferee and at least a subset of the other display screens that are located proximate the first conferee.

13. The method of claim 1 wherein, in response to the received selection, shared content from the first sharing window is replicated on the display screen associated with the selected screen selection option.

14. The method of claim 1 wherein the first and second session interfaces further include first and second private windows, respectively, the method further including enabling the first conferee to access session content in the first private window without sharing the content with other conferees and enabling the second conferee to access session content in the second private window without sharing the content with other conferees.

15. The method of claim 1 further including the step of, presenting at least one side bar window on the first session interface wherein content shared among the first conferee and at least one other conferee but not all conferees is presented in the at least one side bar window while other content is shared in the sharing windows among all conferees participating in an on-going session.

16. A method of facilitating a collaboration session among a plurality of conferees, each conferee using a distinct interface device that includes a distinct display screen, the interface devices including at least first and second interface devices including first and second display screens used by a first conferee, the method comprising the steps of:
presenting a first session interface on the first display screen, the first session interface including a first session queue and a first sharing window; and
during a conference content sharing session while content is being shared among conferees:
(i) identifying other display screens that may be used to present shared content, the other display screens including at least the second display screen and at least one additional display screen that is proximate the first conferee;
(ii) presenting screen selection options for the identified other display screens to at least the first conferee via the first session interface for selection;
(iii) receiving at least one selection via the first session interface of at least one of the presented screen selection options; and
(iv) in response to the received selection, associating the display screen that is associated with the selected screen selection option with the on-going session for accessing session content.

17. The method of claim 16 wherein the step of identifying at least one additional display screen includes identifying the location of the first conferee within a space and identifying display screens in the general area of the first conferee.

18. The method of claim 16 further including the steps of, in response to the received selection, replicating the content in the first shared window on the selected display screen.

19. The method of claim 16 further including the steps of, in response to the received selection, presenting a private window for privately viewing session content on the selected display screen.

20. The method of claim 16 wherein the first session interface further includes a conferee queue including a conferee representation for each conferee currently participating in the content sharing session.

21. The method of claim 20 wherein the conferee representation associated with a conferee currently sharing content in the sharing window is visually distinguished from other conferee representations in the conferee queue.

22. The method of claim 16 wherein each interface device presents a session interface including a session queue and a content sharing window.

23. The method of claim 22 wherein each session interface enables a conferee to open any content in the session queue in a private window independent of the content currently being shared in the sharing window.

24. The method of claim 23 wherein each session interface enables a conferee to open any content in the session queue in the content sharing windows at any time to share the open content with the other conferees.

25. The method of claim 24 wherein each session interface enables a conferee to add content to the session queue and to remove content from the session queue that the conferee previously added to the session queue.

26. The method of claim 16 wherein the first session interface includes an add icon that is selectable by the first conferee to initiate the step of identifying other display screens that may be used to present shared content.

27. The method of claim 22 wherein each session interface includes an add icon that is selectable by a conferee to initiate the step of identifying other display screens that may be used to present shared content.

28. The method of claim 22 wherein each session interface enables a conferee to invite another conferee to join an ongoing content sharing session at any time.

29. The method of claim 16 wherein the first session interface further includes a private window simultaneously presented with the first sharing window, the method further including simultaneously presenting first content in the first sharing window and second content in the private window where the first user can manipulate the second content in the private window independent of the first content in the first sharing window.

30. The method of claim 22 wherein each session interface enables a conferee to present a private window simultaneously while the sharing window is presented, the method further including enabling each session conferee to access any content from the session queue privately in the private window of their interface, wherein at least two conferees are capable of accessing and manipulating different instances of any session queue content independently and simultaneously regardless of which content is currently being shared in the sharing windows.

31. The method of claim 22 wherein content in the session queue is accessible by any conferee currently linked to the session, each session interface also presenting a private queue, each private queue including content representations for each content file posted by a conferee using an interface device that presents the session interface that is accessible to the conferee and not by other during the sharing session.

32. The method of claim 16 further including the steps of, after a display screen is associated an on-going session, presenting a session interface via the display screen including a content sharing window.

33. The method of claim 32 wherein the session interface on the display screen includes a conferee queue that includes a representation of each conferee currently linked to an on-going session.

34. The method of claim 16 wherein each of the first and second interface devices is a portable computing device.

35. The method of claim 16 wherein the second interface device is a large flat panel display screen.

36. The method of claim 16 wherein the session queue includes representations of content files to be accessible by conferees during the content sharing session, the method further including caching content files in a database including a separate content file for each representation in the session queue.

37. The method of claim 36 wherein the step of caching content files may be performed by any content sharing session conferee at any time before, during and after a content sharing session.

38. The method of claim 16 wherein the step of presenting screen selection options includes, for at least one of the selection options, presenting primary and secondary options, the method further including the steps of, receiving selection of one of the primary and secondary options for at least one of the display screens, when the primary option is selected, presenting first session content on the selected display screen and when the secondary option is selected, presenting second session content on the selected display screen.

39. The method of claim 38 wherein the first session content includes first sharing window content.

40. The method of claim 39 wherein displays designated secondary options present second shared content.

41. The method of claim 16 further including presenting a distinct identifier on each of the subset of display screens, the step of presenting screen selection options including presenting a separate screen selection option on the first session interface for each of the distinct identifiers presented on the subset of display screens.

42. The method of claim 17 wherein the steps of identifying at least one additional display screen and presenting screen selection options are automatic.

43. The method of claim 16 further including the steps of receiving a user input requesting additional display screens wherein the user input initiates the step of identifying other display screens.

44. The method of claim 16 wherein the step of receiving at least one selection via the first session interface includes receiving at least two selections selecting at least two additional display screens.

45. A system of facilitating a collaboration session among a plurality of conferees, each conferee using a distinct interface device that includes a distinct display screen, the interface devices including at least first and second interface devices including first and second display screens used by a first conferee, the system comprising:
 a processor programmed to perform the steps of:
  (i) presenting a first session interface on the first display screen, the first session interface including a first session queue and a first sharing window; and
  (ii) during a conference content sharing session while content is being shared among conferees:
   (a) identifying other display screens that may be used to present shared content, the other display screens including at least the second display screen and at least one additional display screen that is proximate the first conferee;
   (b) presenting screen selection options for the identified other display screens to at least the first conferee via the first session interface for selection;
   (c) receiving at least one selection via the first session interface of at least one of the presented screen selection options; and
   (d) in response to the received selection, associating the display screen that is associated with the selected screen selection option with the on-going session for accessing session content.

* * * * *